(12) United States Patent
Tamaki et al.

(10) Patent No.: US 6,226,561 B1
(45) Date of Patent: *May 1, 2001

(54) PRODUCTION PLANNING SYSTEM

(75) Inventors: Kenji Tamaki, Yokohama; Mitsuhiro Enomoto, Fujisawa; Jun Tateishi; Yoshinao Arai, both of Yokohama; Yoshihisa Kato, Seto, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/100,327

(22) Filed: Jun. 19, 1998

(30) Foreign Application Priority Data

Jun. 20, 1997 (JP) .................................................. 9-164294

(51) Int. Cl.[7] ................................................... G06F 19/00
(52) U.S. Cl. ......................... 700/100; 700/101; 700/108; 700/115
(58) Field of Search ..................................... 700/100, 101, 700/102, 112, 108, 115, 106, 117

(56) References Cited

U.S. PATENT DOCUMENTS

| | | | |
|---|---|---|---|
| 5,285,392 | * | 2/1994 | Kyle et al. ............................ 364/468 |
| 5,369,570 | * | 11/1994 | Parad ................................... 364/401 |
| 5,442,731 | * | 8/1995 | Tanaka et al. ......................... 395/54 |
| 5,479,343 | * | 12/1995 | Matoba ................................ 364/401 |

FOREIGN PATENT DOCUMENTS

| | | | |
|---|---|---|---|
| 5-108661 | * | 4/1993 | (JP) ................................ G06F/15/21 |
| 5-342220 | * | 12/1993 | (JP) ................................ G06F/15/21 |

* cited by examiner

*Primary Examiner*—Robert Beausoleil
*Assistant Examiner*—Tim Vo
(74) *Attorney, Agent, or Firm*—Antonelli, Terry, Stout & Kraus, LLP

(57) ABSTRACT

A production planning system capable of adjusting a production plan comprises a data storage unit for storing production planning information, parts list information, parts stock information and parts warehousing schedule information; a MRP (material resource plan) explosion unit for calculating the required amount of material resources based on the production plan information and the parts list information stored in the data storage unit; and a superfluous parts adjusting unit for making adjustment to eliminate superfluous parts. The superfluous parts adjusting unit includes a superfluous parts calculation section for collating the required amount of material resources calculated by the MRP explosion unit with the parts stock information and the parts warehousing schedule information thereby to calculate the superfluous parts, and a superfluous parts elimination section for eliminating superfluous parts by changing the production plan based on the superfluous parts information calculated by the superfluous parts calculation section.

22 Claims, 32 Drawing Sheets

PRODUCT A PRODUCTION PLAN ( INITIAL PRODUCTION PLAN )
4a

PART a WAREHOUSING SCHEDULE ( INITIAL PARTS WAREHOUSING PLAN )
4b

PART a STOCK CHANGE
4c

PART b WAREHOUSING PLAN ( INITIAL PARTS WAREHOUSING PLAN )
5d

PART b STOCK CHANGE
5e

PRODUCT A PRODUCTION PLAN (UPWARD - CORRECTED PRODUCTION PLAN)

PART a WAREHOUSING PLAN (UPWARD - CORRECTED PARTS WAREHOUSING PLAN)

PART a STOCK CHANGE

PART b WAREHOUSING PLAN ( UPWARD - CORRECTED PARTS WAREHOUSING PLAN )

PART b STOCK CHANGE

PRODUCT A PRODUCTION PLAN ( INFEASIBLE PRODUCTION PLAN )

PART a WAREHOUSING PLAN ( UPWARD - CORRECTED PARTS WAREHOUSING PLAN )

PART a STOCK CHANGE

PART b WAREHOUSING PLAN ( WAREHOUSING PLAN FOR PARTS OF NO - WAREHOUSING LOT )

PART b STOCK CHANGE ( STOCK CHANGE OF PARTS DEVELOPING DEFICIENCY )

PRODUCT A PRODUCTION PLAN ( FEASIBLE PRODUCTION PLAN )

PART a WAREHOUSING PLAN ( UPWARD - CORRECTED PARTS WAREHOUSING PLAN )

PART a STOCK CHANGE

11d — PART b WAREHOUSING PLAN ( WAREHOUSING PLAN FOR PARTS OF NO - WAREHOUSING LOT )

11e — PART b STOCK CHANGE ( STOCK CHANGE WITH DEFICIENT PARTS ELIMINATED )

PART a STOCK CHANGE ( SUPERFLUOUS PARTS STOCK CHANGE )

PART c STOCK CHANGE ( SUPERFLUOUS PARTS STOCK CHANGE )

PRODUCT B PRODUCTION PLAN ( NEWLY ADDED PRODUCTION PLAN )

PROFIT-MAXIMIZING PRODUCTION PLAN FOR PRODUCT A

PROFIT-MAXIMIZING PRODUCTION PLAN FOR PRODUCT B

PART a STOCK CHANGE AFTER ELIMINATING SUPERFLUOUS PARTS
14b-1

PART b STOCK CHANGE AFTER ELIMINATING SUPERFLUOUS PARTS
14b-2

PART c STOCK CHANGE AFTER ELIMINATING SUPERFLUOUS PARTS
14b-3

PRODUCT A PRODUCTION PLAN ( INFEASIBLE PRODUCTION PLAN )
15a

PART a WAREHOUSING PLAN ( UPWARD - CORRECTED PARTS WAREHOUSING PLAN )
15b

PART a STOCK CHANGE
15c

PART b WAREHOUSING PLAN ( WAREHOUSING PLAN FOR LOTS WITH WAREHOUSING SCHEDULE CHANGED )

PART b STOCK CHANGE ( STOCK CHANGE WITH DEFICIENT PARTS )

PRODUCT A PRODUCTION PLAN ( FEASIBLE PRODUCTION PLAN )

PART a WAREHOUSING PLAN ( UPWARD - CORRECTED PARTS WAREHOUSING PLAN )

PART a STOCK CHANGE ( STOCK CHANGE WITH SUPERFLUOUS PARTS )

18d PART b WAREHOUSING PLAN ( WAREHOUSING PLAN FOR LOTS WITH WAREHOUSING SCHEDULE CHANGED )

18e PART b STOCK CHANGE ( STOCK CHANGE WITH DEFICIENT PARTS ELIMINATED )

PROFIT - MAXIMIZING PRODUCTION PLAN FOR PRODUCT A

PROFIT - MAXIMIZING PRODUCTION PLAN FOR PRODUCT B

PART a STOCK CHANGE AFTER ELIMINATING SUPERFLUOS PARTS
21b-1

PART b STOCK CHANGE AFTER ELIMINATING SUPERFLUOS PARTS
21b-2

PART c STOCK CHANGE AFTER ELIMINATING SUPERFLUOS PARTS
21b-3

PRODUCT A PRODUCTION PLAN WITH PROFIT MAXIMIZED

PRODUCT B PRODUCTION PLAN WITH PROFIT MAXIMIZED i : PART NAME     t : SCHEDULE     N : NUMBER OF DEFICIENT PARTS
S : PARTS STOCK CHANGE     T : DEFICIENT PARTS OCCURRENCE DATE
$F_{end}$ : NUMBER OF DEFICIENT PARTS AS OF FINAL SCHEDULED DATE i : PART NAME   t : SCHEDULE   m : NUMBER OF SUPERFLUOUS PARTS
Y : SUPERFLUOUS PARTS STOCK CHANGE
$Y_{end}$ : NUMBER OF SUPERFLUOUS PARTS AS OF FINAL SCHEDULED DATE
P : ADDITIONAL PRODUCTION PLAN

PRODUCTION PLANNING SYSTEM

CROSS-REFERENCE TO RELATED APPLICATIONS

The present application relates to subject matter described in applications Ser. No. 08/059,227 filed on May 10, 1993 issued as U.S. Pat. No. 5,479,343 on Dec. 26, 1995 and Ser. No. 08/1416,652 filed on Apr. 5, 1995. The disclosures of these applications are incorporated herein by reference.

BACKGROUND OF THE INVENTION

The present invention relates to a production planning system, or more in particular to a production planning system including the elimination of deficient parts, elimination of superfluous parts, adjustment of a production plan and adjustment of a parts acquisition plan.

Well-known techniques for a production planning system include (1) the technique described in JP-A-5-108661

(2) the technique described in JP-A-5-342220

The conventional technique disclosed in JP-A-5-108661 is a production scheduling system in which a production schedule solution of minimum cost is predetermined as an optimum solution according to mathematical programming, and the rationality of the artificial operation is sought after by indicating the effect that the artificial correction of the schedule has on the minimum cost.

The conventional technique (2) disclosed in JP-A-5-342220, on the other hand, is a process planning evaluation system in which a process planning is quantitatively evaluated by converting the amount of a product in stock and the rate of a product out of stock into a cost and simulating the change of the particular cost.

The production scheduling system according to the conventional technique (1) described above seeks after the rationality of the artificial operation by executing the following steps. Specifically, a time schedule is determined for actually carrying out the production based on the line, quantity and the delivery time of a product to be manufactured under such restraints as the product quantity, delivery time, the lead time for acquisition of raw materials and the maximum available workforce. In determining this time schedule, the actual restraints are approximated or simplified to predetermine a production schedule solution of minimum cost as an optimum solution according to the mathematical programming. After that, the production schedule is artificially corrected in such a manner as to satisfy the actual restraints based on the approximated or simplified restraints, or to give priority to a specific product unconditionally for the reason of sales without regard to the cost. These artificial corrections are monitored and evaluated, and if not realizable, an alarm is issued against them, while if realizable, the effect on the minimum cost obtained as the optimum solution of mathematical programming is calculated and the result is displayed. The conventional technique (1) described above is a method for calculating and displaying the effect that an artificial operation of a production scheduling causing superfluous parts has on the minimum cost obtained as an optimum solution of the mathematical programming, but has no function of providing a procedure for eliminating actual superfluous parts.

The conventional technique (2) described above, on the other hand, is a process planning evaluation system in which process planning data and incoming order prediction data are prepared from the achievements of the previous year, the amounts of a product in stock and a product out of stock are determined by simulating such data. The process planning is quantitatively evaluated by converting the amount of the product in stock and the product out of stock into a cost according to a predetermined formula. Then, the operator checks the figures, and if necessary, corrects the process planning. In the conventional technique (2), therefore, a superfluous product in stock is determined by simulation and converted into a cost and displayed sometimes to request the correction of the process planning, but no procedure is provided for eliminating actual superfluous parts.

In correcting a production plan upward according to the conventional method, parts newly required, if any, are not purchased, but superfluous parts in stock are checked for and if there are any, they are delivered out to reduce the stock. The conventional method, however, is not intended to positively search the superfluous parts for automatically determining a product that can be manufactured, select a proper one out of a plurality of products that can be manufactured and add it to the production plan.

Also, even when superfluous parts are eliminated by the upward correction of the production planning, a subsequent change in the production plan for eliminating deficient parts may generate superfluous parts anew. In the case where a new production plan is added by combining superfluous parts and newly acquired parts, for example, a subsequent change of the line from a product using deficient parts to a product using no deficient parts for eliminating the deficient parts converts the otherwise superfluous parts into required parts, with the result that the newly acquired parts become superfluous parts.

SUMMARY OF THE INVENTION

The object of the present invention is to provide a production planning system in which the procedure for reducing superfluous parts can be carried out in a production plan.

More specifically, there is provided a production planning system in which deficient parts are calculated first of all and eliminated by cancelling a part of a production plan. Then, the whole truth of the superfluous parts is revealed, the products using the superfluous parts are searched for a proper product, and a production plan for the particular product is added as a new production plan. This series of procedure is executed to eliminate the superfluous parts.

In order to achieve the above-mentioned object, the present invention is based on the following concept:

(1) A production planning system includes a deficient part calculation section for collating the required amount of material resources calculated from the production planning information and the parts list information with the parts in-stock information and the parts warehousing schedule information thereby to calculate the type and quantity of parts expected to run short, thereby making clear the current situation of deficient parts.

(2) A production planning system includes a deficient parts elimination section for checking and listing the products using the above-mentioned deficient parts, comparing the sufficiency or deficiency of other parts used by such products sequentially, selectively eliminating the products containing deficient parts in the descending order of the number of deficient parts, and repeatedly deleting the particular products from the production plan until all deficient part are eliminated, whereby the current production plan is improved to a feasible production plan.

As a method of eliminating deficient parts, the deficient parts can be newly purchased as long as the requirement for the acquisition lead time is met by the plan involved.

(3) A production planning system includes a superfluous parts calculation section for collating the required amount of material resources recalculated from the feasible production plan information and the parts list information with the parts warehousing schedule information containing the parts in-stock information and the new parts purchase information thereby to calculate the type and quantity of the parts which are expected to be superfluous, whereby the current situation of superfluous parts is revealed. The superfluous parts situation revealed by this procedure also includes the superfluous parts newly generated by cancellation of the plan for the products containing deficient parts.

(4) A production planning system includes a superfluous parts elimination section for checking and listing the products using the above-mentioned superfluous parts, sequentially proposing for comparison the superfluity or deficiency of the other parts used by each product, selecting the plans which can be accomplished with the superfluous parts alone and which can thus eliminate as many superfluous parts as possible, in the descending order of the number of such superfluous parts, and adding such a plan to the production plan and repeatedly carrying out a similar process until the superfluous parts are eliminated as far as possible, whereby the production plan can maximize the profits in the sense that the superfluous parts are minimized for the current feasible production plan.

In the method of eliminating superfluous parts, the intention is not to use superfluous parts alone, but parts long in acquisition lead time can be replaced by superfluous parts and parts short in acquisition lead time can be newly purchased as required.

Also, one of a plurality of products using superfluous parts can be selected not based on the quantity of superfluous parts eliminated but based on the cost of the superfluous parts eliminated. Another criterion that can be used for selection is the cost less the sales profits expected to be earned from the products using superfluous parts. In expressing the effect of elimination of superfluous parts in terms of cost, the greater the number of items of evaluation, the more conforming with the realities. In spite of this, an inaccurate value such as the expected sales price is unavoidably included. In view of this, a decision-making support system can be introduced in which a plurality of evaluations including actually-required but inaccurate costs as well as the evaluations of the costs definitely determined as an approximation of realities are displayed at the same time. In accordance with whether the evaluations lead to the same or different selections, the operation may make a final decision to select a product.

In order to achieve the above-mentioned object, according to a first aspect of the invention, there is provided a production planning system capable of adjusting a production plan, comprising:

a data storage unit for storing production plan information, parts list information, parts in-stock information and parts warehousing schedule information;

a MRP (material resource planning) explosion unit for calculating the required amount of material resources based on the production plan information and the parts list information stored in the data storage unit; and a superfluous parts adjusting unit for making adjustment to eliminate superfluous parts;

wherein the superfluous parts adjusting unit includes a superfluous parts calculation section for calculating superfluous parts by collating the required amount of material resources calculated by the MRP explosion unit with the parts in-stock information and the parts warehousing schedule information, and a superfluous parts elimination section for eliminating superfluous parts by changing the production plan based on the superfluous parts information calculated by the superfluous parts calculation section.

According to a second aspect of the invention, there is provided a production planning system further comprising a deficient parts adjusting unit including a deficient parts calculation section for calculating deficient parts by collating the required amount of material resources calculated by the MRP explosion unit with the parts in-stock information and the parts warehousing schedule information, and a deficient parts elimination section for eliminating deficient parts by changing the production plan based on the deficient parts information calculated by the deficient parts calculation section.

According to a third aspect of the invention, there is provided a production planning system capable of adjusting a production plan, comprising:

a unit for storing production plan information, parts list information, parts in-stock information and parts warehousing schedule information for all products to be produced;

a unit for forming a feasible production plan by calculating the required amount of material resources for the current production plan stored in the storage means, collating the result of explosion of the required amount of material resources with the parts in-stock and the parts scheduled to be warehoused stored in the storage means thereby to calculate the type of the parts and the number of the parts deficient for carrying out the current production plan, determining that the current production plan is infeasible for any of the products to be produced in the case where the number of deficient parts for the particular product is not zero, and selectively deleting the portion of the production plan for a product using the deficient parts from the infeasible plan for the particular product, and thereby resolving the infeasibility of the production plan due to the deficient parts; and a unit for forming a new production plan by calculating the required amount of material resources for the production according to a feasible production plan, collating the parts in stock and the parts scheduled to be warehoused stored in a storage unit, calculating the type of superfluous parts and the number of the superfluous parts for executing the current production plan, determining whether or not a new production plan can be formed for a product using only the superfluous parts in the case where the number of the superfluous parts is not zero for any of the products to be produced, and adding a new production plan to the feasible production plan in the case where the new production plan can be formed thereby to reduce the superfluous parts.

According to a fourth aspect of the invention, there is provided a production planning system capable of adjusting a production plan, comprising:

a unit for storing production plan information, parts list information, parts in-stock information and parts warehousing schedule information for all products to be produced;

a unit for calculating the required amount of material resources for the current production plan stored in the storage unit;

a unit for calculating the type of parts and the number of the parts deficient for executing the current production plan by collating the result of explosion of the required amount of material resources with the parts in stock and the parts scheduled to be warehoused stored in the storage unit;

a unit for forming a feasible production plan by determining the current production plan as infeasible for any of the products to be produced for which the number of deficient parts is not zero, and selectively cancelling the portion of the production plan for the product using the deficient parts from the feasible production plan for the particular product thereby to resolving the infeasibility due to the deficient parts;

a unit for calculating the required amount of material resources for the feasible production plan;

a unit for calculating the parts and the number of the parts superfluous for executing the current production plan by collating the required amount of material resources with the parts in stock and the parts scheduled to be warehoused stored in the storage unit; and a unit for determining whether or not a new production plan can be formed for a product using superfluous parts alone in the case where the number of the superfluous parts is not zero, and adding the new production plan to the feasible production plan in the case where the new production plan can be formed thereby to reduce the superfluous parts;

said units being realized by a computer.

According to a fifth aspect of the invention, there is provided a method of adjusting a production plan in such a manner that all parts required for the production of a product are made available by collating a production plan for the product with the parts acquired for the production of the particular product, comprising the steps of:

calculating the required amount of material resources for the current production plan, collating the calculation result of the required amount of material resources with the parts in stock and the parts scheduled to be warehoused thereby to calculate the type of parts and the number of the parts deficient for carrying out the current production plan, determining the current production plan as infeasible in the case where the number of the deficient parts is not zero, and eliminating the deficient parts by selectively deleting the portion of the production plan for the products using the deficient parts from the infeasible production plan thereby to form a feasible production plan; and calculating the required amount of material resources for the feasible production plan, collating the result of calculation of the required amount of material resources with the parts in stock and the parts scheduled to be warehoused thereby to calculate the parts and the number of parts superfluous for carrying out the feasible production plan, determining whether or not a new production plan can be formed for a product using superfluous parts alone in the case where the number of the superfluous parts is not zero, and reducing the superfluous parts by adding a new production plan to the feasible production plan in the case where the new production plan can be formed, thereby converting the feasible production plan into a production plan with the superfluous parts reduced.

According to a sixth aspect of the invention, there is provided a recording medium for recording a program executed by a computer for adjusting a production plan, wherein the program is for calculating the required amount of material resources for a current production plan formed in advance, collating the result of calculating the required amount of material resources with the parts in stock and the parts scheduled to be warehouse thereby to calculate the parts and the number of the parts superfluous for carrying out the current production plan, determining whether or not a new production plan can be formed using superfluous parts alone in the case where the number of the superfluous parts is not zero, and reducing the superfluous parts by adding the new production plan to the current production plan in the case where the new production plan can be formed, thereby converting the current production plan into a production plan with reduced superfluous parts, wherein the process for reducing the superfluous parts is executed by the computer.

According to a seventh aspect of the invention, there is provided a recording medium for recording the above-mentioned program further including the process for eliminating deficient parts by calculating the required amount of material resources for a current production plan formed in advance, collating the result of calculating the required amount of material resources with the parts in stock and the parts scheduled to be warehoused thereby to calculated the parts and the number of the parts deficient for carrying out the current production plan, determining the current production plan as infeasible in the case where the number of the deficient parts is not zero, eliminating the deficient parts by selectively deleting the portion of the production plan for the products using the deficient parts from the infeasible production plan thereby to form a feasible production plan.

The above-mentioned program can be so configured as to execute the process for eliminating deficient parts thereby to form a feasible production plan and executing the process for reducing superfluous parts for the feasible production plan.

BRIEF DESCRIPTION OF THE DRAWINGS

FIG. 12A is a diagram showing the change in the stock of superfluous common parts a;

FIG. 19A is a diagram showing the change in the stock of superfluous common parts a;

DESCRIPTION OF THE PREFERRED EMBODIMENTS

Figure 1:
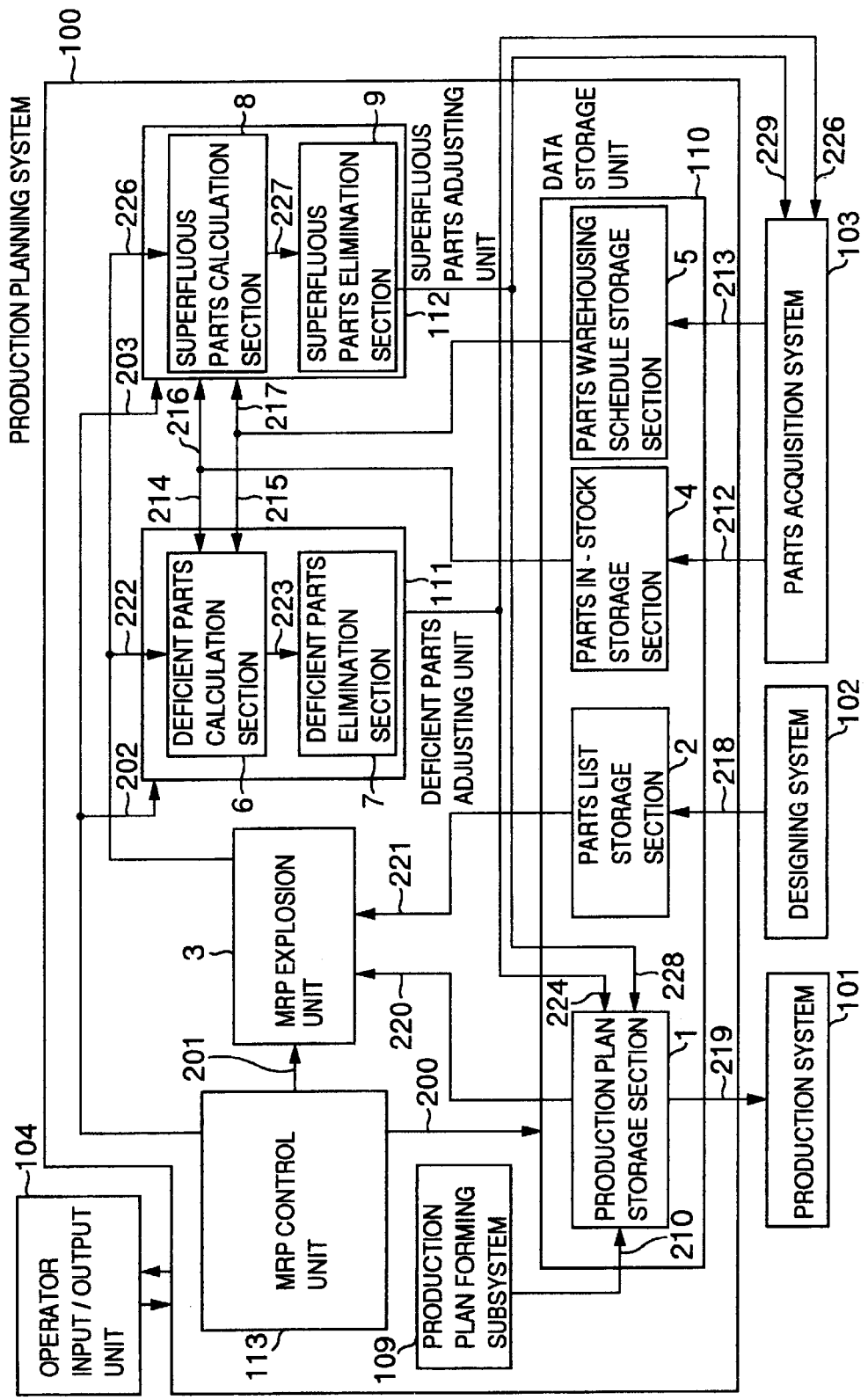
FIG. 1 is a block diagram for explaining a configuration of a production planning system comprising both a deficient parts elimination unit and a superfluous parts elimination unit.
Figure 28:
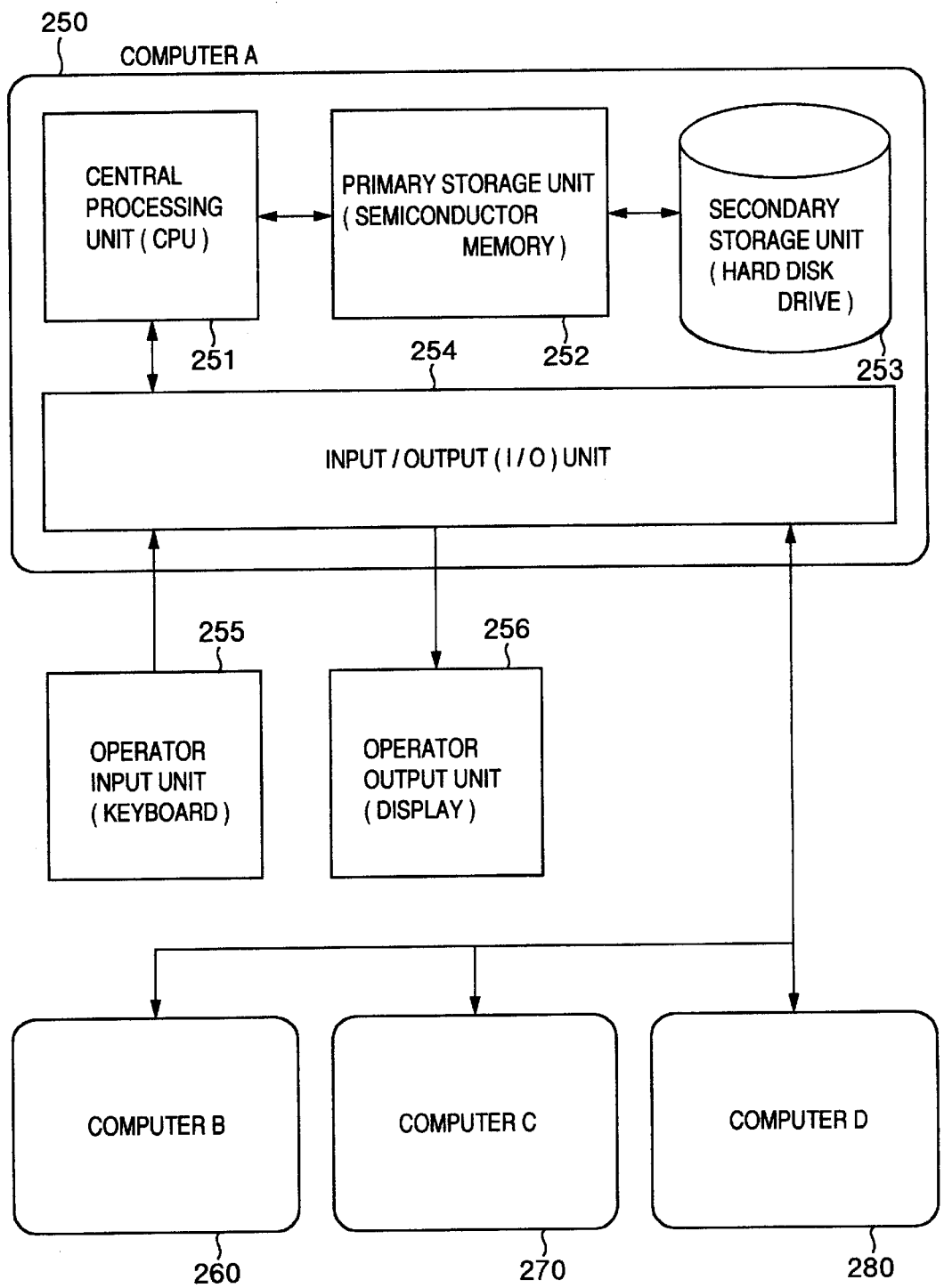
FIG. 28 is a block diagram showing an example configuration of a hardware system for packaging a production planning system.

FIG. 1 shows a functional configuration of a production planning system according to an embodiment of the present invention. FIG. 28 shows a hardware system configuration of a production planning system according to an embodiment of the invention.

A production planning system 100 according to an embodiment of the invention, as shown in FIG. 1, comprises a production plan forming subsystem 109, a data storage unit 110, a material resource planning (MRP) control unit 113, a MRP explosion unit 3, a deficient parts adjusting unit 111, and a superfluous parts adjusting unit 112.

The production planning system 100 is connected with an external production system 101, a designing system 102, a parts acquisition system 103 and an operation input/output unit 104. The production plan forming subsystem 109, though included in the example of the production planning system 100 according to the invention shown in FIG. 1, can alternatively be an external system connected to the production planning system 100.

The production planning system 100, as shown in FIG. 28, can be realized on a single computer A250 including a central processing unit (CPU) 251, a primary memory unit (semiconductor memory unit) 252, a secondary memory unit (hard disk drive) 253 and an input/output (I/O) unit 254. Alternatively, computers can be assigned to the respective units and connected by a network to each other.

The production plan forming subsystem 109, the material resource planning control unit 113, the MRP explosion unit 3, the deficient parts adjusting unit 111 and the superfluous parts adjusting unit 112 are named as if they are independent units. In the system of FIG. 1, however, logical instead of physical names are used for the units. Nevertheless, the use of physical units is not precluded. In the case where independent computers are used as described above, for example, a computer can be considered as a physical unit such as a deficient parts adjusting unit.

Also, regardless of whether the production planning system is realized with a single computer or with respective dedicated computers, each unit described above can be configured of software. Specifically, a computer, by executing a program corresponding to the function of a particular unit, exhibits the function of the unit. A program for each unit or a program for all the units combined can be recorded in a recording medium for the operation of the system. Various recording media can be used including a CD-ROM, a flexible disk, a hard disk and a semiconductor memory. Also, a program can be provided through a communication means. For some processes, the program can be replaced with a hardware logic, if possible.

In the case where the production planning system 100 is realized with a single computer A250 as shown in FIG. 28, the MRP control unit 113 is realized by a main program and the other units by a subroutine program called from the main program. These programs are transferred as required from a secondary memory unit 253 to a primary memory unit 252 and executed by a central processing unit 251. Also, an operation input/output unit 104, which includes an operator input unit 255 such as a keyboard or a mouse and an operator output unit such as a display unit, is used by the operator to perform the input operation and receive an output.

As shown in FIG. 28, the production system 101 is realized by another computer B260 and receives production planning information from the production planning system 100 for controlling an actual production process. The designing system 102, which is realized by still another computer C270, supplies and receives the parts list information to and from the production planning system 100. The parts acquisition system 103, which is realized by yet another computer D280, receives and supplies information on the parts purchase and warehousing records from and to the production planning system 100.

The data storage unit 110 includes storage areas including a production plan storage section 1 for storing the production planning information, a parts list storage section 2 for storing the parts list information providing a list of required parts, a parts stock storage section 4 indicating a stock of parts, and a parts warehousing schedule storage section 5 for storing the information on the parts warehousing schedule. Also, the data storage unit 110 includes other units in the production planning system 100 and a data input/output unit (not shown) connected to external units. The data storage unit 110 can be configured of a plurality of memory units such as hard disk drives corresponding to the respective storage sections or a single storage unit segmented into a plurality of blocks corresponding to the respective storage sections.

The data storage unit 110 shown in FIG. 1 represents a logical storage unit but not a physical one for storing data on parts. Consequently, the data storage unit 110 can exist in either the primary storage unit 252 or the secondary storage unit 253. The data storage unit 110 can of course be used also as a dedicated physical storage unit.

The MRP (material resource planning) explosion unit executes the MRP calculation based on the production planning information and the parts list information stored in the data storage unit. Also, according to the invention, the MRP explosion unit calculates the required amount of material resources used for the deficient parts adjusting unit ill and the superfluous parts adjusting unit 112, respectively. The amount of material resources used for each superfluous part adjusting unit 112 is calculated based on the production plan adjusted by the deficient parts adjusting unit 111 as will be described later.

The deficient parts adjusting unit 111 includes a deficient parts calculation section 6 for calculating deficient parts by collating the required amount of material resources calculated by the MRP explosion unit with the parts in-stock information and the parts warehousing schedule information, and a deficient parts elimination section 7 for eliminating the deficient parts by changing the production plan based on the deficient parts information calculated by the deficient parts calculation section.

The superfluous parts adjusting unit 112 includes a superfluous parts calculation section 8 for calculating superfluous parts by collating the required amount of resource materials calculated by the MRP explosion unit with the parts in-stock information and the parts warehousing schedule information, and a superfluous parts elimination section 9 for reducing or eliminating superfluous parts by changing the production plan based on the superfluous parts information calculated by the superfluous parts calculation section.

Figure 2:
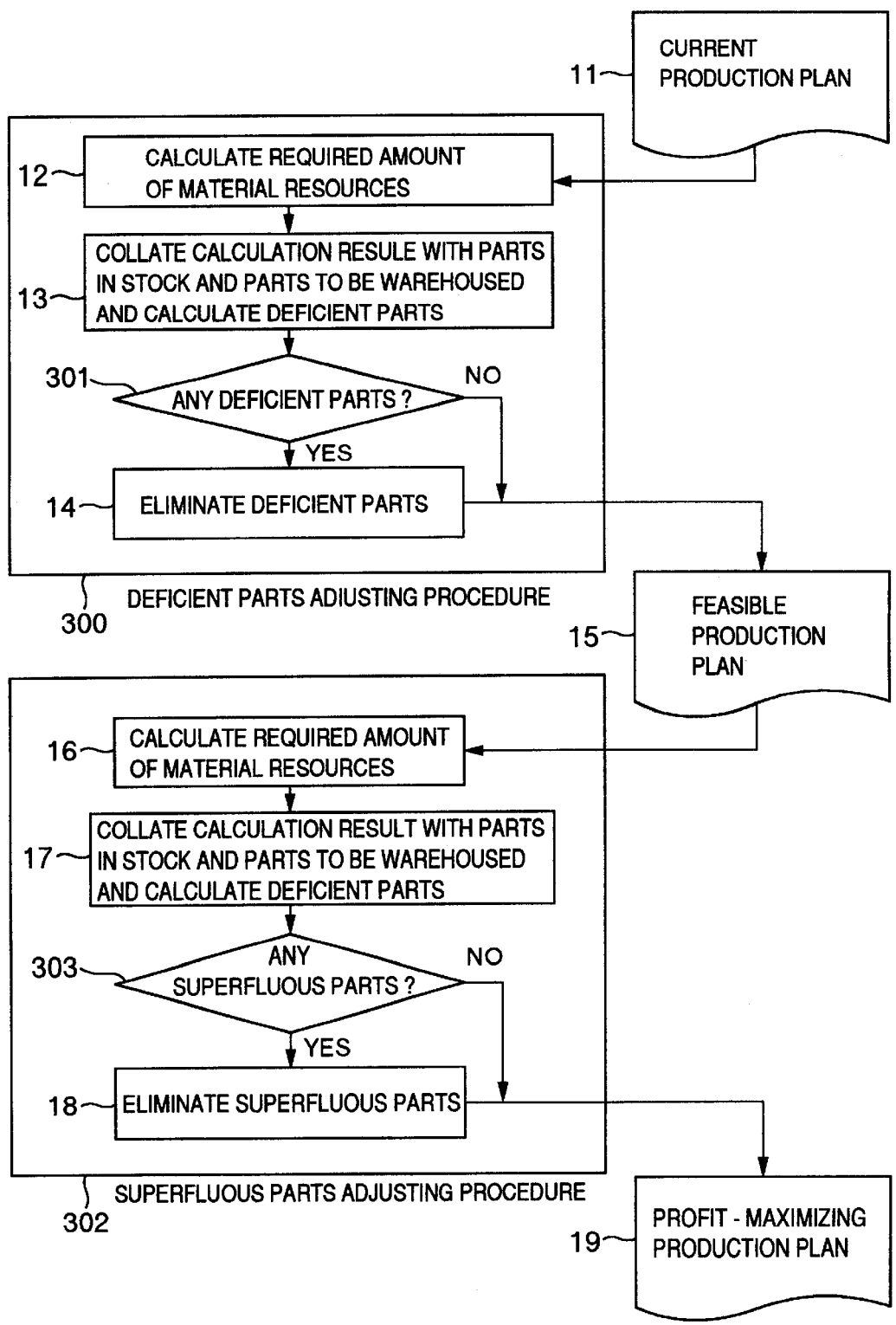
FIG. 2 is a flowchart showing an algorithm for adjusting a production plan by eliminating deficient parts and revealing the whole truth of superfluous parts, followed by eliminating the superfluous parts.

FIG. 2 shows an example algorithm for production plan adjustment executed by the production planning system according to the invention. The deficient parts adjusting unit 111 and the superfluous parts adjusting unit 112 are realized by executing this algorithm.

The superfluous parts elimination unit 9 includes means capable of an interactive operation as described above. Specifically, the superfluous parts elimination unit 9 includes a section for proposing a plurality of superfluous parts elimination means available for use, and a superfluous parts elimination means selector for selecting one of a plurality of the superfluous parts elimination means and reflecting the result of selection of the superfluous parts elimination means in the production plan storage section, the parts in-stock storage section or the parts warehousing schedule storage section. The superfluous parts elimination means proposal section can include a superfluous parts situation display section for displaying for each superfluous parts elimination means the change of the superfluous parts situation as a result of selecting one of a plurality of the superfluous parts elimination means available. Also, the superfluous parts elimination means proposal section can include a cost evaluation display section for displaying for each of a plurality of superfluous parts elimination means a cost evaluation as a result of selecting one of a plurality of superfluous parts elimination means available.

Further, the production planning system 100 includes a program used for displaying data on the operator input/output unit 104 and a program used for processing the input data. For example, a program for displaying the data on deficient parts and a program for displaying the data on superfluous parts shown in FIGS. 4 to 23 are included in the deficient parts adjusting unit 111 and the superfluous parts adjusting unit 112, respectively. These programs can alternatively be provided external to the system in a form usable by the production planning system 100.

Figure 3:
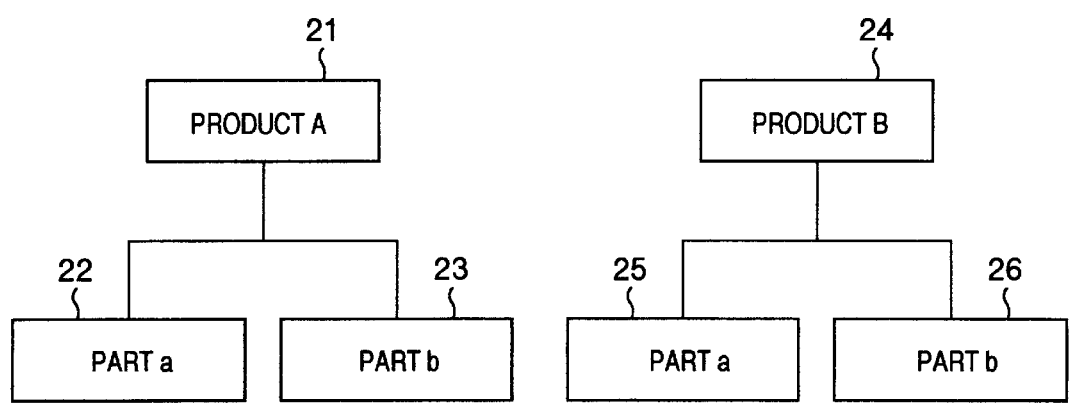
FIG. 3 is a diagram for explaining the parts configuration of two products A and B having a common part according to an example in an embodiment.

Now, an example of production plan adjustment according to an embodiment of the invention will be explained with reference to FIGS. 4 to 32 taking products A21 and B24 having a parts configuration of FIG. 3 as an example.

Suppose that the products used by way explanation are of two types, products A and B. The product A21 includes a part a22 and a part b23 (FIG. 3). The product B24, on the other hand, includes a part a25 and a part c26 (FIG. 3). The parts a22 and a25 are shared by the products A21 and B24.

Information on the parts constituting the products are stored in the data storage unit 110 described above. By way of explanation, the data stored in the data storage unit 110 are shown in the form displayed on the display screen of the operator input/output unit, i.e. in the form processed for display. The data are stored in the data storage unit 110 in the form before being processed for display. The display control data for processing the data into a form intended for display are also stored in the data storage unit 110.

Figure 4A:
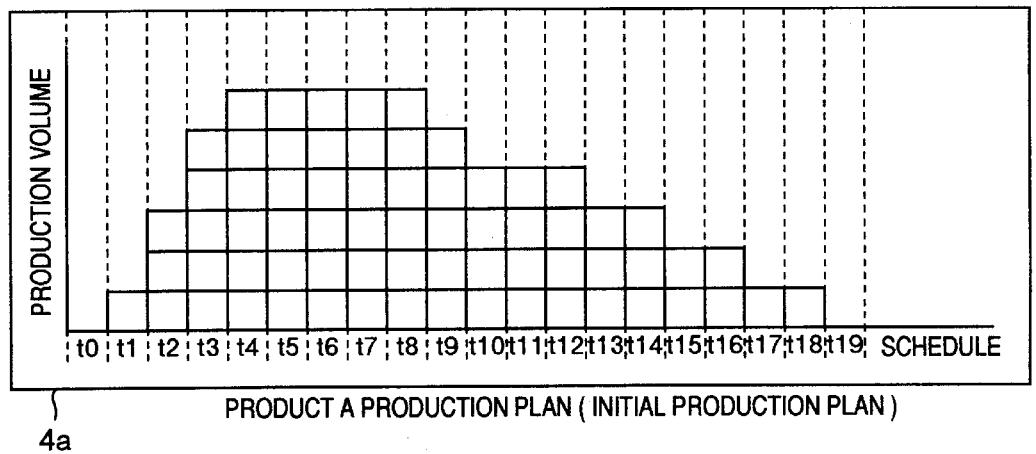
FIG. 4A shows an initial production plan for the product A.
Figure 6A:
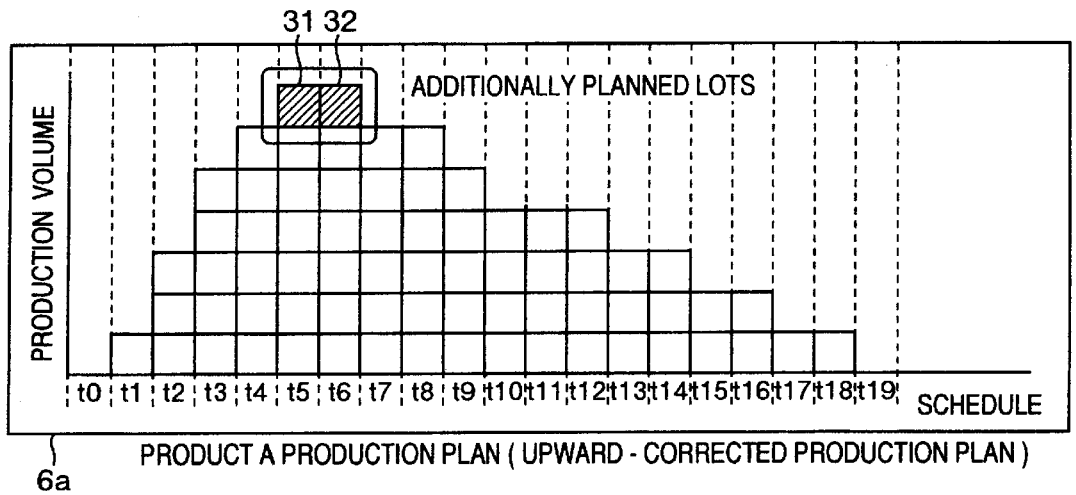
FIG. 6A is a production plan corrected upward for the product A.
Figure 8A:
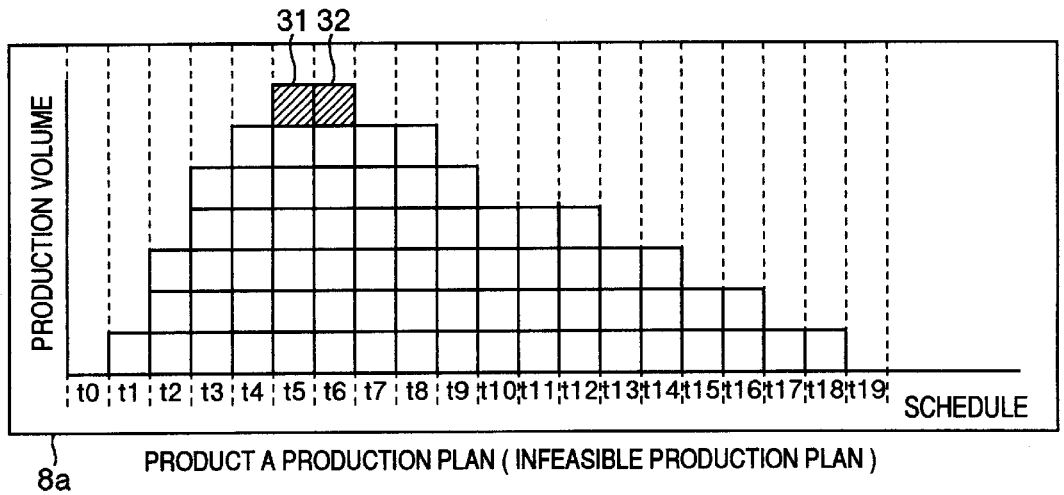
FIG. 8A is diagram for explaining an infeasible production plan for the product A due to warehousing failure of some lots of the exclusive part b.
Figure 10A:
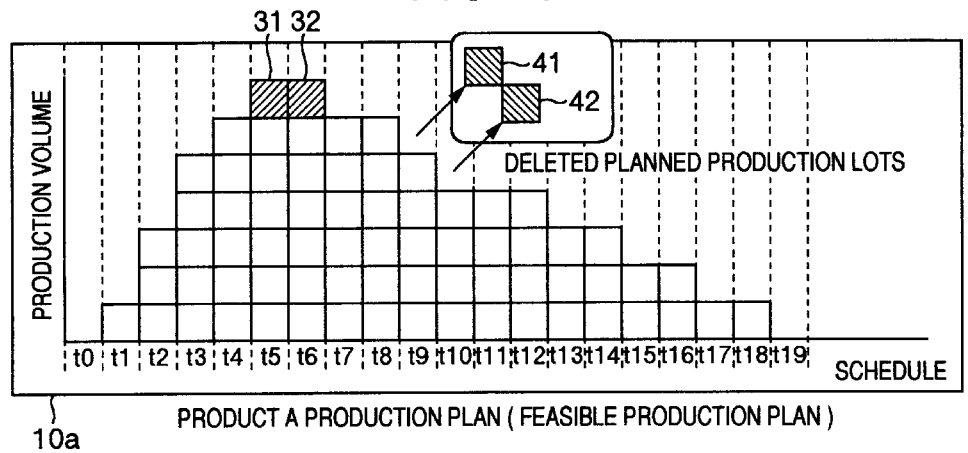
FIG. 10A is a diagram for explaining a feasible production plan for the product A after eliminating the deficient parts b.
Figure 15A:
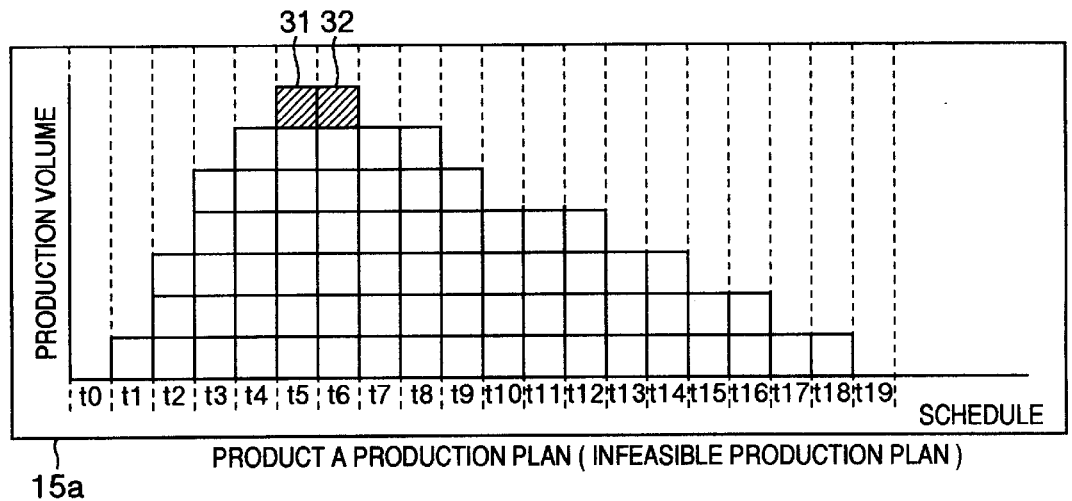
FIG. 15A is a diagram showing an infeasible production plan for the product A due to the warehousing failure of some lots of the exclusive part b.
Figure 15B:
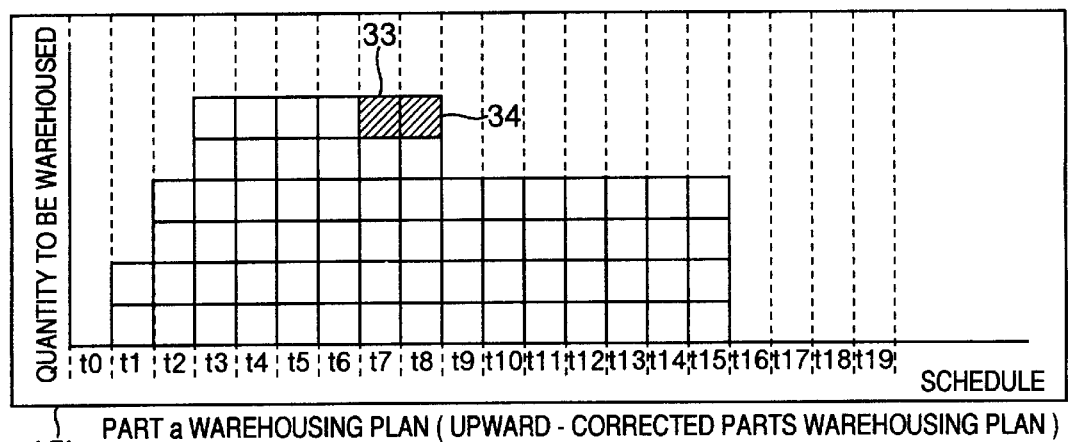
FIG. 15B is a warehousing plan corresponding to the upward correction of the production plan for the common part a constituting the product A.
Figure 17A:
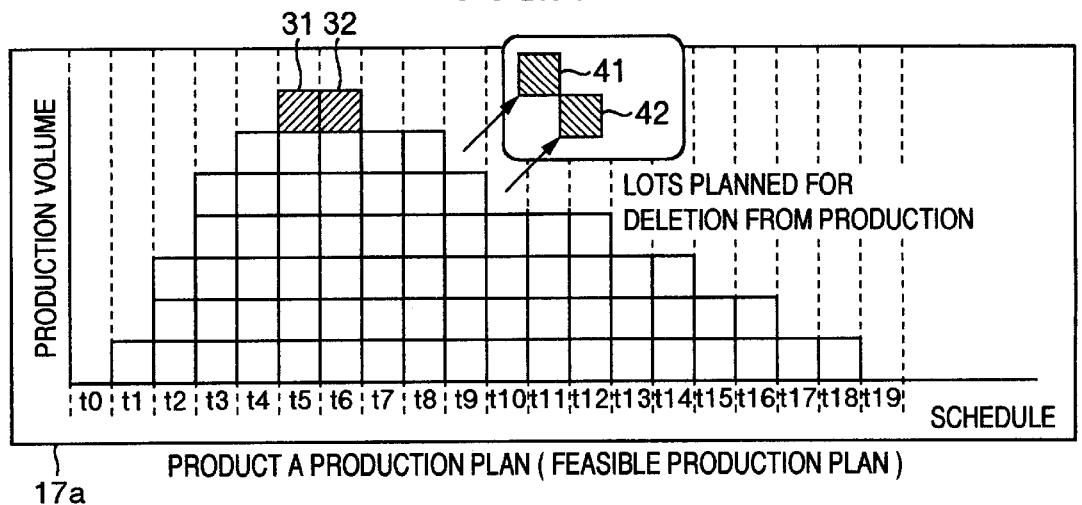
FIG. 17A is a diagram for explaining a feasible production plan for the product A after eliminating the deficient parts b.

A production plan for the product A21 stored in the production plan storage section 1 (FIG. 1) is shown by "4a" in FIG. 4A, "6a" in FIG. 6A, "8a" in FIG. 8A, "10a" in FIG. 10A, "a5a" in FIG. 15A and "17a" in FIG. 17A, with the abscissa representing the schedule "t0", "t1" . . . , "t19" for placing the parts on the production line and the ordinate representing the number of products.

Figure 4B:
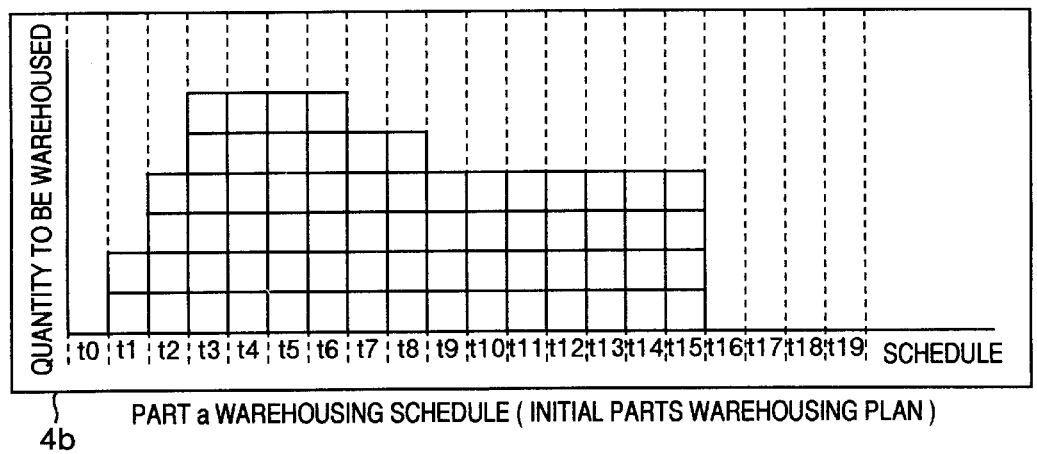
FIG. 4B is an initial warehousing plan of a common part a constituting the product A.
Figure 6B:
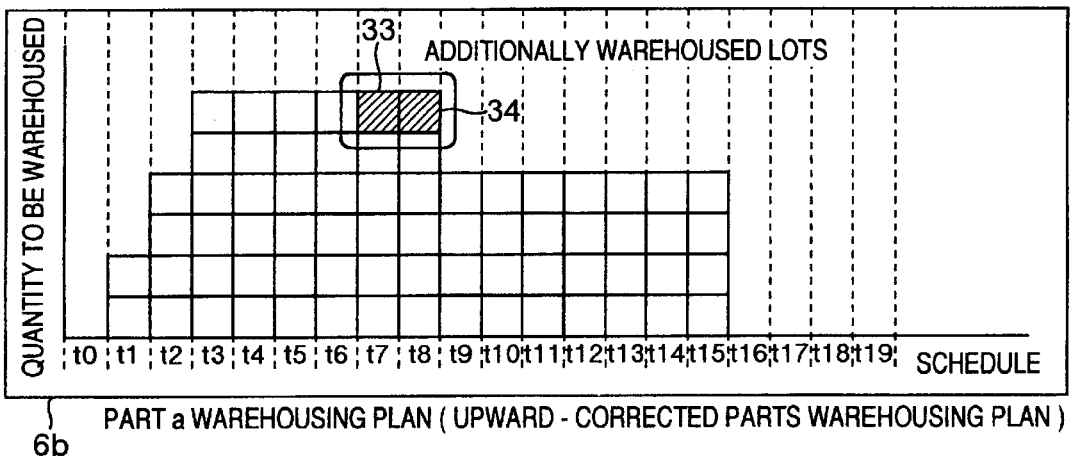
FIG. 6B is a warehousing plan corresponding to the upward correction of the production plan for the common part a constituting the product A.
Figure 8B:
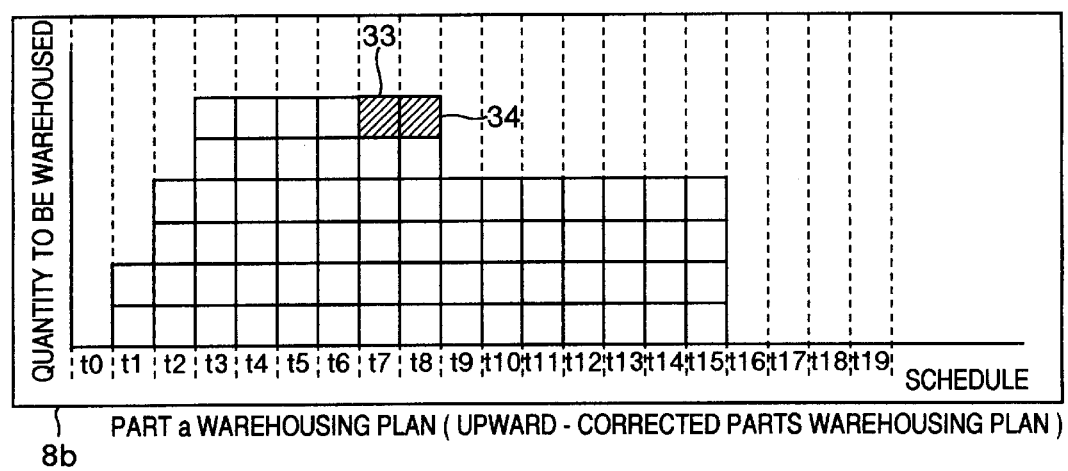
FIG. 8B is a diagram for explaining a warehousing plan corresponding to the upward correction of the production plan for the common part a constituting the product A.
Figure 10B:
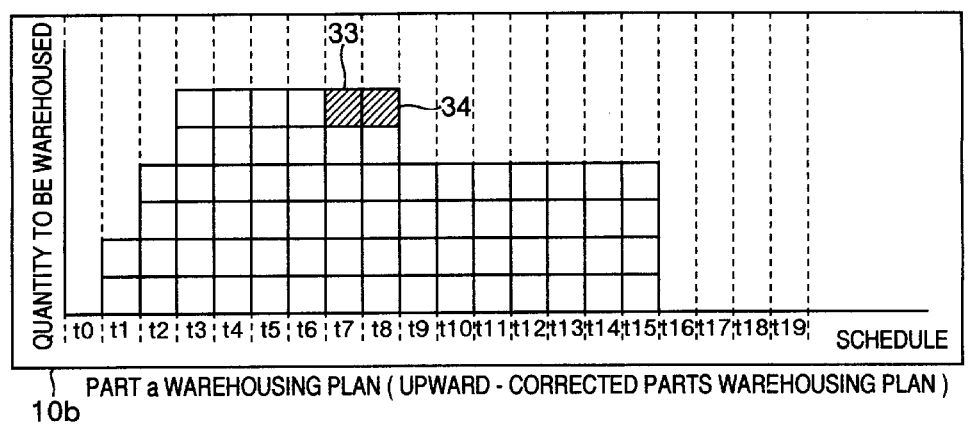
FIG. 10B is a warehousing plan corresponding to the upward correction of the production plan for the common part a constituting the product A.
Figure 17B:
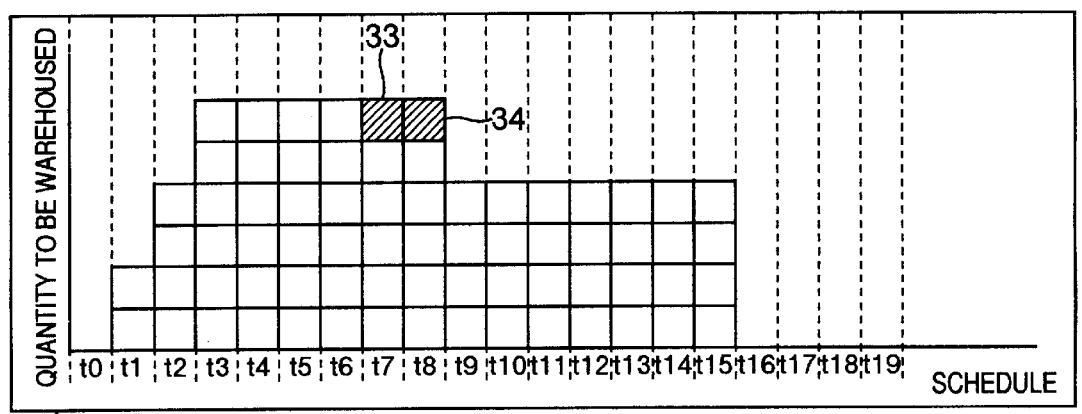
FIG. 17B is a diagram for explaining a warehousing plan corresponding to the upward correction of the production plan for the command part a constituting the product A.

A warehousing plan of the part a22 of the product A21 stored in the parts warehousing schedule storage section 5 is shown by "4b" in FIG. 4B, "6b" in FIG. 6B, "8b" in FIG. 8B, "10b" in FIG. 10B, "15a" in FIG. 15A and "17b" in FIG. 17B, with the abscissa representing the schedule "t0", "t1" . . . , "t19" for warehousing the parts and the ordinate representing the number of products scheduled to be warehoused.

Figure 4C:
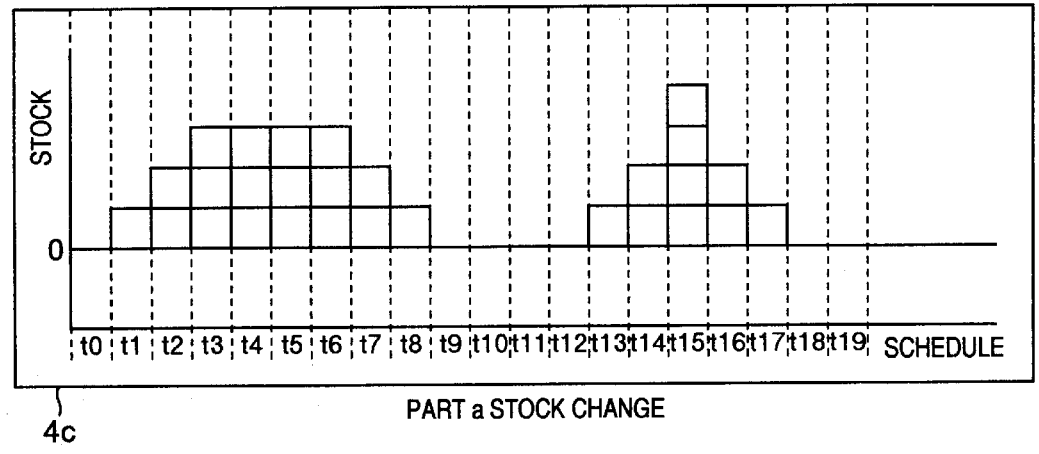
FIG. 4C is a diagram for explaining the change in the stock of the common part a for which the warehousing plan is applied to the production plan for the product A.
Figure 6C:
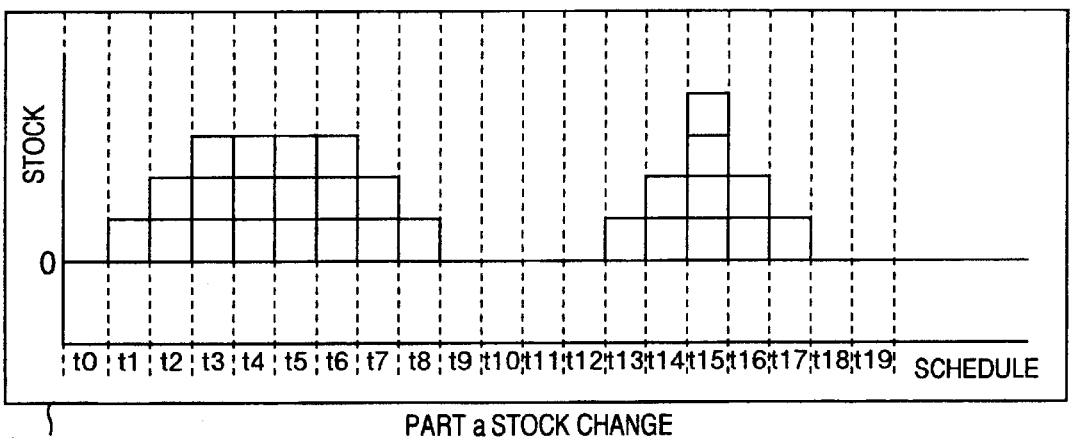
FIG. 6C is a diagram for explaining the change in the stock of the common part a for which the warehousing plan is applied to the production plan for the product A.
Figure 8C:
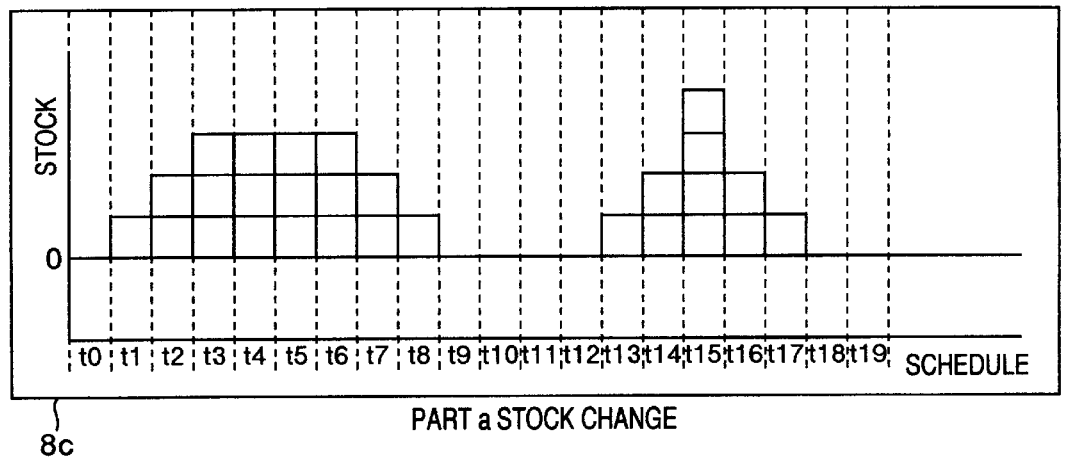
FIG. 8C is a diagram for explaining the change in the stock of the common part a for which the warehousing plan is applied to the production plan for the product A.
Figure 10C:
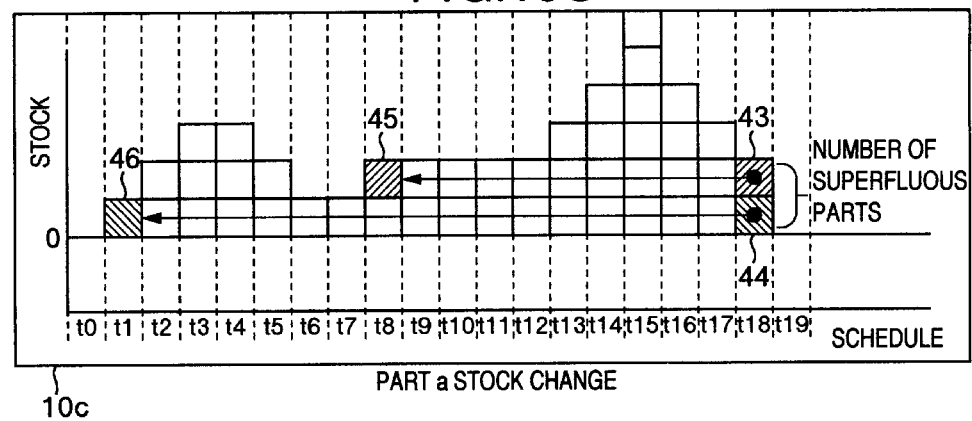
FIG. 10C is a diagram for explaining the change in the stock of superfluous common parts a for which the warehousing plan is applied to the production plan for the product A.
Figure 12A:
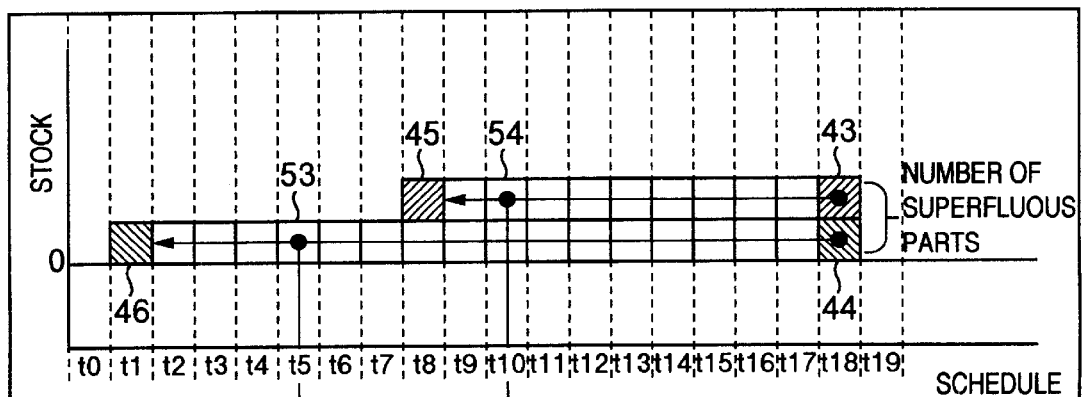
Figure 15C:
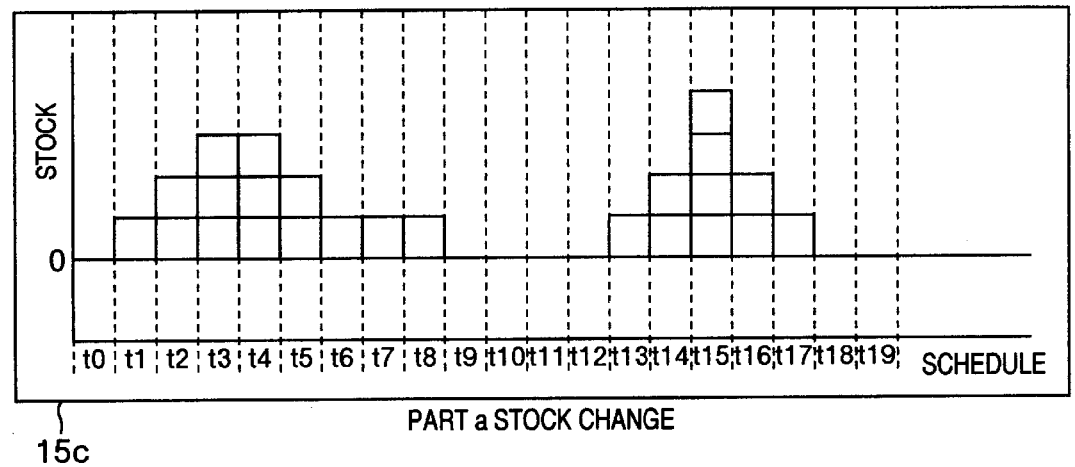
FIG. 15C is a diagram for explaining the change in the stock of the common part a for which the warehousing plan is applied to the production plan for the product A.
Figure 17C:
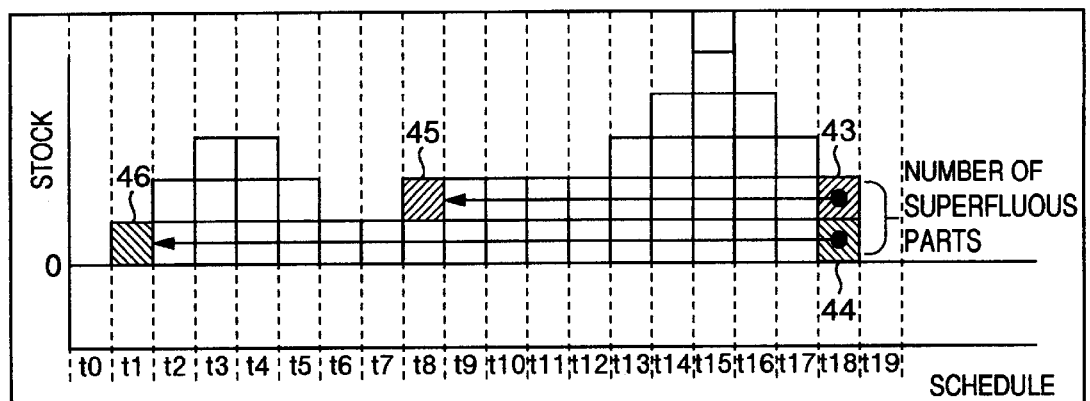
FIG. 17C is a diagram for explaining the change in the stock of superfluous common parts a for which the warehousing plan is applied to the production plan for the product A.

A change in the stock of the part a22 of the product A21 stored in the parts in-stock storage section 4 is shown by "4c" in FIG. 4C, "6c" in FIG. 6C, "8c" in FIG. 8C, "10c" in FIG. 10C, "12a" in FIG. 12A, "15c" in FIG. 15C and "17c" in FIG. 17C, with the abscissa representing the schedule "t0", "t1" . . . , "t19" and the ordinate representing the accumulated total of stock equaling to the number of warehoused parts less the number of delivered parts.

Figure 5A:
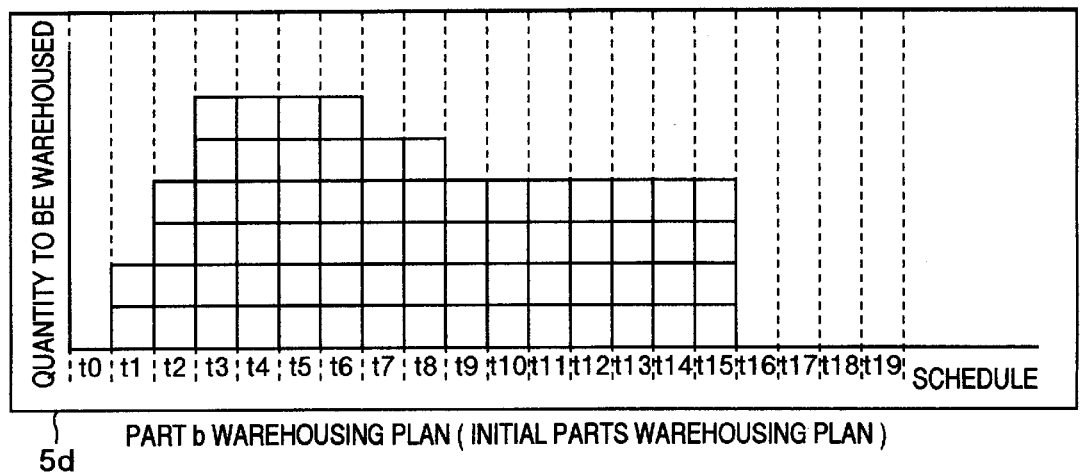
FIG. 5A is an initial warehousing plan for an exclusive part b constituting the product A.
Figure 7A:
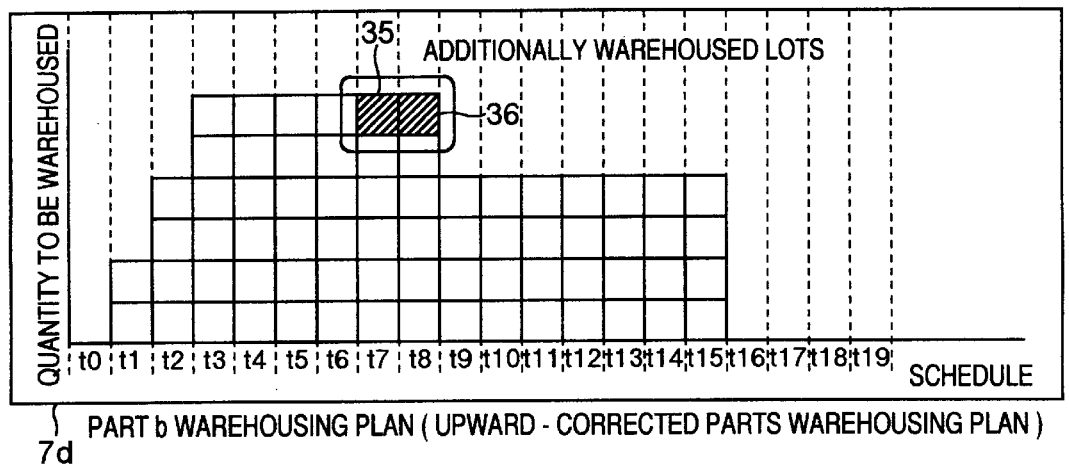
FIG. 7A is a warehousing plan corresponding to the upward correction of the production plan for the exclusive part b constituting the product A.
Figure 9A:
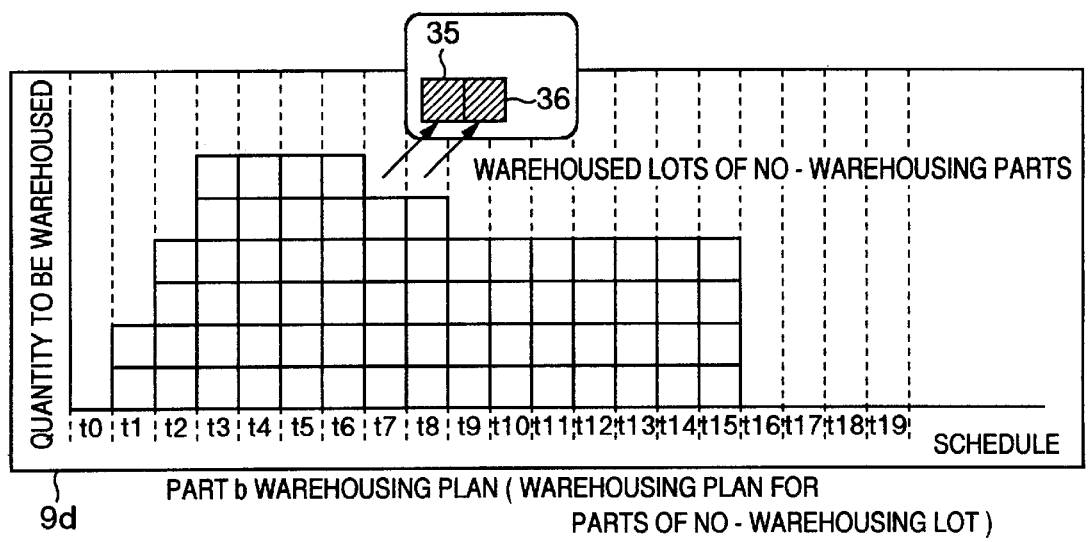
FIG. 9A is a diagram for explaining a warehousing plan for the exclusive part b constituting the product A and including some lots impossible to warehouse.
Figure 11A:
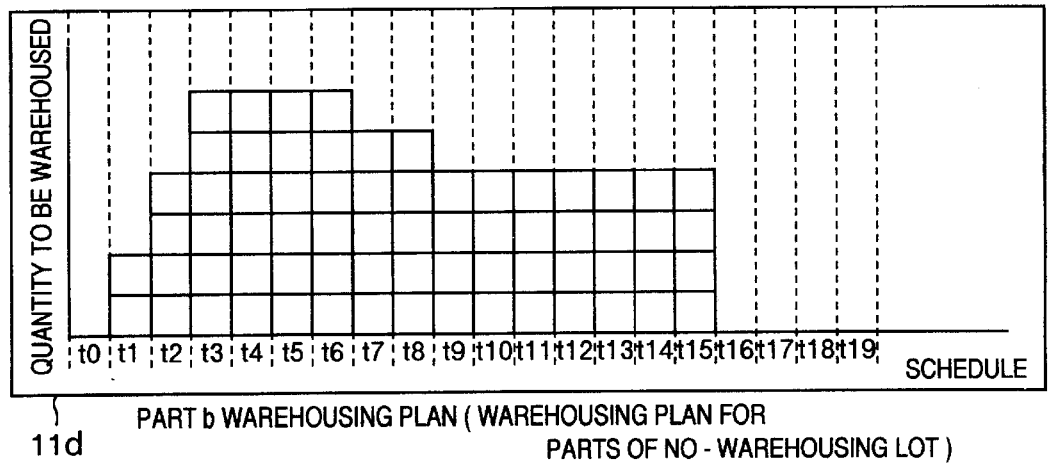
FIG. 11A is a diagram for explaining a warehousing plan for some lots of the exclusive part b impossible to warehouse constituting the product A.
Figure 16A:
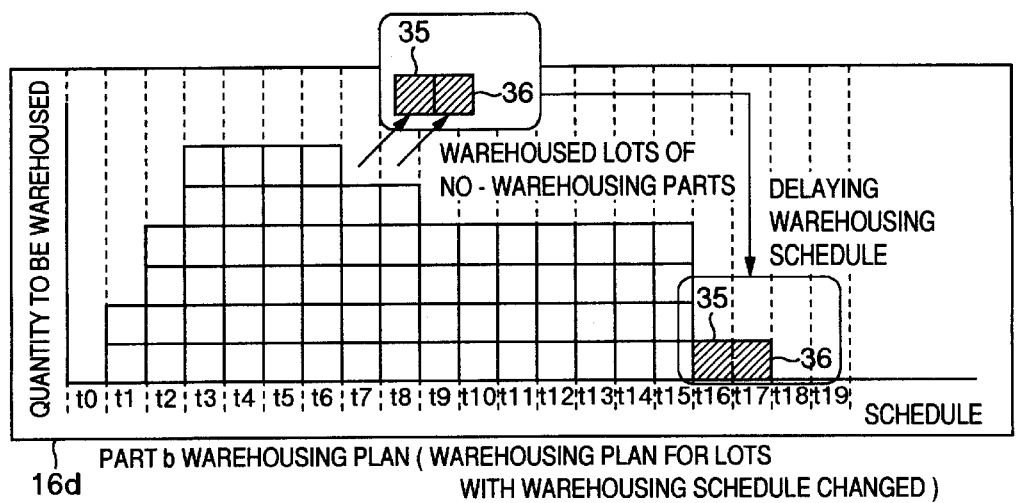
FIG. 16A is a diagram for explaining a warehousing plan for some lots delayed in warehousing date for the exclusive part b constituting the product A.
Figure 18A:
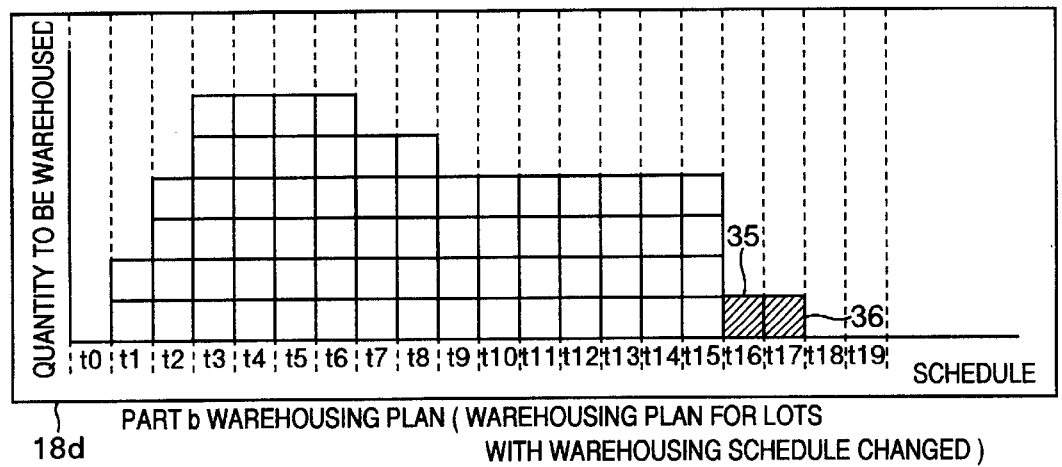
FIG. 18A is a diagram for explaining a warehousing plan for some lots of the exclusive part b constituting the product A with the scheduled warehousing date thereof delayed.

A warehousing schedule of the part b23 of the product A21 stored in the parts warehousing schedule storage section 5 is shown by "5d" in FIG. 5A, "7d" in FIG. 7A, "9d" in FIG. 9A, "11d" in FIG. 11A, "16d" in FIG. 16A, and "18d" in FIG. 18A, with the abscissa representing the parts warehousing schedule "t0", "t1" . . . , "t19" and the ordinate representing the number of the parts scheduled to be warehoused.

Figure 5B:
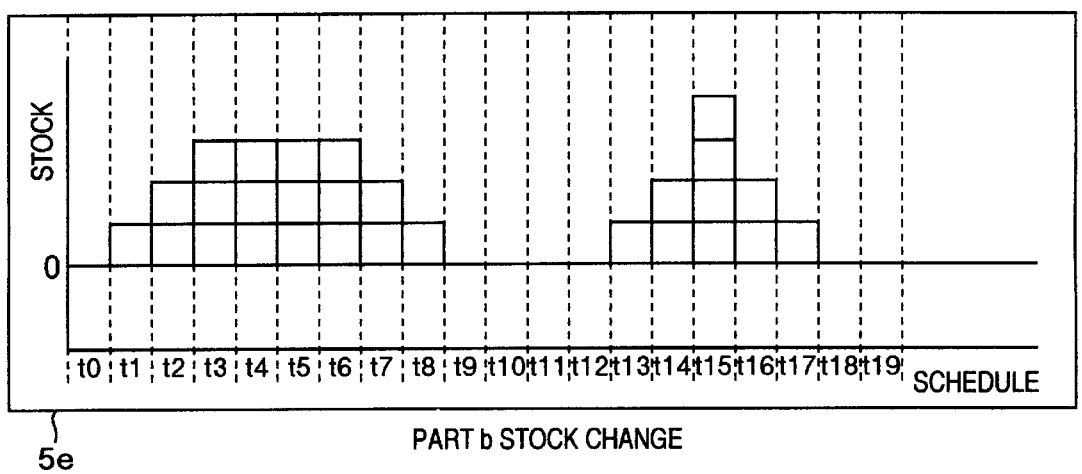
FIG. 5B is a diagram for explaining the change in the stock of the exclusive part b for which the warehousing plan is applied to the production plan for the product A.
Figure 7B:
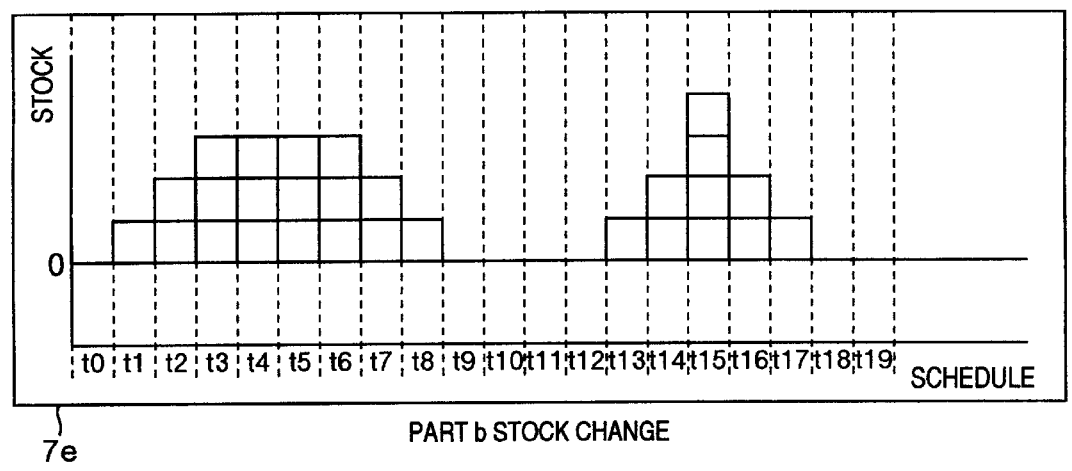
FIG. 7B is a diagram for explaining the change in the stock of the exclusive part b for which the warehousing plan is applied to the production plan for the product A.
Figure 9B:
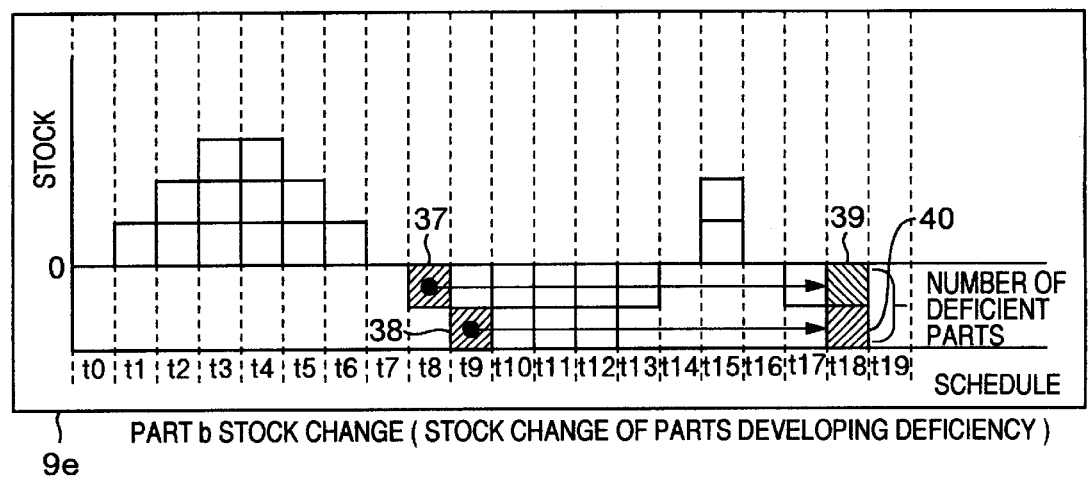
FIG. 9B is a diagram for explaining the change in the stock of the deficient exclusive parts b for which the warehousing plan is applied to the production plan for the product A.
Figure 11B:
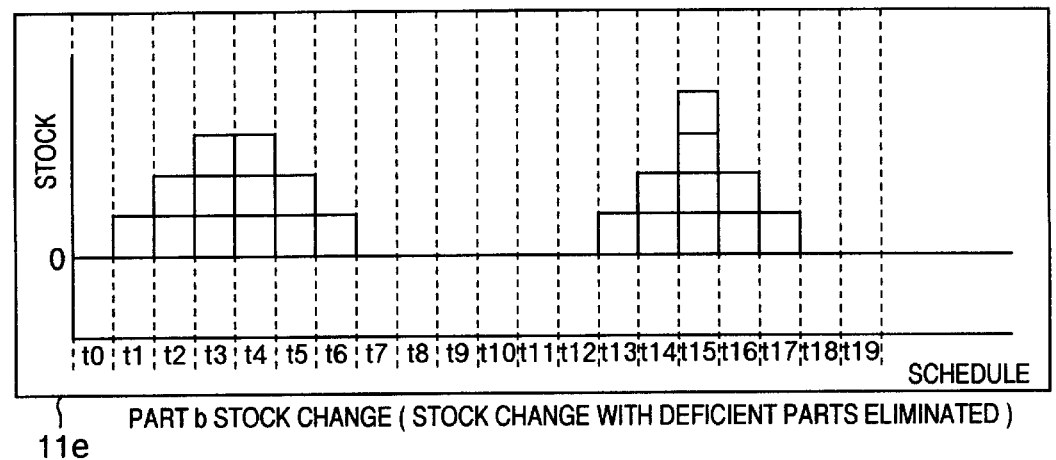
FIG. 11B is a diagram for explaining the change in the stock of deficient exclusive parts b for which the warehousing plan is applied to the production plan for the product A.
Figure 16B:
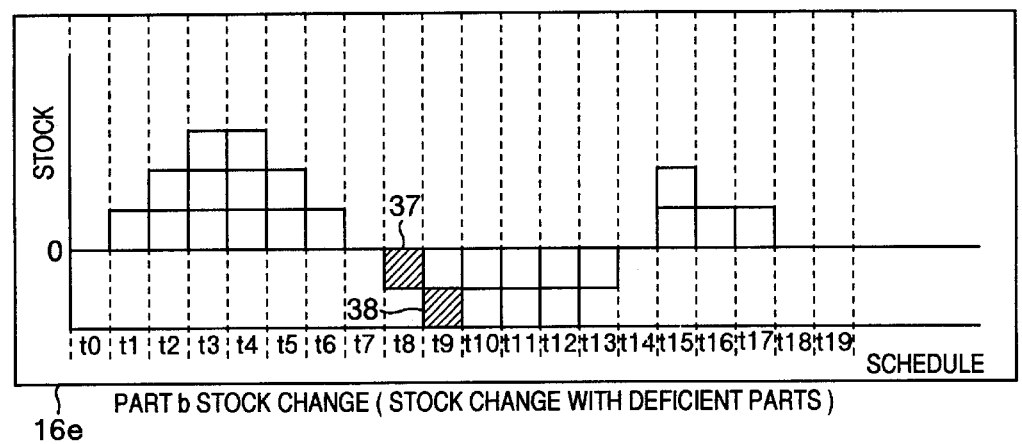
FIG. 16B is a diagram for explaining the change in the stock of deficient exclusive parts b for which the warehousing plan is applied to the production plan for the product A.
Figure 18B:
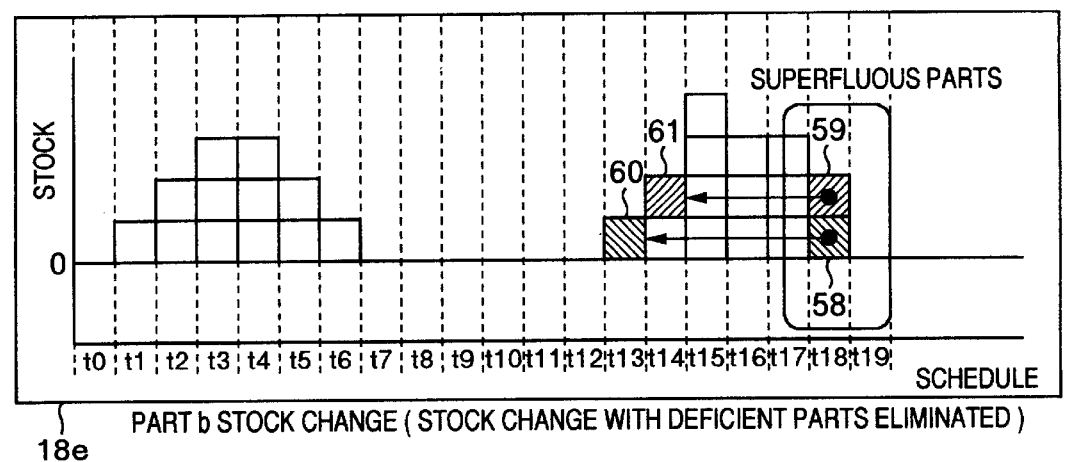
FIG. 18B is a diagram for explaining the change in the stock of eliminated deficient exclusive parts b for which the warehousing plan is applied to the production plan for the product A.

A change in the stock of the part b23 of the product A21 stored in the parts in-stock storage section 4 is shown by "5e" in FIG. 5B, "7e" in FIG. 7B, "9e" in FIG. 9B, "11e" in FIG. 11B, "16e" in FIG. 16B, and "18e" in FIG. 18B, with the abscissa representing the schedule "t0", "t1" . . . , "t19" and the ordinate representing the accumulated total number of the parts in stock equaling to the number of warehoused parts less the number of delivered parts.

Figure 12B:
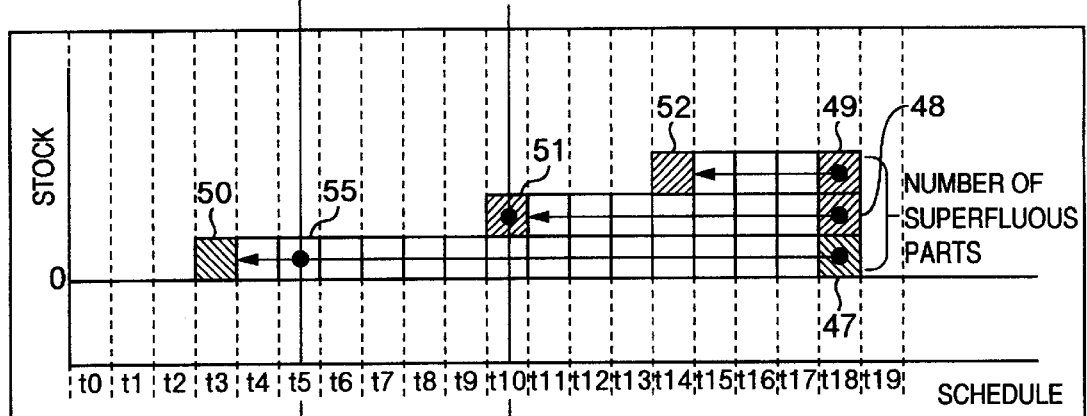
FIG. 12B is the change in the stock of superfluous exclusive parts c for the product B.
Figure 12C:
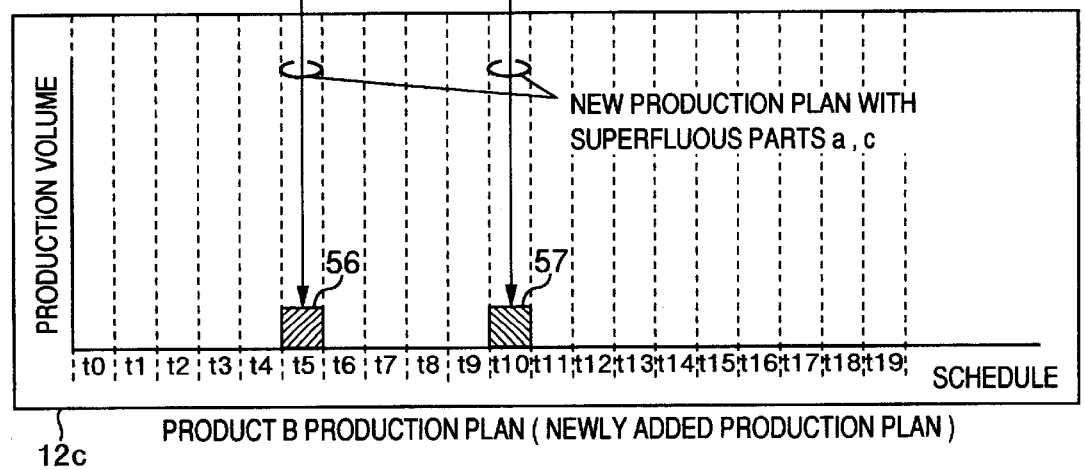
FIG. 12C is a diagram for explaining a new additional production plan for the product B due to superfluous parts.

FIGS. 12A, 12B, 12C are diagrams for explaining an example of elimination of superfluous parts. A change in the superfluous stock of the part a22 calculated from the stock change of the part a22 of the product A21 is shown by "12a" in FIG. 12A and "10c" in FIG. 10c, with the abscissa representing the schedule "t0", "t1" . . . , "t19" and the ordinate representing the accumulated total of the superfluous stock. A change in the superfluous stock of the part c26 of the product B24 is shown by "12b" in FIG. 12B with the abscissa representing the schedule "t0", "t1" . . . , "t19" and the ordinate representing the accumulated total of the superfluous stock. A new production plan of the product B24 is shown by "12c" in FIG. 12C with the abscissa representing the schedule "t0", "t1" . . . , "t19" for placing the parts on the production line and the ordinate representing the number of products produced.

Figure 13A:
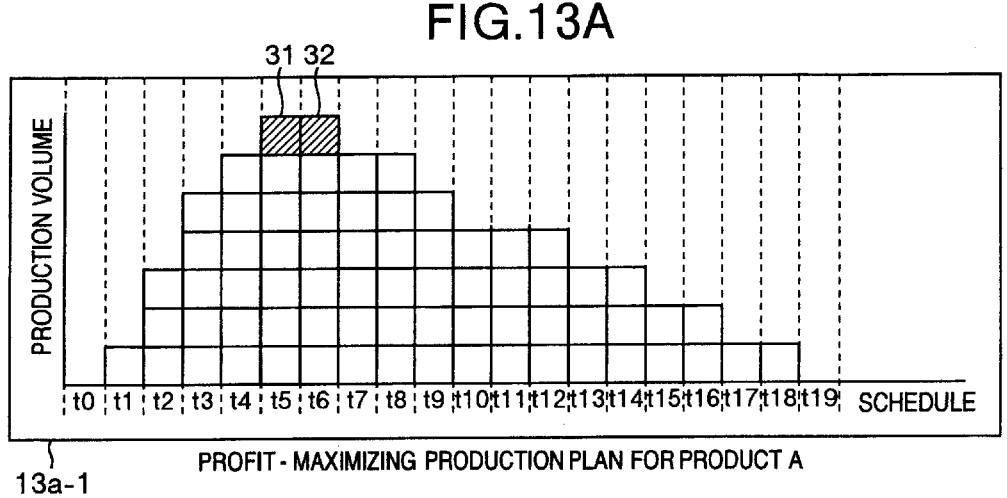
FIG. 13A is a diagram showing a production plan for the product A.
Figure 13B:
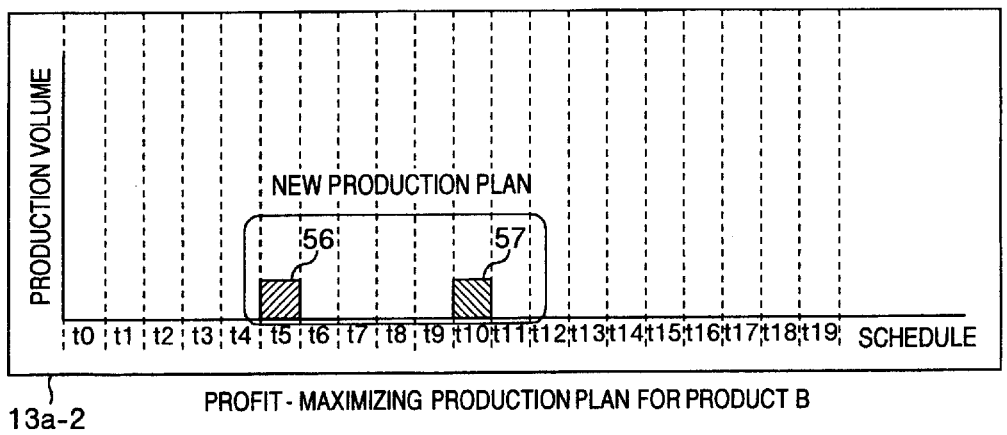
FIG. 13B is a diagram for explaining a profit-maximizing production plan based on the production plan for the product B.
Figure 14A:
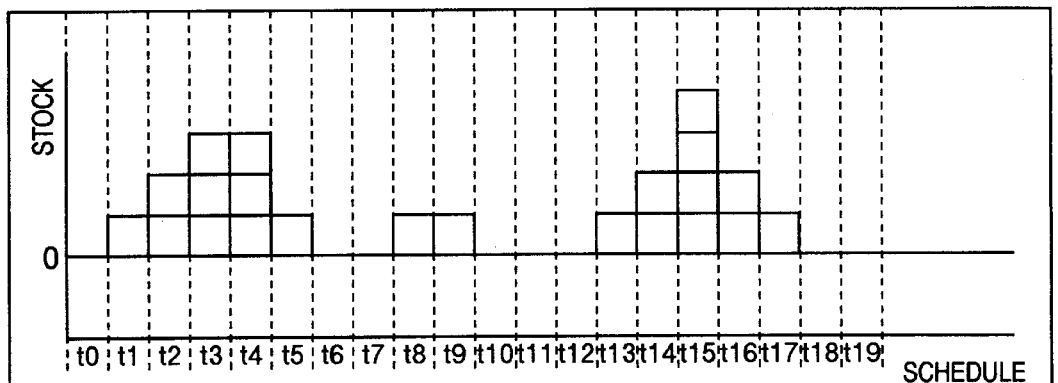
FIG. 14A is a diagram for explaining the change in the stock of the part a at (b-1) after eliminating superfluous parts.
Figure 14B:
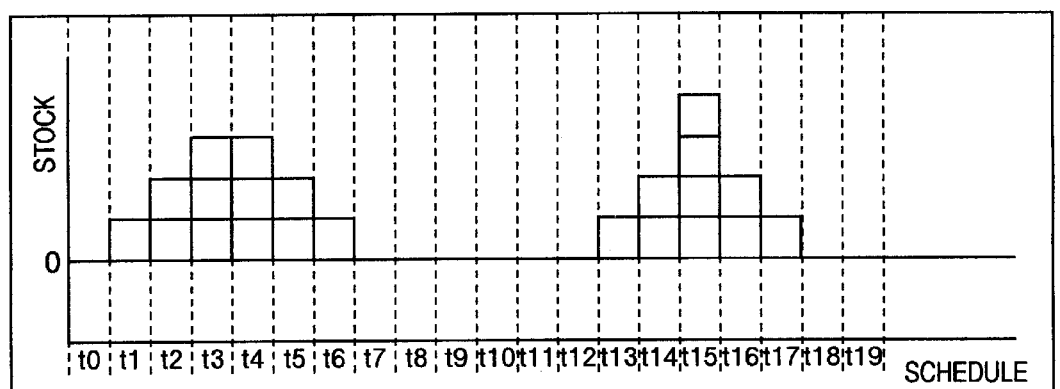
FIG. 14B is a diagram for explaining the change in the stock of the part b at (b-2) after eliminating superfluous parts.
Figure 14C:
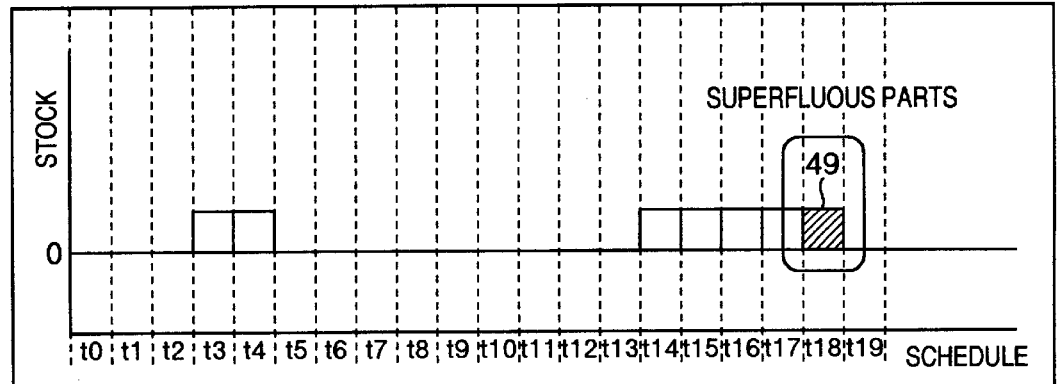
FIG. 14C is a diagram for explaining the change in the stock of the part c at (b-3) after eliminating superfluous parts.

FIGS. 13A and 13B are diagrams for explaining a plan adjusted by the method of eliminating superfluous parts shown in FIGS. 12A to 12C. A production plan of the product A21 is shown by "13-a" in FIG. 13A and a production plan of the product B24 by "13a-2" of FIG. 13B with the abscissa representing the schedule "t0", "t1" . . . , "t19" for placing the parts on the production line and the ordinate representing the number of products produced. A change in the stock of the part a22 is shown by "14b-1" in FIG. 14A, a change in the stock of the part b23 by "14b-2" in FIG. 14B and a change in the stock of the part c26 is shown by "14b-3"

in FIG. 14C, with the abscissa representing the schedule "t0", "t1" ..., "t19" and the ordinate representing the accumulated total of the stock.

Figure 19A:
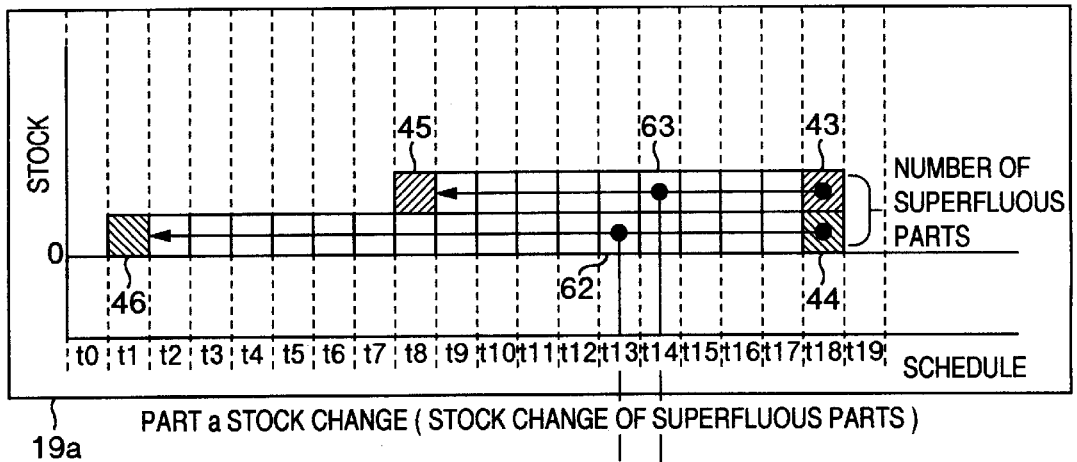
Figure 19B:
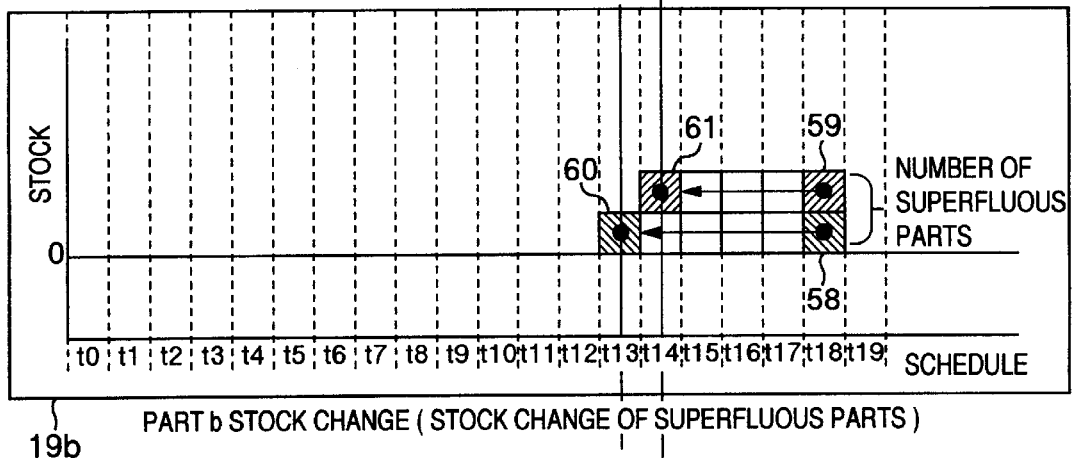
FIG. 19B is a diagram showing the change in the stock of superfluous exclusive parts b of the product A.
Figure 19C:
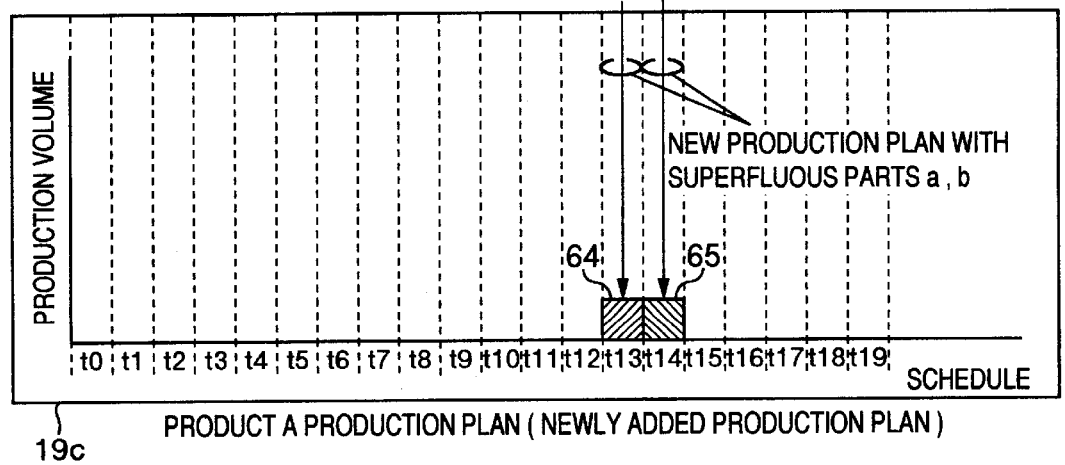
FIG. 19C is a diagram for explaining a new additional production plan for the product A due to superfluous parts.

FIGS. 19A to 19C are diagrams for explaining an example of elimination of superfluous parts. A change in the superfluous stock of the part a22 calculated from the stock change of the part a22 of the product A21 shown by "17c" in FIG. 17C is shown by "19a" in FIG. 19A, with the abscissa representing the schedule "t0", "t1" ..., "t19" and the ordinate representing the accumulated total of the superfluous stock. A change in the superfluous stock of the part b23 of the product A21 shown by "18e" in FIG. 18B is shown by "19b" of FIG. 19B, with the abscissa representing the schedule "t0", "t1" ..., "t19" and the ordinate representing the accumulated total of the superfluous stock. A new production plan of the product A21 is shown by "19c" in FIG. 19C with the abscissa representing the schedule "t0", "t1" ..., "t19" for placing the parts on the production line and the ordinate representing the number of products produced.

Figure 20A:
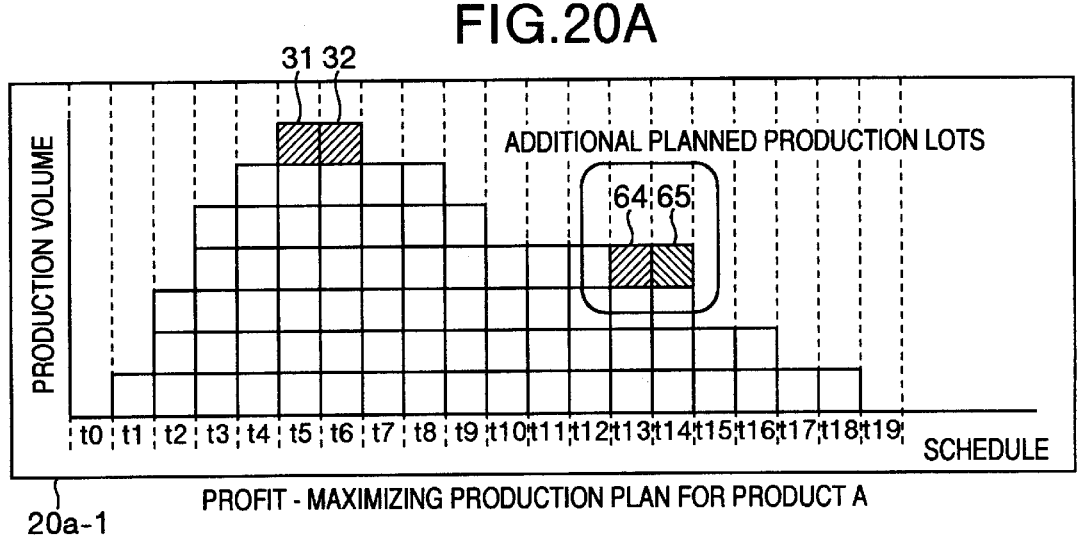
FIG. 20A is a diagram for explaining a production plan for the product A.
Figure 20B:
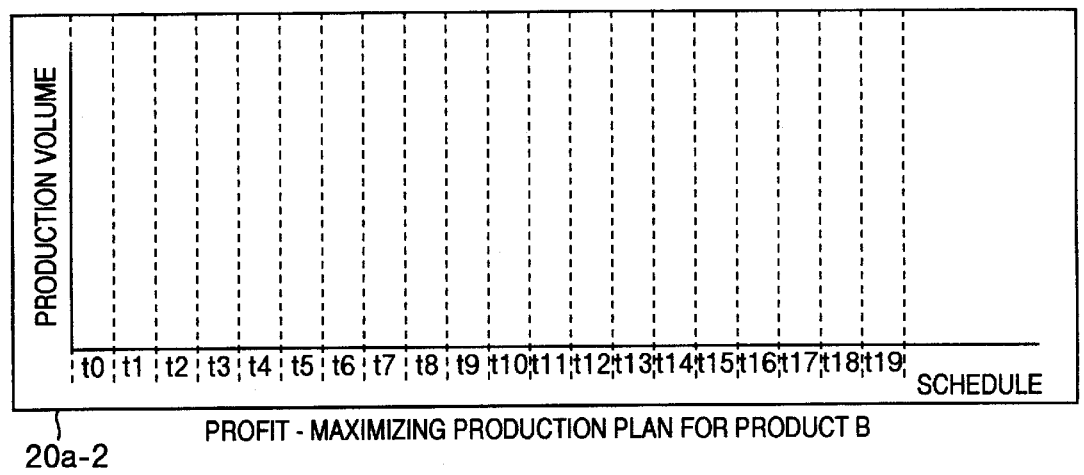
FIG. 20B is a diagram for explaining a profit-maximizing production plan based on the production plan for the product B.

FIGS. 20A and 20B are diagrams for explaining a plan adjusted by the method of eliminating superfluous parts shown in FIGS. 19A to 19C. A profit-maximizing production plan for the product A21 is shown by "20a-1" of FIG. 20A and a profit-maximizing production plan for the product B24 is shown by "20a-2" 1 of FIG. 20B, with the abscissa representing the schedule "t0", "t1" ..., "t19" for placing the parts on the production line and the ordinate representing the number of products produced. A change in the stock after elimination of superfluous stock is shown by "21b-1" in FIG. 21A for the part b22, by "21b-2" of FIG. 21B for the part b23 and by "21b-3" of FIG. 21C for the part b26, with the abscissa representing the schedule "t0", "t1" ..., "t19" and the ordinate representing the accumulated total of the stock.

Figure 22A:
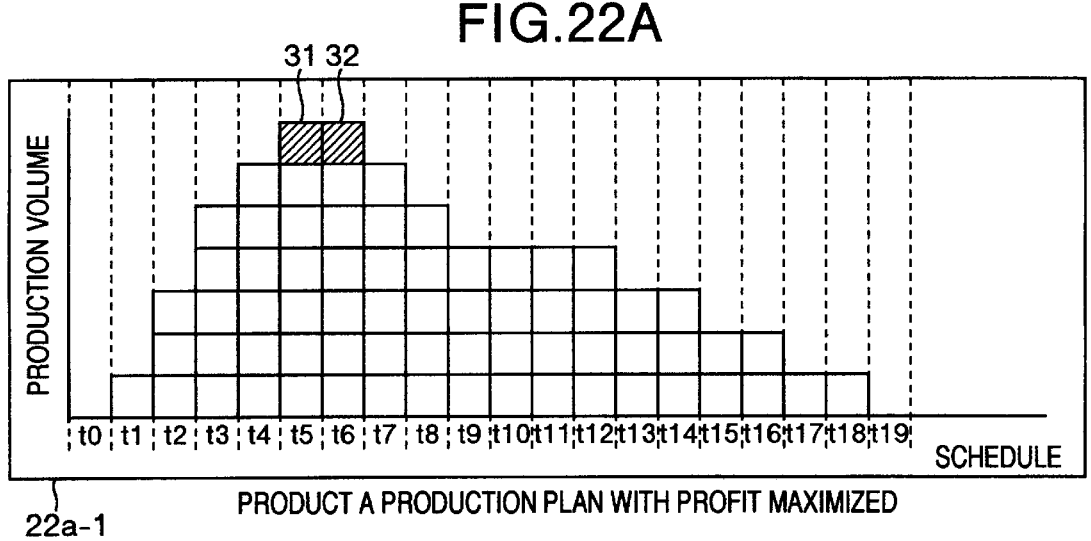
FIG. 22A is a diagram for explaining a production plan for the product A.
Figure 22B:
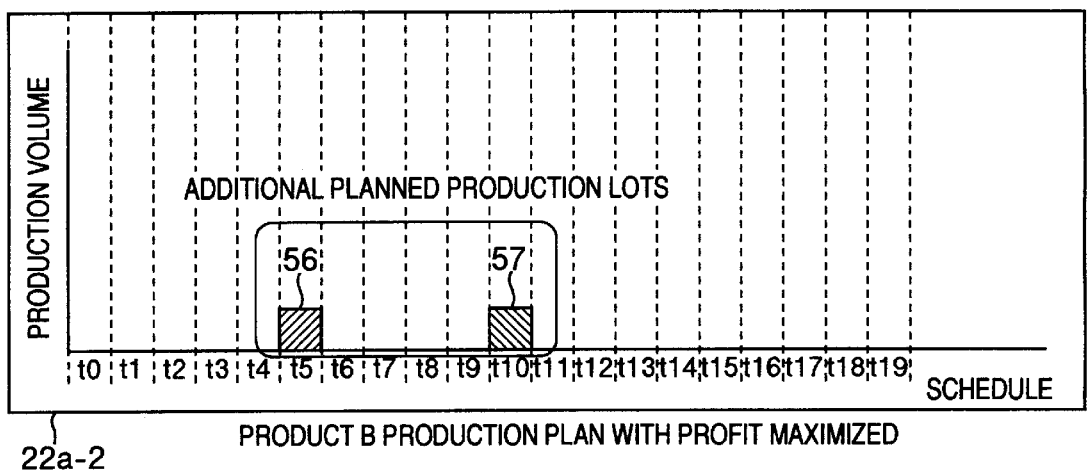
FIG. 22B is a diagram for explaining a profit-maximizing production plan based on the production plan for the product B.

FIGS. 22A and 22B are diagrams for explaining a plan adjusted by the method of eliminating superfluous parts shown in FIGS. 12A to 12C. A profit-maximizing production plan is shown by "22a-1" of FIG. 22A for the product A21 and by "22a-2" of FIG. 22B for the product B24, with the abscissa representing the schedule "t0", "t1" ..., "t19" for placing the parts on the production line and the ordinate representing the number of products produced. A change in the stock after elimination of superfluous stock is shown by "23b-1" in FIG. 23A for the part b22, by "23b-2" of FIG. 23B for the part b23 and by "23b-3" of FIG. 23C for the part c26, with the abscissa representing the schedule "t0", "t1" ..., "t19" and the ordinate representing the accumulated total of the stock.

The change in the parts stock described above can be calculated according to equation (1) as described later. Also, the conditions for making it possible to set the scheduled date of warehousing deficient parts can be determined according to equation (2) as described later.

Now, the adjustment of a production plan by the production planning system according to the invention will be described with reference to the drawings. FIG. 2 and FIGS. 28 to 32 show an algorithm executed by the computer. FIG. 2 shows an outline of the production adjustment method by the production planning system according to the invention, and FIGS. 28 to 32 specific steps of the process thereof.

The production adjustment by the production planning system according to the invention includes, as shown in FIG. 2, a deficient parts adjusting procedure 300 for determining a feasible production plan 15 for the current production plan 1 and a superfluous parts adjusting procedure for determining a profit-maximizing production plan 19 for the feasible production plan 15. In the deficient parts adjusting procedure 300, the process for calculating the amount of material resources for the current production plan 11 (step 12) is executed, and by collating the result thereof with the parts in-stock information and the warehousing schedule information thereby to execute the process for calculating the deficient parts (step 13). Then, the presence or absence of deficient parts is determined (step 301), and in the absence of deficient parts, the current production plan 11 is determined as the feasible production plan 15. In the presence of deficient parts, on the other hand, the deficient parts elimination process is executed (step 14) thereby to determine the feasible production plan 15. In the superfluous parts adjusting procedure 302, in contrast, the process for calculating the amount of material resources is executed for the feasible production plan 15 (step 16), and by collating the result thereof with the parts in-stock information and the warehousing schedule information, the process for calculating the superfluous parts is executed (step 17). The presence or absence of superfluous parts is determined (step 303), and in the absence of superfluous parts, the feasible production plan 15 is determined as the profit-maximizing production plan 19. In the presence of superfluous parts, on the other hand, the process for eliminating the superfluous parts is executed (step 18) thereby to determine the profit-maximizing production plan 19.

Now, the production adjusting process with the data behavior will be explained with reference to FIG. 1. In the description that follows, data are transferred for various processes of the production planning system. This data transfer includes logical data transfer for exchanging data between different programs as well as physical data transfer.

In order to form the initial production plan as the current production plan 11 described above, the production plan forming subsystem 109 described above is used. The production plan forming subsystem 109 has a support function of forming a plan by dialogue with the operator through the input/output unit 104. As shown in FIG. 1, the production plan forming subsystem 109 stores the first production plan in the production storage section 1 of the data storage unit 110 as an initial production plan (numeral 210 in FIG. 1). The production plan as of the time of forming a production plan (schedule "t0") of the product A21 (FIG. 3) is shown by "4a" of FIG. 4A. This initial production plan, if adjusted later, is equivalent to the current production plan 11 of FIG. 2.

The MRP control unit 113 applies a data transfer command to the data storage unit 110 (numeral 200 in FIG. 1). Thus, the initial production plan "4a" stored in the production plan storage section 1 and the parts list information for the product A21 transferred in advance to the parts list from the designing system 102 (numeral 218 in FIG. 1) are transferred to the MRP explosion unit 3 (numerals 220, 221 in FIG. 1). Then, the MRP control unit 113 sends a MRP develop command to the MRP explosion unit 3 (numeral 201 in FIG. 1), causes it to calculate the amount of material resources, followed by sending a data transfer command to the developing unit 3 (numeral 201 in FIG. 1). Thus the result of the calculation of the amount of material resources is transferred to the deficient parts calculation section 6 of the deficient parts adjusting unit 111 (numeral 222 in FIG. 1). It is assumed that all the parts for the production plan formed for the first time are required to be acquired anew).

The MRP control unit 113 applies a data transfer command to the deficient parts adjusting unit 111 (numeral 202 in FIG. 1), and causes the result of calculation of the amount of material resources to be transferred to the deficient parts elimination section 7 from the deficient parts calculation section 6 (numeral 223 in FIG. 1), and further to an external parts acquisition system 103 (numeral 225 in FIG. 1). The parts acquisition system 103 performs the process for consolidating the lots to be purchased based on the calculated amount of material resources received, forms a warehousing plan (4b in FIG. 4B, 5d in FIG. 5A) of the parts a and b required for the production of the product A21, executes the process for purchasing the same, and transfers the warehousing plan to the parts warehousing schedule storage section 5 of the data storage unit 110 of the production planning system 100 (numeral 213 in FIG. 1).

Subsequently, the parts acquisition system 103, upon warehousing of the parts acquired, erases the corresponding data in the parts warehousing schedule storage section 5 (numeral 213 in FIG. 1), and adds the corresponding data to the parts in-stock storage section 4 (numeral 212 in FIG. 1). As of the time of forming the production plan ("t0"), the stock change of the parts a and b predicted from the parts warehousing plans "4b", "5d" of FIGS. 4B and 5A, as seen from "4c" of FIG. 4C and "5e" of FIG. 5B, respectively, is such that although a stock may occur provisionally due to the consolidation of the purchased lots, no deficiency occurs. As of the last scheduled date of the production plan ("t19"), the stock of the parts a22 and b23 is completely depleted and no superfluous parts occur. This is also true of the product B24. A warehousing plan (not shown) for the parts a25 and c26 is formed, and arrangement is made for purchasing the parts, and the information on the parts thus purchased are stored in the parts warehousing schedule storage section 5.

Now, explanation will be given of the operation of the production planning system 100 in adding to the production plan at the time of production plan review (scheduled at "t2"). Assume that orders for the product A21 are coming in smoothly, and that the operator has newly added by way of the input/output unit 104 a planned lot 31 (scheduled at "t5") and a planned lot 32 (scheduled at "t6") to the initial production plan ("4a" of FIG. 4A) using the production plan forming subsystem 109 ("6a" of FIG. 6A).

As in the process steps described above, the MRP control unit 113 applies a data transfer command to the data storage section 110 (numeral 200 in FIG. 1). Thus, the production plan ("6a" of FIG. 6A, 11 in FIG. 2) corrected upward and stored in the production plan storage section 1 and the parts list information of the product A21 previously transferred (numeral 218 of FIG. 1) to the parts list storage section 2 from the designing system 102 are transferred to the MRP explosion unit 3 (numerals 220, 221 in FIG. 1).

Then, the MRP control unit 113 sends a MRP develop command to the MRP explosion unit 3 (numeral 201 in FIG. 1) to calculate the amount of material resources (step 12 in FIG. 2), and then sends a data transfer command to the MRP explosion unit 3 (numeral 201 in FIG. 1). Thus, the result of calculating the amount of material resources is transferred to the deficient parts calculation section 6 of the deficient parts adjusting unit 111 (numeral 222 in FIG. 1). Then, the MRP control unit 113 sends a data transfer command to the data storage unit 110 (numeral 200 in FIG. 1). The initial arts warehousing plan ("4b" in FIG. 4B) for the part a22 and the initial parts warehousing plan ("5d" in FIG. 5A) for the part b23 stored in the parts in-stock storage section 4 and the parts warehousing schedule storage section 5 are transferred to the deficient parts calculation section 6 (numerals 214, 215 in FIG. 1).

The MRP control unit 113 then sends a deficient parts calculate command to the deficient parts adjusting unit 111 (numeral 202 in FIG. 1), and causes the deficient parts calculation section 6 to calculate the number of the deficient parts due to the upward correction of the production plan (step 13 in FIG. 2).

According to the method of calculating the amount of deficient parts, the first step is to calculate the future stock of the part a22 (on and after the scheduled date "t3" of "4c" in FIG. 4C) and the future stock of the part b23 (on and after the scheduled date "t3" of "5e" in FIG. 5B) based on the stock change calculation formula of equation (1) from the current stock of the part a22 (the scheduled date "t2" of "4c" in FIG. 4C) and the current stock of the part b23 (the scheduled date "t2" of "5e" in FIG. 5B) stored in the parts in-stock storage section 4, and the future warehousing plan for the part b22 (on and after the scheduled date "t3" of "4b" in FIG. 4B) and the future warehousing plan for the part b23 (on and after the scheduled date "t3" of "5d" in FIG. 5A) stored in the parts warehousing schedule storage section 5.

$$\text{Stock}(t_n) = \sum_{t=t_0}^{t_n} \text{Warehoused qty}(t) - \sum_{t=t_0}^{t_n} \text{Production plan}(t)$$
$$= \text{Stock}(t_{n-1}) + \text{Warehoused qty}(t_n) - \text{Production plan}(t_n)$$

Then, the deficient parts calculation section 6 is caused to search the future stock change prediction for a negative stock lot below zero (not shown) and detect it as deficient parts. Then, in order to eliminate deficient parts, the MRP control unit 113 sends a deficient parts eliminate command to the deficient parts adjusting unit 111 (numeral 202 in FIG. 1). Thus, the deficient parts data detected above is transferred to the deficient parts elimination section 7 from the deficient parts calculation section 6 (numeral 223 in FIG. 1). In trying to eliminate deficient parts by addition first of all, the deficient parts elimination section 7, in accordance with a predetermined logic of order of priority for the methods of eliminating deficient parts, transmits the number of deficient lots in stock and the time of occurrence of the deficiency to the parts acquisition system 103 and thus requests for an additional acquisition (numeral 225 in FIG. 1).

The parts acquisition system 103, upon receipt of the request for additional acquisition, makes an arrangement for acquiring the parts considering the whole lots to be purchased to assure warehousing of deficient parts on or after delivery time before occurrence of deficiency of the parts involved in such a manner as to meet the condition indicated by the formula of equation (2) permitting the setting of the scheduled deficient parts warehousing date and stores the result of arrangement in the parts warehousing schedule storage section 5 of the data storage unit 110 of the production planning system 100 (numeral 213 of FIG. 1).

Present time $t_n$+Parts delivery time≦Deficient parts scheduled warehousing date≦Date of occurrence of deficient parts. (2)

In response to the rewriting of the parts warehousing schedule storage section 5, the MRP control unit 113 sends a deficient parts calculate command to the deficient parts adjusting unit 111 (numeral 202 in FIG. 1) and causes the deficient parts calculation section 6 to calculate the deficient parts. In accordance with the additional planned lots 31, 32 ("6a" of FIG. 6A), the additional warehousing lots 33, 34 ("6b" of FIG. 6B) of the part a22 and the additional warehousing lots 35, 36 ("7d" of FIG. 7A) of the part b23 are additionally purchased, with the result that any negative stock lot below zero is not detected from the stock change of the part a22 ("6c" of FIG. 6C) and the stock change of the part b23 ("7e" of FIG. 7B). Consequently, the production planning system 100 terminates the procedure for elimination of the deficient parts (step 14 of FIG. 2).

In the description of the embodiment above, the parts warehoused on a given day are allowed to be delivered and placed on the production line on the same day. It is also assumed that the two component parts of each of the products A21 and B24 shown in FIG. 3, respectively, can be placed on the production line at the same time. In the case where the levels of parts hierarchy are so increased that there exist intermediately purchased parts such as an electronic circuit board, the parts warehousing plan should be collated by changing the schedule taking the assembly lead time of each intermediately purchased part into account.

Now, an explanation will be given of the operation of the production planning system 100 in case of a parts warehousing trouble as of the time of production plan review (scheduled date "t4"). Assume that the additional warehoused lots 35 and 36 of the parts b23 newly purchased cannot be warehoused because of a trouble on the part of the parts supplier (FIGS. 8A, 8B, BC, 9A, 9B). The parts b23 to be actually warehoused are short of the required and sufficient amount. The new production plan ("6a" of FIG. 6), therefore, becomes an infeasible production plan ("8a" of FIG. 8A). As in the procedure described above, the MRP control unit 113 sends a data transfer command to the data storage section 110 (numeral 200 in FIG. 1). Thus, the infeasible production plan ("8a" of FIG. 8A, 11 of FIG. 2) stored in the production plan storage section 1 and the parts list information of the product A21 (numeral 218 of FIG. 1) previously transferred to the parts list storage section 2 from the designing system 102 are transferred to the MRP explosion unit 3 (numerals 220, 221 of FIG. 1). Then, the MRP control unit 113 sends a MRP develop command to the MRP explosion unit 3 (numeral 201 of FIG. 1) to calculate the amount of material resources (step 12 in FIG. 2). Then, a data transfer command is sent (numeral 201 of FIG. 1), and the result of the calculation of the amount of material resources is transferred to the deficient parts calculation section 6 of the deficient parts adjusting unit 111 (numeral 222 of FIG. 1). Then, the MRP control unit 113 sends a data transfer command to the data storage unit 110 (numeral 200 in FIG. 1). Thus, the parts warehousing plan to meet the upward correction for the part a22 stored in the parts in-stock storage section 4 and the parts warehousing schedule storage section 5 ("8b" of FIG. 8B) and the plan of warehousing no-warehousing lots of parts ("9d" of FIG. 9A) for the part b23 are transferred to the deficient parts calculation section 6 (numerals 214, 215 of FIG. 1). Then, the MRP control unit 113 sends a deficient parts calculate command (numeral 202 of FIG. 1) to the deficient parts adjusting unit 111 and causes the deficient parts calculation section 6 to calculate the number of parts deficient due to the upward correction of the production plan (step 13 of FIG. 2).

In calculating the amount of deficient parts, the first step is to calculate the future stock of the part a22 (on and after the scheduled date "t3" of "8c" in FIG. 8C) and the future stock of the part b23 (on and after the scheduled date "t3" of "9e" in FIG. 9B) based on the stock change calculation formula of equation (1) from the current stock of the part a22 (the scheduled date "t2" of "8c" in FIG. 8C) and the current stock of the part b23 (the scheduled date "t2" of "9e" in FIG. 9B) stored in the parts stock storage section 4 and the future warehousing plan for the part b22 (on and after the scheduled date "t3" of "8b" in FIG. 8B) and the future warehousing plan for the part b23 (on and after the scheduled date "t3" of "9d" in FIG. 9A) stored in the parts warehousing schedule storage section 5.

From the future stock change prediction thus obtained, the deficient parts calculation section 6 is caused to search for a negative stock lot below zero and detect it as a deficient part.

Figure 29:
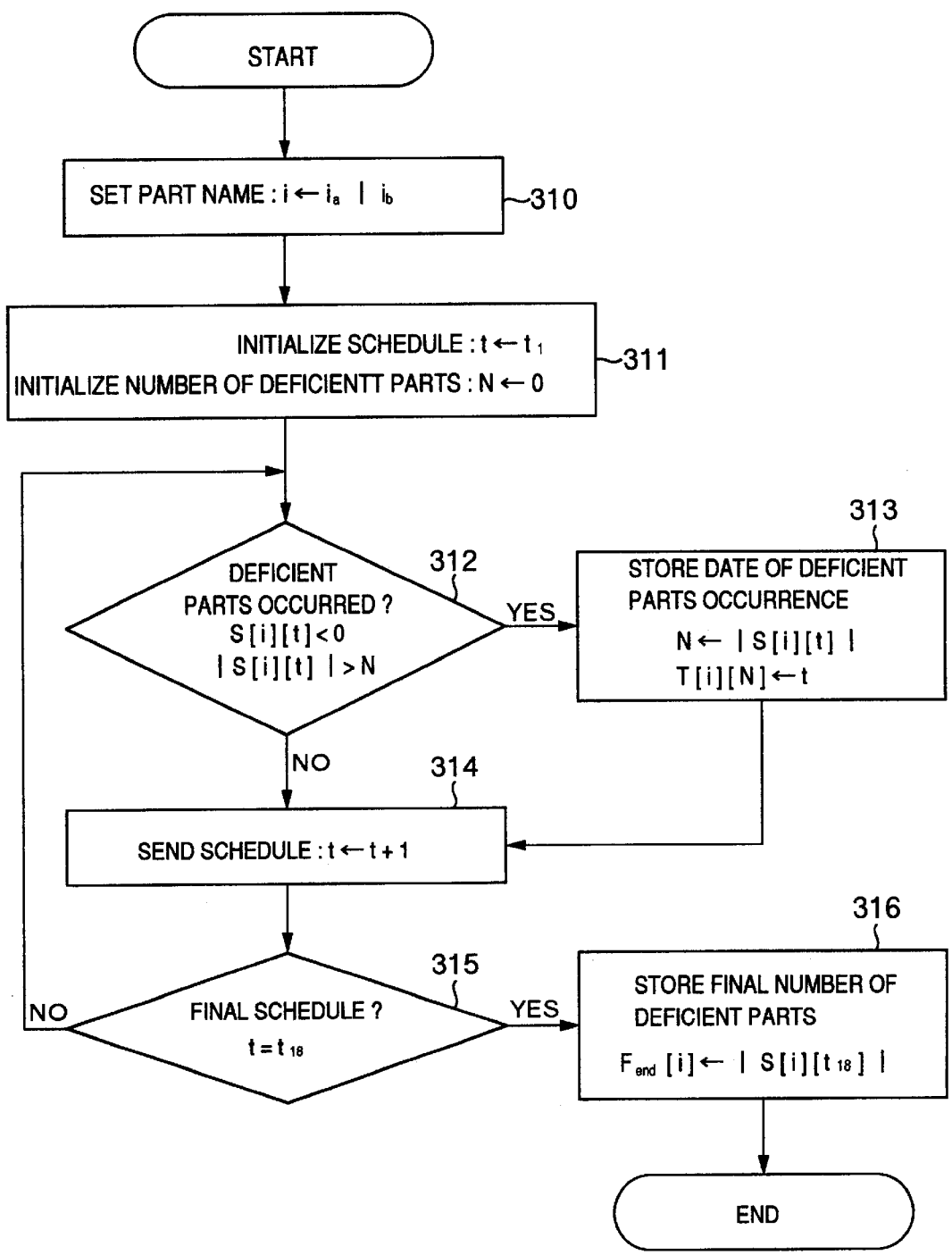
FIG. 29 is a flowchart for explaining an algorithm for detecting deficient parts.

An algorithm for detection of deficient parts is shown in FIG. 29. First, a part name i is set (step 310). Then, the scheduled date t is initialized to "t1", and the accumulated total N of deficient parts is initialized to 0 (step 311). It is determined whether the part i is deficient at the scheduled date t according to whether the parts stock change S is negative or not. Then, it is determined whether or not the scheduled date t is the first day of occurrence of deficiency according to whether the value of the parts stock change S has exceeded the current accumulated total number N of deficient parts (step 312). In the case where it is determined that the scheduled date t is the first day of occurrence of parts deficiency, the accumulated total number N of deficient parts is updated based on the value of the parts stock change S and the date t of occurrence of deficiency is stored in T (step 313).

Then, the scheduled date t is sent to the next day (step 314), and it is determined whether or not the last scheduled date has reached (step 315). If the last scheduled date ("t18" in the case under consideration) is not reached, the determination of the day of occurrence of deficiency is repeated (step 312). In the case where the scheduled date t has reached the last scheduled date, on the other hand, the number of deficient parts as of the last scheduled date is stored as the last number Fend of deficient parts (step 316).

The part a22 is warehoused as scheduled. As shown by "8c" of FIG. BC, therefore, although the consolidation process at the time of purchase causes a provisional stock, no deficiency occurs. The deficient parts calculation section 6, therefore, detects no deficient parts. On the other hand, the warehousing of the additional lots 35, 36 of the part b23 has ceased due to a trouble on the part of the parts supplier. As shown by "9e" of FIG. 9B, therefore, the deficient parts calculation section 6 detects the first deficient stock lot 37 on the scheduled date "t8" (N=|S[b][t8]|=1, T[b][1]=t8). On the scheduled date "t9", the second deficient stock lot 38 is detected (N=|S[b][t9]|=2, T[b][2]=t9). After that, the stock of the part b23 turns positive temporarily on the scheduled date "t15". With the end of production at time "t18", however, two deficient stock lots 39, 40 occur (Fend[b]=|S[b][t18]|=2). Thus, the calculation shows that not only the warehousing of the parts is delayed but the total amount of the parts is deficient.

Since deficient parts have been detected (step 301 of FIG. 2), the next step is for the MRP control unit 113 to send a deficient part eliminate command to the deficient parts adjusting unit 111 (numeral 202 in FIG. 1), and cause the deficient parts data detected as above to be transferred to the deficient parts elimination section 7 from the deficient parts calculation section 6 (numeral 223 in FIG. 1). The deficient parts are eliminated either by a method in which deficient parts are additionally purchased as lots are added for the production plan or by a method in which the production plan is adjusted downward. In the case of additional purchase, the deficient parts elimination section 7 issues a parts acquisition request to the parts acquisition system 103 (numeral 225 in FIG. 1) and thus causes the contents of the parts warehousing schedule storage section 5 to be rewritten (numeral 213 in FIG. 1). In the case where the production plan is adjusted, on the other hand, the contents of the production plan storage section 1 are rewritten (numeral 224 of FIG. 1).

The deficient parts elimination section 7 can sequentially select the methods of elimination in accordance with the priority order logic of a predetermined method of deficient parts elimination, the selection of a method of elimination can be left to the operator through the operation input/output unit 104, or by comparing the costs of the two methods, the cheaper one can be automatically selected. In the above-mentioned example, the deficiency is assumed to be attributable to the warehousing failure of the additional purchase due to the trouble on the part of the supplier. Therefore, the method of downward adjustment of the production plan is employed for elimination of deficient parts (step 14 in FIG. 2).

The deficient parts calculation section 6 detects the occurrence of the first deficient stock lot 37 of the part b23 at scheduled date "t8". The deficient parts elimination section 7, therefore, deletes the planned production lot 41 at scheduled data "t8" for the product A21. Further, in view of the fact that the deficient parts calculation section 6 detects the occurrence of the second deficient stock lot 38 of the part b23 at scheduled date "t9", the deficient parts elimination section 7 deletes the planned production lot 42 at scheduled date "t9" ("10*a*" in FIG. 10A). As a result, the production plan for the product A21 is adjusted downward. The planned production lot can be deleted at any time at or before the scheduled dates "t8", "t9" when a deficiency occurs. By selecting the planned production lots 41, 42 immediately before the occurrence of a deficiency as an object of deletion, however, the product A21 can be manufactured and supplied to the market as early as possible. In addition, the superfluous parts stock can be avoided, though temporarily. As a result, the deficient parts elimination section 7 is preferably programmed to delete the production plan immediately before occurrence of a deficiency.

After that, the MRP control unit 113 sends a data transfer command to the deficient parts adjusting unit 111 (numeral 202 in FIG. 1), and a production plan adjusted downward ("10*a*" in FIG. 10A) is transferred to the production plan storage section 1 of the data storage unit 110. On rewriting of the production plan storage section 1, the MRP control unit 113 sends a command again to the MRP explosion unit 3 and the deficient parts adjusting unit 111 (numerals 201, 202 in FIG. 1), so that the amount of material resources and deficient parts are calculated for the updated data. Since the planned production lots 41, 42 ("10*a*" in FIG. 10A) are deleted, no negative stock lot below zero is detected in the stock change of the part a22 ("10*c*" of FIG. 10A) and the stock change of the part b23 ("11*e*" of FIG. 11B). As a result, the production planning system 100 terminates the procedure for deficient parts elimination (step 14 of FIG. 2). Thus, the feasible production plan 15 (FIG. 2) as converted from the infeasible production plan 11 (FIG. 2) by the deficient parts adjusting procedure 300 (FIG. 2) is left in the production plan storage section 1.

Nevertheless, there occurs superfluous parts a22 as a result of deleting the planned production lots 41, 42 at time point ("t4") of production plan review when the additional warehousing lots 35, 36 of the part b23 are found incapable of being warehoused ("10*c*" of FIG. 10C). Specifically, the parts a22 are held in stock even after discontinuation of the production of the product A21. In spite of the feasibility of the production plan 15, therefore, superfluous parts are left in stock and adversely affect the profits. In view of this, a method will be explained for forming a profit-maximizing production plan by eliminating the superfluous parts stock.

As in the above-mentioned procedure, the MRP control unit 113 sends a data transfer command to the data storage section 110 (numeral 200 in FIG. 1), and the feasible production plan stored in the production plan storage section 110 ("10*a*" of FIG. 10A, step 15 in FIG. 2) and the parts list information for the product A21 that has been transferred from the designing system 102 to the parts list storage section 2 are transferred to the MRP explosion unit 3 (numerals 220, 221 of FIG. 1)

Then, the MRP control unit 113 sends a MRP develop command to the MRP explosion unit (numeral 201 in FIG. 1) and causes the MRP explosion unit 3 to calculate the amount of material resources (numeral 16 in FIG. 2). Then, the MRP control unit 113 sends a data transfer command (numeral 201 in FIG. 1), so that the result of calculation of the amount of material resources is transferred to the superfluous parts calculation section 8 of the superfluous parts adjusting unit 112 (numeral 226 in FIG. 1). Then, the MRP control unit 113 sends a data transfer command to the data storage unit 110 (numeral 200 in FIG. 1). Thus, the parts warehousing plan for upward correction of the part a22 ("10*b*" in FIG. 10B) and the plan for warehousing parts having no-warehousing lots of the part b23 ("11*d*" of FIG. 11A) stored in the parts in-stock storage section 4 and the parts warehousing schedule storage section 5 are transferred to the superfluous parts calculation section 8 (numerals 216, 217 of FIG. 1).

Then, the MRP control unit 113 sends a superfluous parts calculate command to the superfluous parts adjusting unit 112 (203), and thus causes the superfluous parts calculation section 8 to calculate the number of parts that become superfluous by the downward adjustment of the production plan (step 17 in FIG. 2).

In calculating the superfluous parts by the superfluous parts calculation section 8, the first step taken is to calculate the future stock of the part a22 (on and after the scheduled date "t5" of "10*c*" in FIG. 10C) and the future stock of the part b23 (on and after the scheduled date "t5" of "11*e*" in FIG. 11B) based on the stock change calculation formula of equation (1) from the current stock of the part a22 (at the scheduled date "t4" of "10*c*" in FIG. 10C) and the current stock of the part b23 (at the scheduled date "t4" of "11*e*" in FIG. 11B) stored in the parts in-stock storage section 4, and the future warehousing plan for the part b22 (on and after the scheduled date "t5" of "10*b*" in FIG. 10B) and the future warehousing plan for the part b23 (on and after the scheduled date "t5" of "11*d*" in FIG. 11A) stored in the parts warehousing schedule storage section 5.

Then, the superfluous parts calculation section 8 is caused to detect as superfluous parts a positive stock lot above zero as of the last scheduled date "t18" based on the future stock change prediction obtained above.

Figure 30:
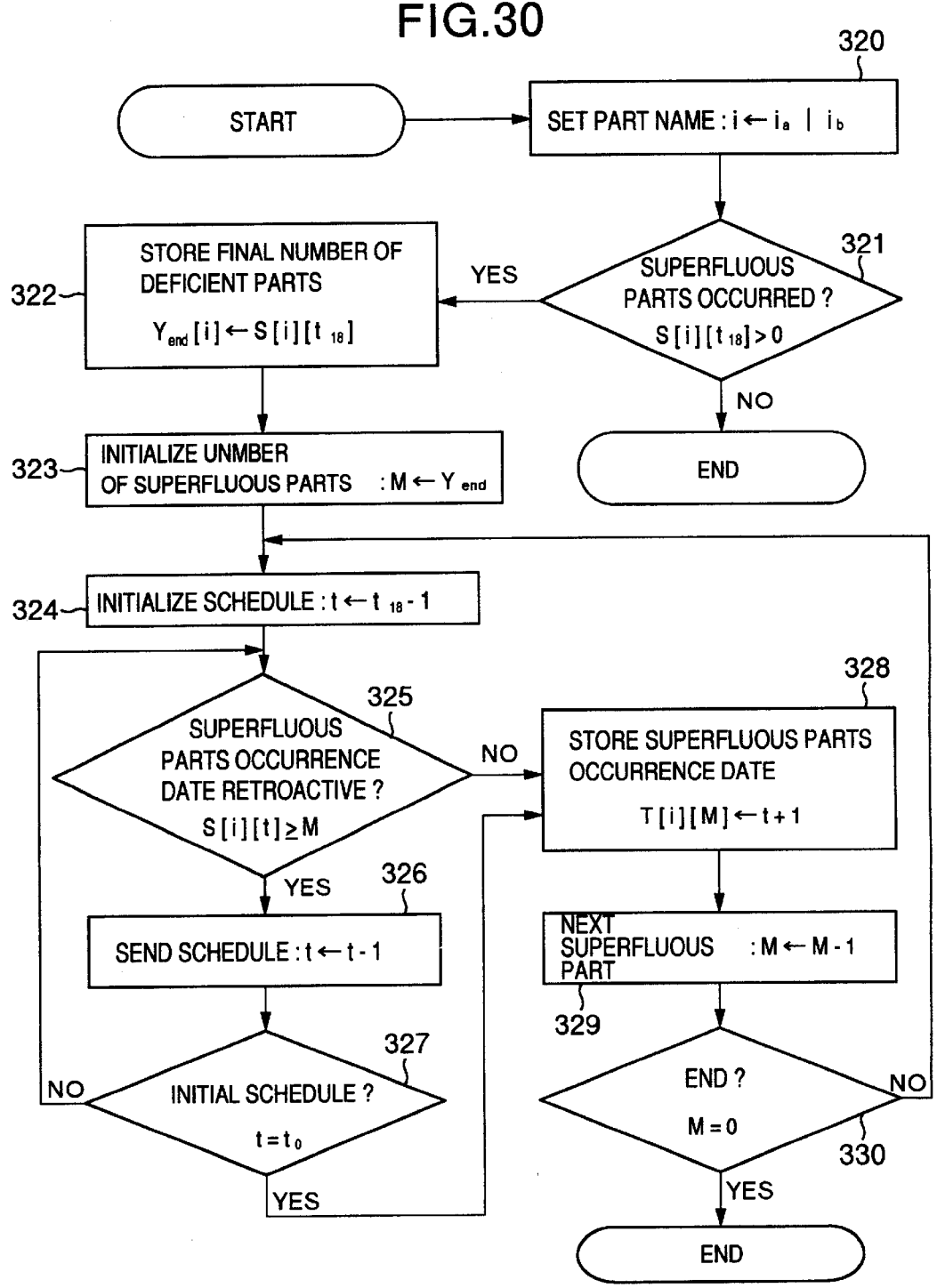
FIG. 30 is a flowchart for explaining an algorithm for detecting superfluous parts.

An algorithm for detecting superfluous parts is shown in FIG. 30. First, the part name i is set (step 320), and it is determined whether or not a superfluous part has occurred at the last scheduled date ("t18" in the case under consideration) according to whether or not the parts stock change S is positive (step 321). Unless superfluous parts have occurred, the process is terminated, while if there are any superfluous parts occurred, the number of superfluous parts as of the last scheduled date is stored as the number of the last superfluous parts Yend (step 322).

Then, in order to search for the date of occurrence of an superfluous part, the number M of superfluous parts is initialized to the number of the last superfluous parts Yend (step 323), and the scheduled date t is initialized to the last scheduled date but one ("t18−1", in the case under consideration) (step 324). Whether or not the date of occurrence of superfluous parts has passed is determined according to whether or not the value of the parts stock change S is reduced below the number of superfluous parts M (step 325). Unless the date of occurrence of superfluous parts is passed, the above-mentioned scheduled date t is traced back to the preceding date (step 326), and the date of occurrence of a superfluous part (step 325) is determined repeatedly. In the case where the scheduled date t has reached the initial scheduled date "t0" (step 327) or in the case where the value of the parts stock change S according to the determination of the superfluous parts occurrence date (step 325) becomes smaller than the number M of superfluous parts, then the current scheduled date t−1 is stored as the date T when a superfluous part has occurred (step 328).

The first date of occurrence of a superfluous part is detected in the above-mentioned way. Then, the number M of superfluous parts is set to M−1 again, and the above-mentioned procedure concerning the date when a superfluous part occurs is repeated starting with the initialization of the scheduled date (step 324), thus the second date of occurrence of a superfluous part is detected. This procedure is repeated for all the superfluous parts, and when M becomes 0 (step 330), the process is terminated.

In view of the fact that the production plan is adjusted downward in order to eliminate the deficiency of the part b23, the part b23, though stocked temporarily due to the lot-wise consolidation at the time of purchase, develops no superfluous parts at the last scheduled date "t18" ("11e" of FIG. 11B). Therefore, the superfluous parts calculation section 8 detects no superfluous parts. For the part a22, on the other hand, the production plan is changed downward, and therefore the superfluous parts calculation section 8 detects two superfluous parts lots 43, 44 at the last scheduled date "t18" ("10c" in FIG. 10C).

Upon detection of the superfluous stock lots 43, 44, the superfluous parts calculation section 8 searches the scheduled dates retroactively to determine the time point when the superfluous stock lots 43, 44 began to occur. As a result, the superfluous stock lot 43 (at scheduled date "t18") can be traced back to the stock lot 45 (at scheduled date "t8"). Thus the stock lot 43 is seen to remain a superfluous stock not consumed from the scheduled date "t8" to the end of production. The superfluous stock lot 44 (at scheduled date "t18"), on the other hand, can be traced back to the stock lot 46 (at scheduled date "t1") and seen to remain a superfluous stock not consumed from the scheduled date "t1" to the end of production at "t18".

Since a superfluous part is detected (303 in FIG. 2), the MRP control unit 113, in order to eliminate the superfluous part, sends a superfluous part eliminate command to the superfluous part adjusting unit 112 (numeral 203 in FIG. 1), and causes the detected superfluous part data to be transferred to the superfluous part elimination section 9 from the superfluous part calculation section 8 (numeral 227 in FIG. 1). There are two methods of eliminating superfluous parts, one by cancelling the purchase of superfluous parts and the other by adjusting the production plan upward. In the case where the purchase is cancelled, the superfluous parts elimination section 9 issues a purchase cancellation request to the parts acquisition system 103 (numeral 229 in FIG. 1) thereby to rewrite the contents of the parts warehousing schedule storage section 5 (numeral 213 in FIG. 1). In the case where the production plan is adjusted, on the other hand, the contents of the production plan storage section 1 are rewritten (numeral 228 in FIG. 1). The superfluous parts elimination section 9 may sequentially select the methods of eliminating the superfluous parts in accordance with a predetermined priority logic, or can leave the selection of a method of elimination to the operator through the operation input/output unit 104. As another alternative, the two elimination methods can be compared and the inexpensive one can be automatically selected. The description that follows refers to the case in which the production plan is adjusted assuming that the purchase cannot be cancelled.

The superfluous parts elimination section 9 extracts the change in the superfluous stock ("12a" of FIG. 12A) not used for the product A21 from the stock change of the parts a22 shown by "10c" of FIG. 10C. This can be determined from the last number of superfluous parts Yend[a]=S[a][t18] (step 322) and the dates of occurrence of superfluous parts T[a][2]=[t8] and T[a][1]=[t1] (step 328) detected by the superfluous parts detection algorithm (FIG. 30) described above. Also assuming that a superfluous stock of the part c26 of the product B24 exists, the change in superfluous stock extracted by the superfluous parts elimination section 9 is shown by "12b" of FIG. 12B. As in the case of the superfluous part a22 described above, the superfluous parts calculation section 8 detects superfluous parts c26 and searches for the time point of occurrence of the superfluous parts. As a result, the three stock lots 47, 48, 49 of the part c26 are seen to be superfluous at the last scheduled date "t18". The superfluous stock lot 47 is seen to be derived from the stock lot 50 of "t3", the superfluous stock lot 48 from the stock lot 51 of "t10", and the superfluous stock lot 49 from the stock lot 52 of "t4".

Then, the superfluous parts elimination section 9 searches for a superfluous stock lot in which the superfluous stock of the part a22 ("12a" of FIG. 12A) and the superfluous stock of the part c26 ("12b" of FIG. 12B) first double at or subsequent to the time of the production plan review ("t4").

Figure 31:
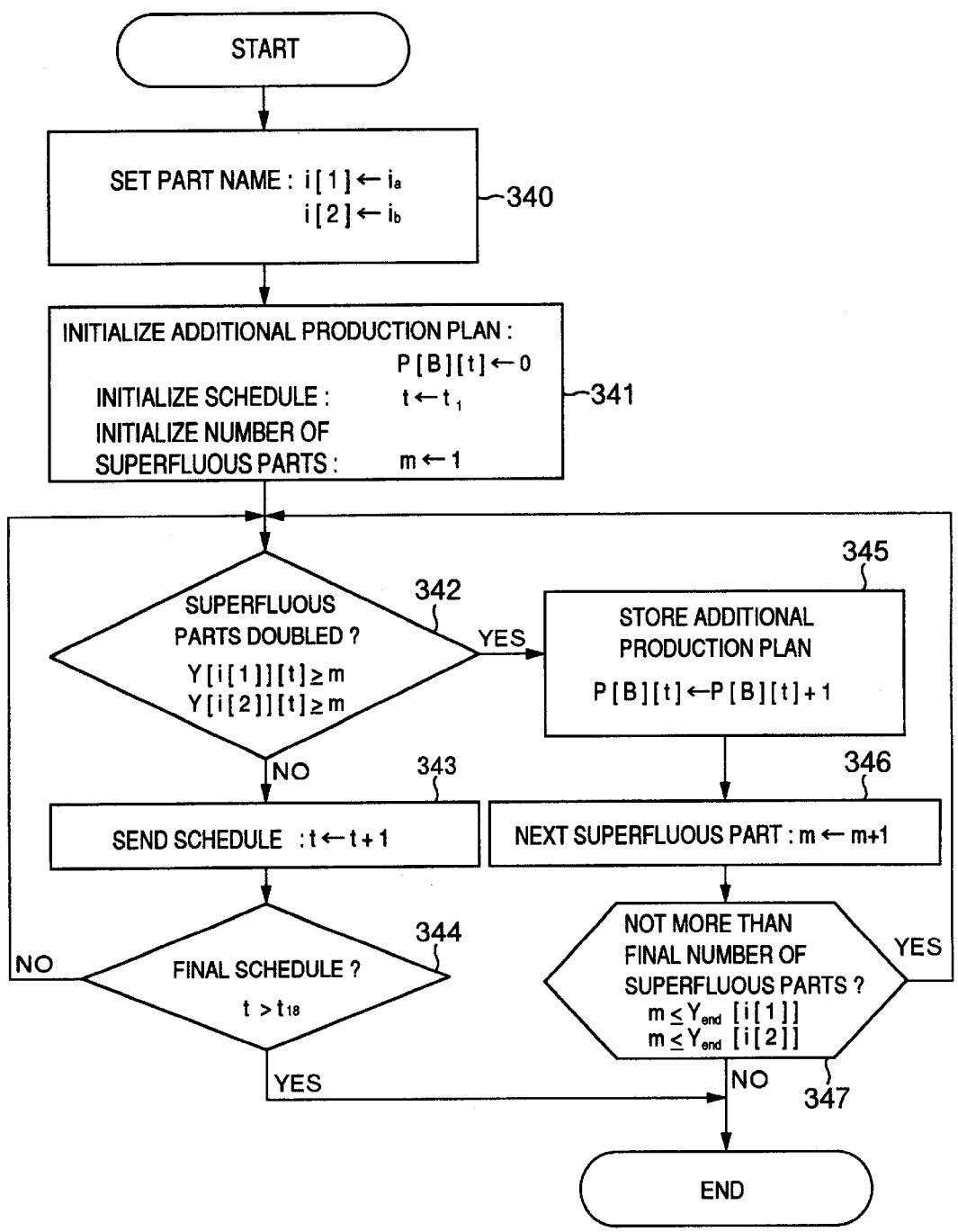
FIG. 31 is a flowchart for explaining an algorithm for detecting an additional production plan.

An algorithm for detecting an additional planned lot is shown in FIG. 31. First, the part names a and c are set in i[1] and i[2] (step 340). Then, in order to search for the date of doubling of superfluous parts and to add to the production plan, the additional production plan P is initialized to 0, the scheduled date t is initialized to the initial scheduled date "t1", and the number m of superfluous parts is initialized to the initial value of 1 (step 341).

Next, it is determined whether the superfluous parts i[1] and i[2] double at the current scheduled date t according to whether or not the change in superfluous stock Y[i[1]][t] and Y[i[2]][t] is not less than the number m of superfluous parts (step 343). In the case where the superfluous parts are not doubled, the scheduled date t is postponed to the next date (step 343) thereby to determine whether or not the last schedule date "t18" is passed (step 344). In the case where the last scheduled date "t18" is not passed, the determination as to the doubling of superfluous parts (step 342) is repeated. In the case where superfluous parts are doubled as determined at step 342, the additional production plan P for the product B24 at the current scheduled date t is increased by one lot (step 345).

In the foregoing description, the number of the parts a25 and c26 for the product B24 is assumed to be unity. In the case where the number is other than unity, however, the number of superfluous parts divided by the number of parts can be used as the number of superfluous parts lots. The above-mentioned algorithm, therefore, applies effectively in general terms.

Then, the number m of superfluous parts is increased by one lot (step 346), the process is returned to the determination as to the doubling of superfluous parts (step 342), and thus the next additional planned lot is searched for. In the process, if the number m of superfluous parts exceeds the final number Yend of superfluous parts, the above-mentioned algorithm for detection of the additional planned lot is terminated.

As a result of the detection of the additional planned lot described above, the superfluous parts elimination section 9 detects that the superfluous stock lot 53 of the part a22 and the superfluous stock lot 55 of the part c26 are doubled with each other at the scheduled date "t5" and that the superfluous stock lot 54 of the part a22 and the superfluous stock lot 51 of the part c26 are doubled with each other at the scheduled date "t10". Specifically, it is found that a new production plan can be formed for the product B24 by using the part a22 of the product A21 which is used in common as the part a25 of the product B24. The production according to the additional production plan can be carried out any time at or subsequent to "t5", "t10" when superfluous parts are doubled. If the planned production lots 56, 57 for which superfluous parts are doubled first are selected for additional production, the product B24 can be produced and marketed as early as possible before schedule. Also, the superfluous parts stock can be eliminated at an early time. For this reason, it is recommended that the superfluous parts elimination section 9 is programmed for forming an additional production plan at a scheduled date when superfluous stock lots are doubled for the first time. As a result of the above-described superfluous parts elimination process 18 (FIG. 2) by the superfluous parts elimination section 9, a first planned production lot 56 can be produced at the scheduled date "t5" and a second planned production lot 57 at the scheduled date "t10" according to a new production plan for the product B24.

After that, the MRP control unit 113 sends a data transfer command to the superfluous parts adjusting unit 112 (numeral 203 in FIG. 1), and transfers an upward-adjusted production plan ("13a-1" in FIG. 13A and "13a-2" in FIG. 13B) to the production plan storage section 1 of the data storage unit 110. Upon rewriting of the production plan storage section 1, the MRP control unit 113 again sends a command to the MRP explosion unit 3 and the superfluous parts adjusting unit 112 (numerals 201, 203 in FIG. 1) to calculate the amount of material resources and superfluous parts for the updated data.

Since the planned production lots 56, 57 ("13a-2" of FIG. 13) are additionally produced, a positive stock lot above zero is not detected at the last scheduled date "t18" in the stock change of the part a22 ("14b-1" of FIG. 14A) and the stock change of the part b23 ("14b-2" of FIG. 14B). At the last scheduled date "t18" in the stock change of the part c26 ("14b-3" in FIG. 14C), on the other hand, only one lot 49 is detected as a positive stock lot above zero. The superfluous stock cannot be reduced any more, and therefore the production planning system 100 terminates the superfluous parts elimination procedure (step 18 in FIG. 2).

The production plan 19 (FIG. 2) converted from the feasible production plan 15 (FIG. 2) left in the production plan storage section 1 by the superfluous parts adjusting procedure 302 (FIG. 2) is called a profit-maximizing production plan 19 in the sense that the parts stock has been reduced as far as possible. The profit-maximizing production plan 19 is transferred to the production system 101 at predetermined cycles (numeral 219 in FIG. 1) and used for carrying out the production.

In the above-mentioned example, the planned production lots 41, 42 ("10a" in FIG. 10A) of the product A21 are cancelled in order to eliminate the deficiency of the part a23 ("9e" in FIG. 9B) due to the impossibility of warehousing the additional lots 35, 36 of the part b23. As another example, a method of forming the feasible production plan 15 and the profit-maximizing production plan 19 will be explained, in which the additionally warehousing scheduled lots 35, 36 cannot be warehoused at scheduled warehousing dates "t7", "t8" but can be warehoused if delayed to "t16", "t17" ("16d" in FIG. 16A). In such a case, the total amount warehoused before the scheduled production completion date "t18" for the part b23 is sufficient for the production of the product A21, and therefore the stock is zero as of the scheduled production completion date "t18" ("16e" in FIG. 16B).

Since the scheduled warehousing of the lots 35, 36 of the part b23 is delayed, however, the first stock lot of the part b23 becomes deficient at "t8", and the second stock lot 38 becomes deficient at date "t9". The production plan for the product A21, therefore, becomes an infeasible production plan. What is needed first of all is to execute the deficient parts adjusting procedure 300 by the deficient parts elimination section 7. Unless the feasible production plan 15 converted from the infeasible production plan 11 as a result of the execution of the procedure 300 is analyzed, it cannot be determined whether or not superfluous parts occur or what kinds of how many superfluous parts occur. Since the scheduled warehousing of the lots 35, 36 of the part b23 is delayed, as in the cancellation of the planned production lots 41, 42 in "10a" of FIG. 10A, the planned production lots 41, 42 of the product A21 is cancelled ("17a" in FIG. 17A) at the scheduled dates "t8" and "t9" by the deficient parts elimination section 7 taking the deficient parts elimination procedure 14 in accordance with the deficient stock lots 37, 38 ("16e" of FIG. 16B) of the part b23 calculated according to the deficient parts calculation procedure 13 by the deficient parts calculation section 6. The feasible production plan 15 obtained as a result of this procedure is searched according to the superfluous parts calculation procedure 17 by the superfluous parts calculation section 8. Thus, the occurrence of two superfluous parts lots 58, 59 ("18e" in FIG. 18B) of the part b23 at the scheduled production completion date "t18" is detected. Similarly, as for the part a22, like "10c" of FIG. 10C, two superfluous parts lots 43, 44 ("17c of FIG. 17C) are detected to occur at the scheduled production completion date "t18".

That superfluous stock not used for the product A21 due to the stock change of the part a22 shown in "17c" of FIG. 17C which has been extracted by the superfluous parts calculation section 8 is shown in "19a" of FIG. 19A. Also, the superfluous stock not used for the product A21 due to the stock change of the part b23 shown in "18e" of FIG. 18B and extracted by the superfluous parts calculation section 8 is shown in "19c" of FIG. 19B. Only two stock lots 58, 59 are superfluous as of the scheduled date "18t" for the part b23. Retroactive search by the superfluous parts calculation section 8 detects that the superfluous stock lot 58 is derived from the stock lot 60 as of "t23" and the superfluous stock lot 59 is derived from the stock lot 61 as of "t14".

As a result of search by the superfluous parts elimination section 9 for an superfluous stock lot in which the superfluous stock of the part a22 ("19a" of FIG. 19A) doubles with the superfluous stock of the part b23 ("19b" of FIG. 19B) for the first time at and after the production plan review time point ("t4"), it is detected that the superfluous stock lot 62 of the part a22 doubles with the superfluous stock lot 60 of the part b23 at the scheduled date "t13" and that the superfluous stock lot 63 of the part a22 doubles with the superfluous stock lot 61 of the part b23 at the scheduled date "t14". Therefore, the first planned production lot 64 and the second planned production lot 65 alone can be additionally produced at the scheduled dates "t13" and "t14", respectively, as an additional production plan of the product A21 and can be stored in the production plan storage section 1 by the superfluous parts elimination section 9 according to the superfluous parts elimination process 18 described above. In the process, the profit-maximizing production plan 19 stored in the production plan storage section 1 is shown in "20a-1" of FIG. 20A and "20a-2" of FIG. 20B, and the stock change of each part in "21b-1 of FIG. 21A, "21b-2" of FIG. 21B and "21b-3" of FIG. 21C.

On the other hand, the profit-maximizing production plan 19 stored in the production plan storage section 1 in the case where the superfluous parts elimination procedure 302 similar to the one for adding a new production plan for the product B24 shown in FIG. 12C is shown in "22a-1" of FIG. 22A and "22a-2" of FIG. 22B. The stock change of each part in such a case is shown in "23b-1 of FIG. 23A, "23b-2" of FIG. 23B and "23b-3" of FIG. 23C.

Figure 32:
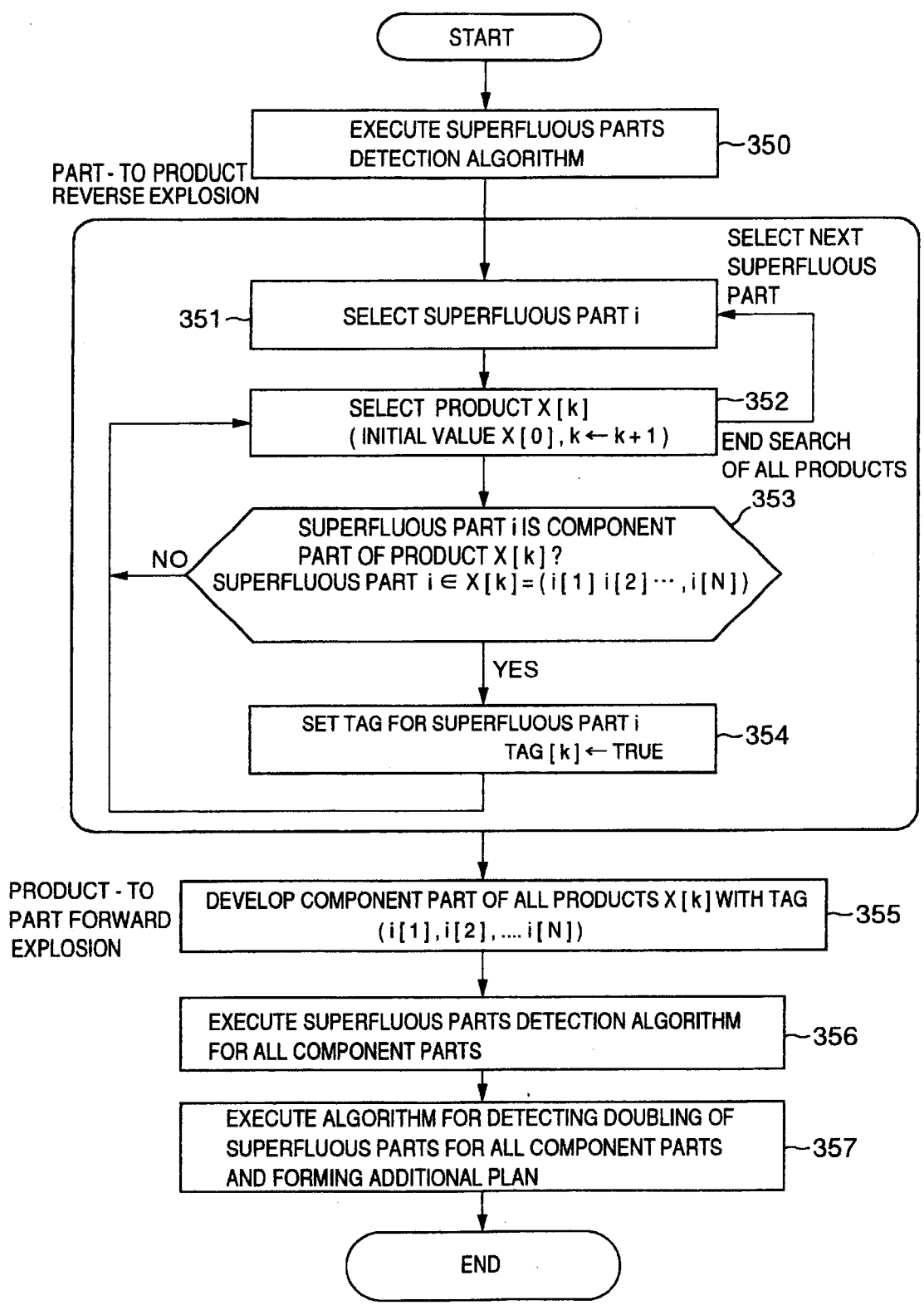
FIG. 32 is a flowchart for explaining an algorithm for listing candidates of an additional production plan.

As described above, in the case where an additional production plan is formed using superfluous parts, the superfluous parts may be shared by a plurality of products. In view of this, an algorithm for searching for candidates of all additional products is shown in FIG. 32.

First, as described above, assume that the production plan for a given product is cancelled to eliminate deficient parts. The superfluous parts detection algorithm shown in FIG. 30 is executed to determine component parts of the cancelled product which have been purchased and constitutes a superfluous stock (step 350). Then, one of the superfluous parts is selected (step 351) and one of the products is selected (step 352). It is determined whether or not the selected superfluous part i is included in the component parts of the selected product X (step 353). If not, the next product is selected, and the above-mentioned part-determining step (step 353) is repeated. In the case where the determination of a component part (step 353) shows that the selected part i is included in the component parts of the product X, a superfluous part-in-use tag is set (step 354). Upon complete search of all the products for the selected superfluous part i, the next superfluous part is selected (step 351) and the above-mentioned collation with the product is repeated. The process including the part selection step 351, the product selection step 352, the component part determination step 353 and the superfluous part-in-use tag setting step 354 is a product-to-part development and considered reverse to a part-to-product development.

After the reverse development for a product, the component parts of all the products carrying the superfluous part-in-use tag are determined by development (step 355). The superfluous part detection algorithm shown in FIG. 30 is executed for all the component parts thus developed (step 356). Further, the additional production plan forming algorithm shown in FIG. 31 is executed for all the superfluous parts detected among all the component parts developed (step 357).

The product candidates that can be additionally produced can be listed by the above-mentioned algorithm for searching for all the additional products. The rest, therefore, is to select an additional production plan using an appropriate evaluation index.

Figure 21A:
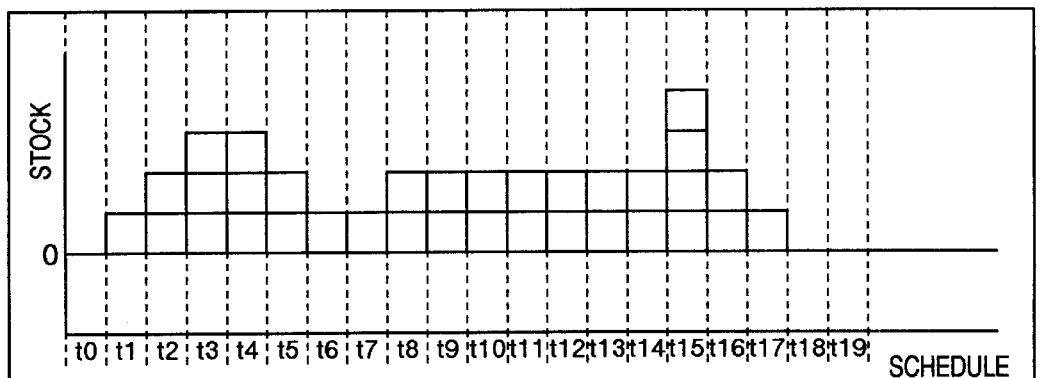
FIG. 21A is a diagram for explaining the change in the stock of the part a after eliminating superfluous parts.
Figure 21B:
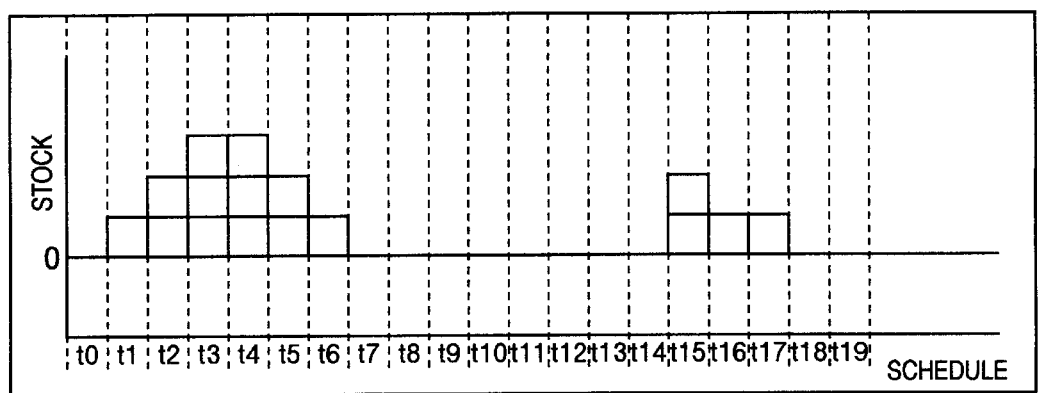
FIG. 21B is a diagram for explaining the change in the stock of the part b after eliminating superfluous parts.
Figure 21C:
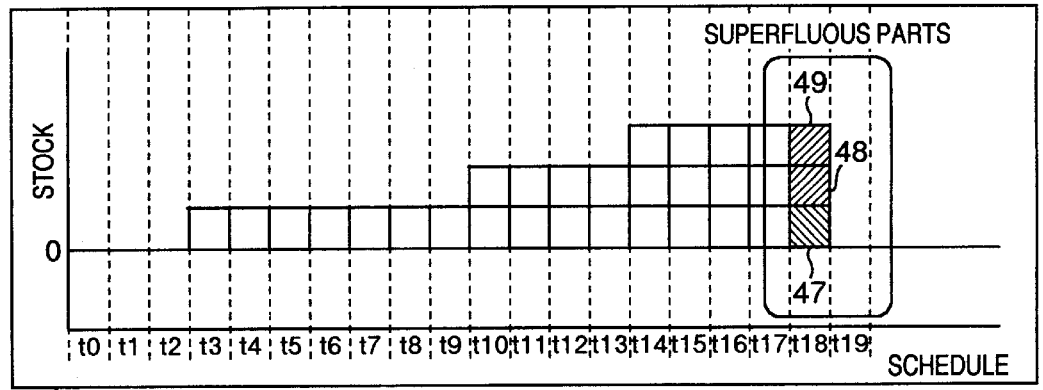
FIG. 21C is a diagram for explaining the change in the stock of the part c after eliminating superfluous parts.
Figure 23A:
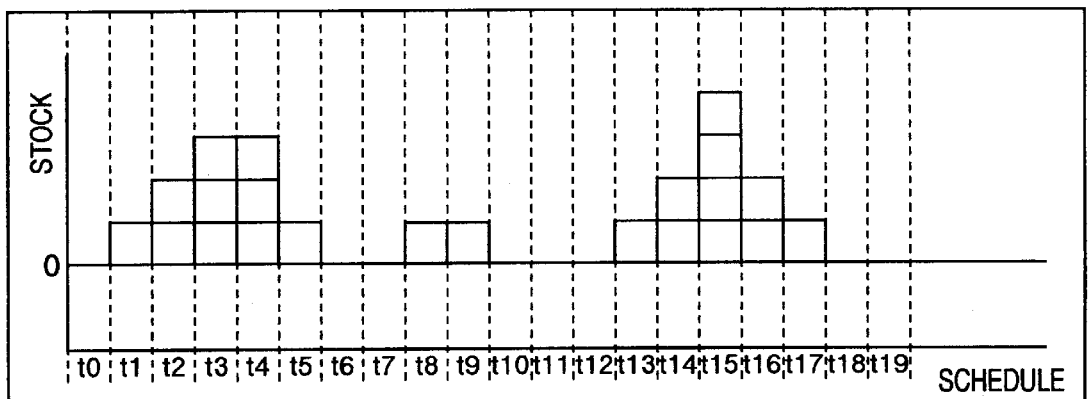
FIG. 23A is a diagram for explaining the change in the stock of the part a after eliminating superfluous parts.
Figure 23B:
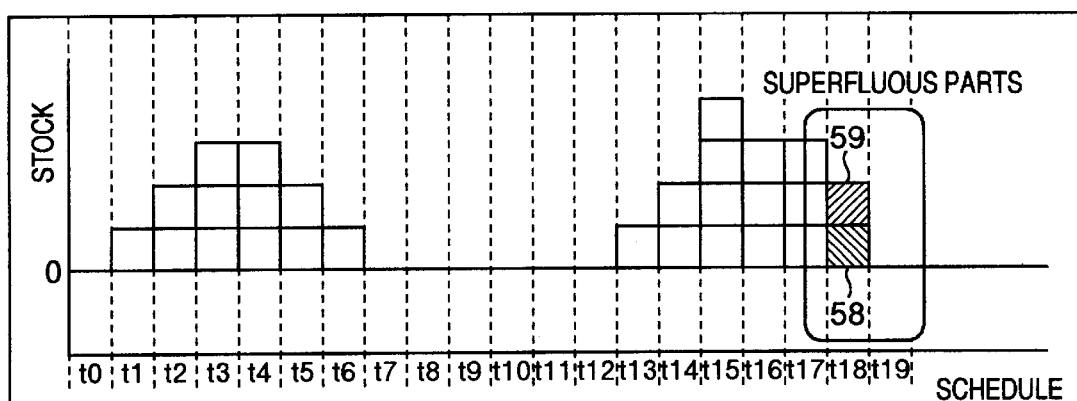
FIG. 23B is a diagram showing the change in the stock of the part b after eliminating superfluous parts.
Figure 23C:
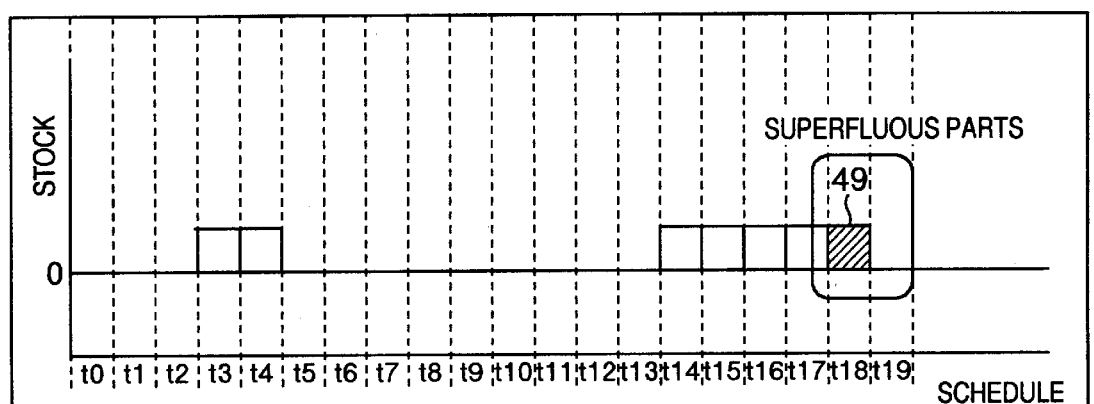
FIG. 23C is a diagram for explaining the change in the stock of the part c after eliminating superfluous parts.

The final number of superfluous parts is three parts c22 in the case of FIG. 20A with the production plan added for the product A21 (FIG. 21C). In FIG. 22B with the production plan added for the product B24, on the other hand, two parts b23 and one part c26 are involved (FIGS. 23B and 23C). Assume that the part a is one with a short delivery time and that it can be warehoused by the final production completion date "t18" if purchased at the production plan review time point "t4". If three additional parts a are purchased, three additional products B24 can be produced in the case where three parts c26 are superfluous as shown in FIG. 21A. In the case where two parts b23 and one part c26 are superfluous as shown in FIGS. 23B, 23C, on the other hand, two products A21 and one product B24 can be additionally produced, in both of which cases no superfluous parts occur (not shown).

As described above, in the case where component parts of a given product are partially superfluous, the superfluous parts adjusting unit 112 is provided with the function to determine whether or not deficient parts can be additionally purchased for an additional production plan. In this way, in the case where additional purchase is possible, the MRP control unit 113 updates the contents of the production plan storage section 1 while at the same time requesting the parts acquisition system to purchase the deficient parts additionally. Once the request is granted, the contents of the parts warehousing schedule storage section 5 are updated. Thus, still more superfluous parts can be advantageously eliminated.

As shown in "20a-1" of FIG. 20A, assume that the additional planned production lots 64, 65 are added to the production plan for the product A21. As shown in "21b-3" of FIG. 21C, only three stock lots 47, 48, 49 of the part c26 remain as superfluous parts. Assume, on the other hand, that as shown in "22a-2" of FIG. 22B, the part a25 of the product B24 is diverted from the part a22 of the product A21, and the part c26 of the product B24 is assigned from the stock, and the additional planned production lots 56, 57 are added to the production plan for the product B24. As shown in "23b-3" of FIG. 23C, one stock lot 49 of the part c26 shown in "23b-3" and two stock lots 58, 59 of the part b23 shown in "23b-2" remain superfluous.

As described above, in the case where a plurality of superfluous parts elimination methods are available for selection, the superfluous parts adjusting unit 112 is preferably provided with the function of comparing and evaluating the costs of a plurality of the superfluous parts elimination methods and selecting a most inexpensive method for forming the profit-maximizing production plan 19.

Take the price of the superfluous parts as an example of the evaluated cost. In the case where the product A21 is additionally produced (FIG. 20A), the evaluated cost is given by equation (3) from FIG. 21A.

$$\text{Evaluated cost } (A) = \text{Price of superfluous parts } (A) \qquad (3)$$
$$= 3 \times \text{unit price of part } c$$

In the case where the product B24 is newly produced (FIG. 22B), the evaluated cost is given by equation (4) below from FIG. 23B.

$$\text{Evaluated cost } (B) = \text{Price of superfluous parts } (B) \qquad (4)$$
$$= 2 \times \text{unit price of part } b +$$
$$= 1 \times \text{unit price of part } c$$

Also, in the case where the sales profits are different between the product A21 and the product B24, the evaluated cost is determined by subtracting the sales profits from the evaluated cost as shown in equations (5) and (6) below.

$$\text{Evaluated cost } (A) = \text{Price of superfluous parts } (A) - \qquad (5)$$
$$\text{sales profits of product } A$$

-continued $$\text{Evaluated cost }(B) = \text{Price of superfluous parts }(B) - \quad (6)$$
$$\text{sales profits of product } B$$

In the case where the products are produced not on custom order basis but on anticipated sales basis, the expected sales price is introduced to obtain the evaluated cost as shown in equations (7) and (8).

$$\text{Evaluated cost }(A) = \text{Price of superfluous parts }(A) - \quad (7)$$
$$\text{sales profits of product } A \times$$
$$\text{expected sales price of product } A$$

$$\text{Evaluated cost }(B) = \text{Price of superfluous parts }(B) - \quad (8)$$
$$\text{sales profits of product } B \times$$
$$\text{expected sales price of product } B$$

Among these equations representing three types of evaluated cost, equations (5) and (6) have more cost evaluation items and more conforming to realities but contain more inaccurate items of amounts than equations (3) and (4), and so are equations (7) and (8) than equations (5) and (6). In the superfluous parts elimination procedure 302, therefore, the superfluous parts adjusting unit 112 preferably avoids making a determination automatically based on a single evaluation cost. Instead, a plurality of the above-mentioned values of the evaluated costs are displayed in a list on the operation input/output unit 104 in the ascending order of the number of evaluation items, so as to enable the operator to select on his own the appropriate one of the superfluous parts elimination methods.

Now, a support system for the input operation of a production planning system according to the invention will be explained with reference to the process in which the superfluous parts elimination unit determines one of a plurality of methods for superfluous parts elimination (step 18 in FIG. 2) interactively with the operator. FIGS. 24 to 27 show an example of interface screen for this purpose.

Figure 24:
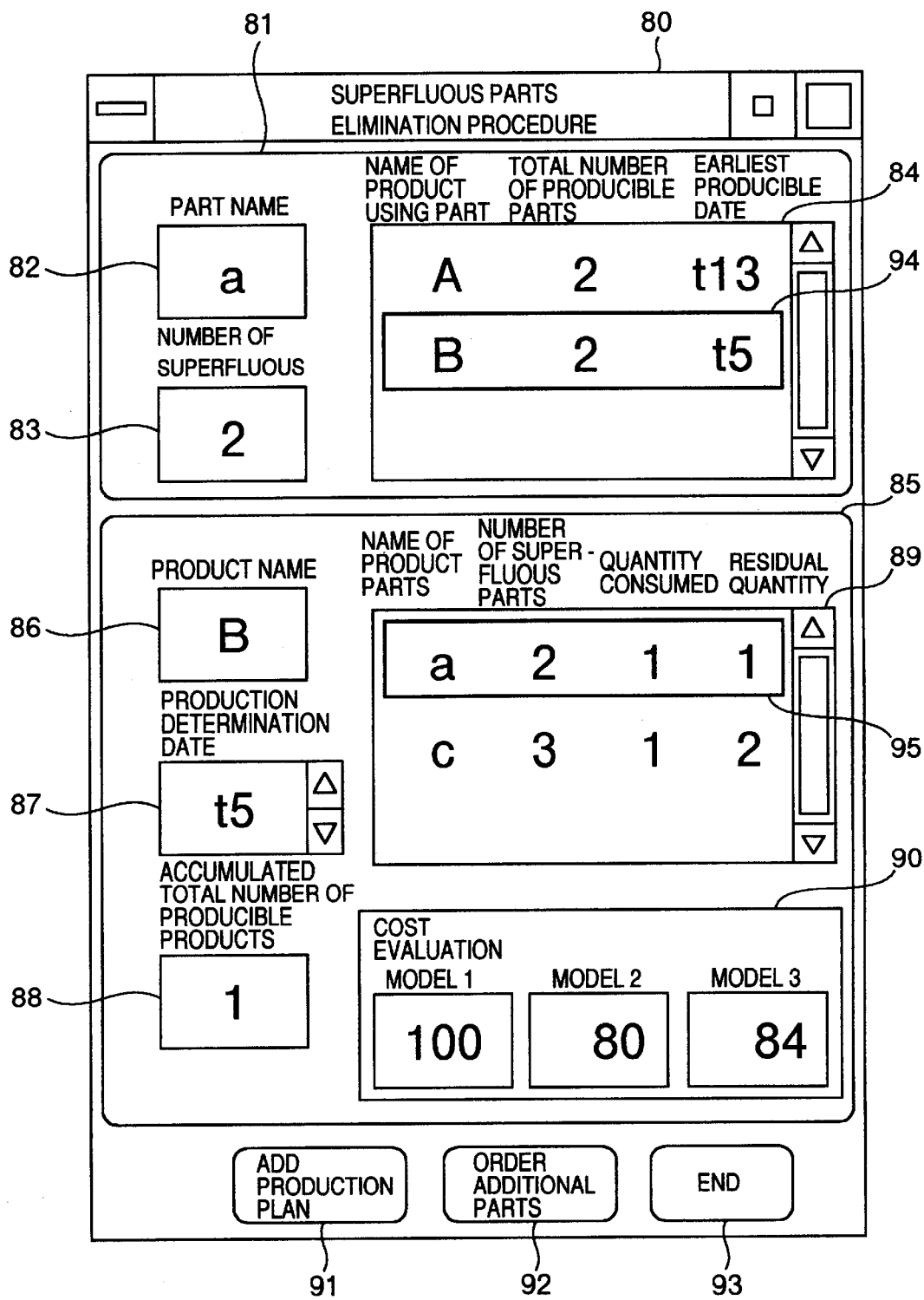
FIG. 24 is a diagram for explaining an interface screen showing the state proposing the specifics of elimination of superfluous parts by new additional production of the product B shown in FIG. 12C.

FIG. 24 shows an example of interface screen of the operation input/output unit 104 for assisting the production planning system 100 of FIG. 1 in determining a method of superfluous parts elimination at step 18 in FIG. 2 interactively with the operator. The interface screen 80 is configured of two subscreens including a product list subscreen 81 for displaying a list of products using superfluous parts as a search key, and a product detail subscreen 85 for displaying detailed information such as a parts list used by the products with one of the listed products as a search key. The product list subscreen 81 includes a parts name display box 82 for displaying superfluous parts to be eliminated, a superfluous parts quantity display box 83 for displaying the number of superfluous parts, and a product list display box 84 for displaying products using the superfluous parts.

The product list display box 84 displays the names of products using the superfluous parts, the total number of products that can be produced with the superfluous parts, and the earliest date by which the products can be produced. Once a product (the product B in the case of FIG. 24) is selected from the product list display box 84, a select marker 94 is lit and constitutes an object of which the detailed information is to be displayed on the product detail subscreen 85.

The product detail subscreen 85 includes a product name display box 86 for displaying a selected product, a production determination date display box 87 for displaying the date of determining the number of products that can be produced, an accumulated quantity display box 88 for displaying an accumulated number of the products that can be produced by the production determination date, a parts list display box 89 for displaying the parts used by a product, and a cost evaluation display box 90. The parts list display box 89 displays the names of parts constituting a product, the number of superfluous ones of each part, the number of each part consumed by the products displayed on the accumulated producible quantity display box 88, and the number of superfluous parts less the number consumed. The parts list display box 89 includes a superfluous part (the part a in FIG. 24) used as a product search key on the product list subscreen 81, with the particular part lit with a select marker 95. Once a select part in the parts list display box 89 is switched, a part constituting a product search key on the product list subscreen 81 appears as a newly selected part. In the process, although the display contents of the product list display box 84 changes, the original product (the product B in the case of FIG. 24) is always included, and therefore the object of the select marker 94 remains unchanged. Also, the cost evaluation display box 90 displays the calculations of the three cost models of equation (3) or (4), equation (5) or (6) and equation (7) or (8) in the ascending order of the number of evaluation items.

Depressing the production plan add button 91, a data transfer command is automatically sent from the MRP control unit 113 to the superfluous parts adjusting unit 112 (numeral 203 in FIG. 1), so that a production plan for the product associated with the product select marker 94 including the production date displayed on the production determination date display box 87 and the number of units to be produced displayed on the accumulated producible quantity display box 88 added as a planned number of units is transferred to the production plan storage section 1. Assume that the parts purchase add button 92 is depressed, and that the number of superfluous ones of a part associated with the parts select marker 95 is smaller than the number of superfluous ones of other parts. Then, the MRP control unit 113 automatically sends a data transfer command to the superfluous parts adjusting unit 112 (numeral 203 in FIG. 1), so that an acquisition request data for additionally purchasing the particular part in the number corresponding to the superfluous ones of the other parts is transferred to the parts acquisition system 103. The parts acquisition system 103 checks the acquisition lead time, makes an arrangement for additional purchase, if possible, and adds the acquisition information to the parts warehousing schedule storage section 5. The MRP control unit 113, upon rewriting of the parts warehousing schedule storage section 5, causes the superfluous parts adjusting unit 112 to calculate the superfluous parts again. The result of this calculation is displayed on the operation input/output unit 104. Depressing the end button 93 completes the superfluous parts elimination procedure 302.

In view of the fact that the planned production lots 41, 42 of the product A21 are deleted, as shown in "17a" of FIG. 17A, to meet the delayed warehousing schedule of the lots 35, 36 of the part b23, as shown in "16d" of FIG. 16A, the interface screen 80 of FIG. 24 displays the occurrence of two superfluous stock lots 43, 44 of the part a22 with the part a22 as a key part 82, as shown in "17c" of FIG. 17C. The name of the part a22 is displayed in the parts name display box 82 of the product list subscreen 81 and the number "2" of superfluous parts is displayed in the superfluous number display box 83. Assuming that the part b23 is in the situation shown in FIG. 18b, the product list display box 84 displays the product A21 using the part b22 with the total producible number of "2", and the earliest producible date of "t13", as shown in FIG. 19C. Also, as shown in FIG. 12C, the product B24 using the part a25 in common with the part a22 is displayed with the total producible number of "2" and the earliest producible date of "t5".

The product B24 selected in the product list display box 84 constitutes a key product for the product detail subscreen 85, and the name of the product B24 is displayed in the product name display box 86. Also, the earliest producible date of "t5" is displayed as an initial value in the production determination date display box 87, and the accumulated total producible quantity of "1" before the date "t5" is displayed in the total accumulated producible quantity display box 88. The parts list display box 89, on the other hand, displays a list of two parts a25 and c26 used by the product B24 based on the parts configuration thereof. Specifically, from FIG. 12A, "2" is displayed as the number of superfluous lots 43, 44 of the part a25, "1" is displayed as the number of lots consumed as of the date "t5", and "1" is displayed as the remaining number of superfluous lot 43. Also, from FIG. 12B, "3" is displayed as the number of superfluous lots 47, 48, 49 of the part c26, "1" is displayed as the number of the lots 55 consumed before the date "t5", and "2" is displayed as the remaining number of the superfluous lots 48, 49. The cost evaluation display box 90 displays the cost evaluation of the product B24 newly produced at the rate of one per day before "t5" (FIG. 12C) as a calculation of three cost models represented by equations (4), (6) and (8). As of the date "t5", however, the evaluated cost of the superfluous parts according to equation (4) is given as $$\text{Evaluated cost } (B, [t5]) = \text{Price of superfluous parts } (B, [t5]) \quad (9)$$
$$= 1 \times \text{unit price of part } a + 2 \times$$
$$\text{unit price of part } b + 2 \times$$
$$\text{unit price of part } c$$

Figure 25:
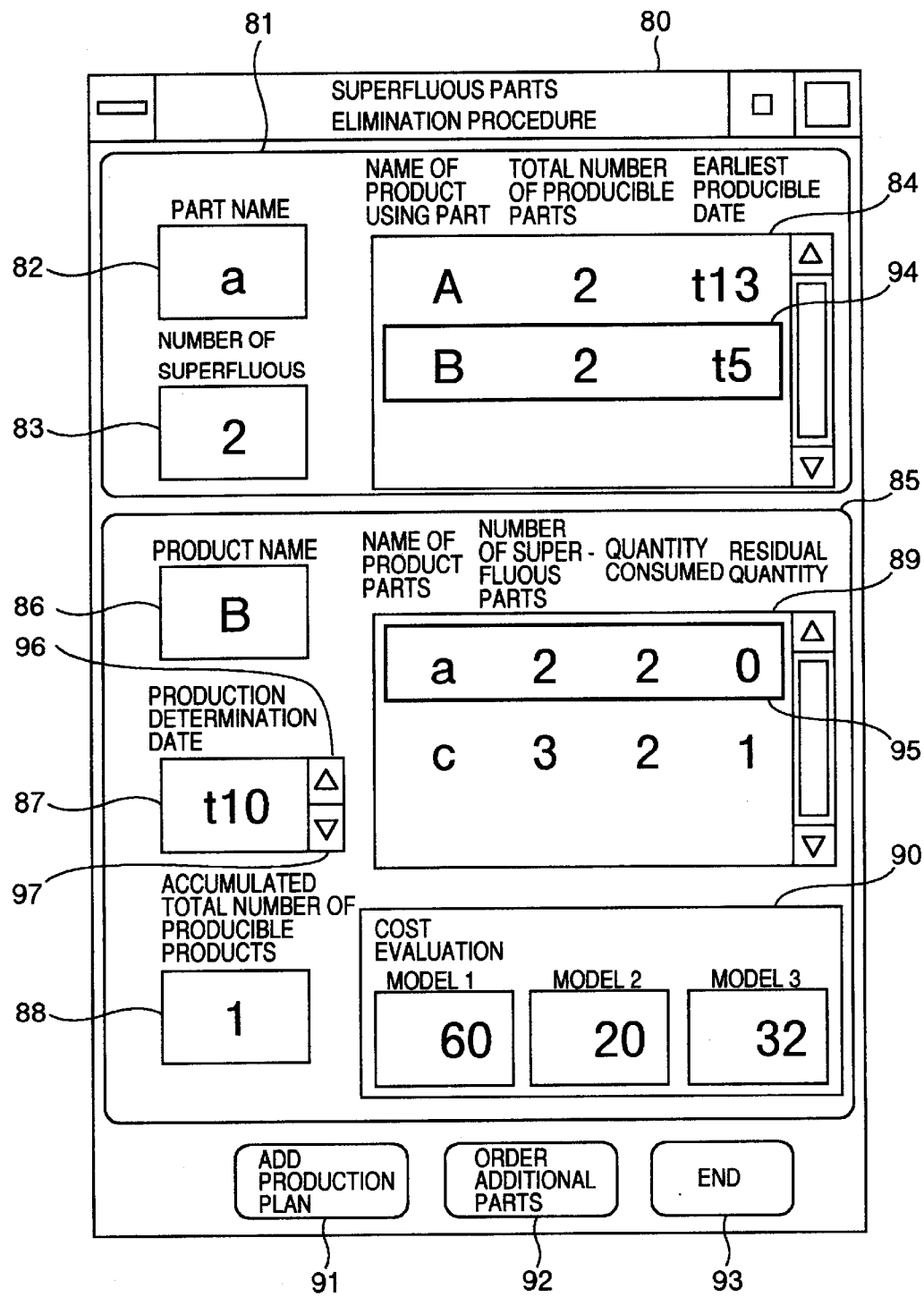
FIG. 25 is a diagram for explaining an interface screen showing the state proposing the specifics of elimination of superfluous parts by new additional production of the product B shown in FIG. 12C.

The production determination date display box 87 has a determination date return button 96 and a determination date advance button 97 (FIG. 25). In the case where the producible quantity is different before and after the current determination date, the determination date can be changed by the buttons 96, 97. FIG. 12C indicates that the number of the products B24 produced is different between "t5" and "t10". Therefore, the production determination date can be advanced from date "t5" (FIG. 24) to "t1" by means of the determination date advance button 97 (FIG. 25). The producible number increases by 1 at the date "t10". Therefore, "2" is displayed as the accumulated total producible quantity up to "t10" in the accumulated total producible quantity display box 88. The contents of display in the parts list display box 89 undergo such a change that as seen from FIG. 12A, the number of lots 53, 54 of the part a25 consumed up to "t10" is "2", the residual number changes to 0 in the absence of the remaining superfluous lots, the number of lots 55, 51 of the part c26 consumed up to "t10" is "2", and the number of the remaining superfluous lot 49 is "1".

The production determination date has changed from "t5" to "t10", and more superfluous parts are consumed. Therefore, the contents of the cost evaluation display box 90 are such that the cost evaluation model 1 switches from equation (9) to (4) and thereby the cost evaluation is generally reduced. In FIGS. 24 and 25, assuming that the part cost is 20 per unit, the cost evaluation is assumed to decrease from 100 (=5×20) to 60 (=3×20). With the increase in sales volume, the sales profits increases. Therefore, the evaluation of the cost evaluation mode 2 decreases according to equation (6). In FIGS. 24 and 25, the evaluation is assumed to decrease from 80 (=100−20) to 20 (=60−20×2) assuming that the sales profit is 20 per unit. Nevertheless, all the products are not necessarily sold off, and with the lapse of time, the expected sales price is assumed to decrease. Thus, the cost evaluation model 3 assumes a value based on equation (8). In FIGS. 24 and 25, assuming that the expected sales prices are 0.8 ([t5]) and 0.6 ([t10]), the cost evaluation is assumed to decrease from 84 (=100−20×0.8) to 32 (=60−20×0.8−20×0.6).

When the production plan add button 91 is depressed, the production plan for the product B24 carrying the product select marker 94 is added to the production plan storage section 1 with the production date "t10" as displayed in the production determination date display box 87 and the planned quantity of 2 as displayed in the accumulated producible number display box 88. If the planned quantity "1"0 has already been added to the production plan storage section 1 at the preceding date "t5", however, the number added at date "t1" is "1". The number of superfluous parts a25 carrying the product select marker 95 is smaller than the number of superfluous parts c26. Depressing the parts purchase add button 92, therefore, the acquisition lead time of the part a25 is checked and if additional purchase is possible, the purchase arrangement is made in conformance with the residual number "1" of the part c26. This acquisition information is added to the parts warehousing schedule storage section 5. As a result, the accumulated total producible quantity as of the scheduled date "t10", i.e. the number of the products B24 to be added is "3".

Figure 26:
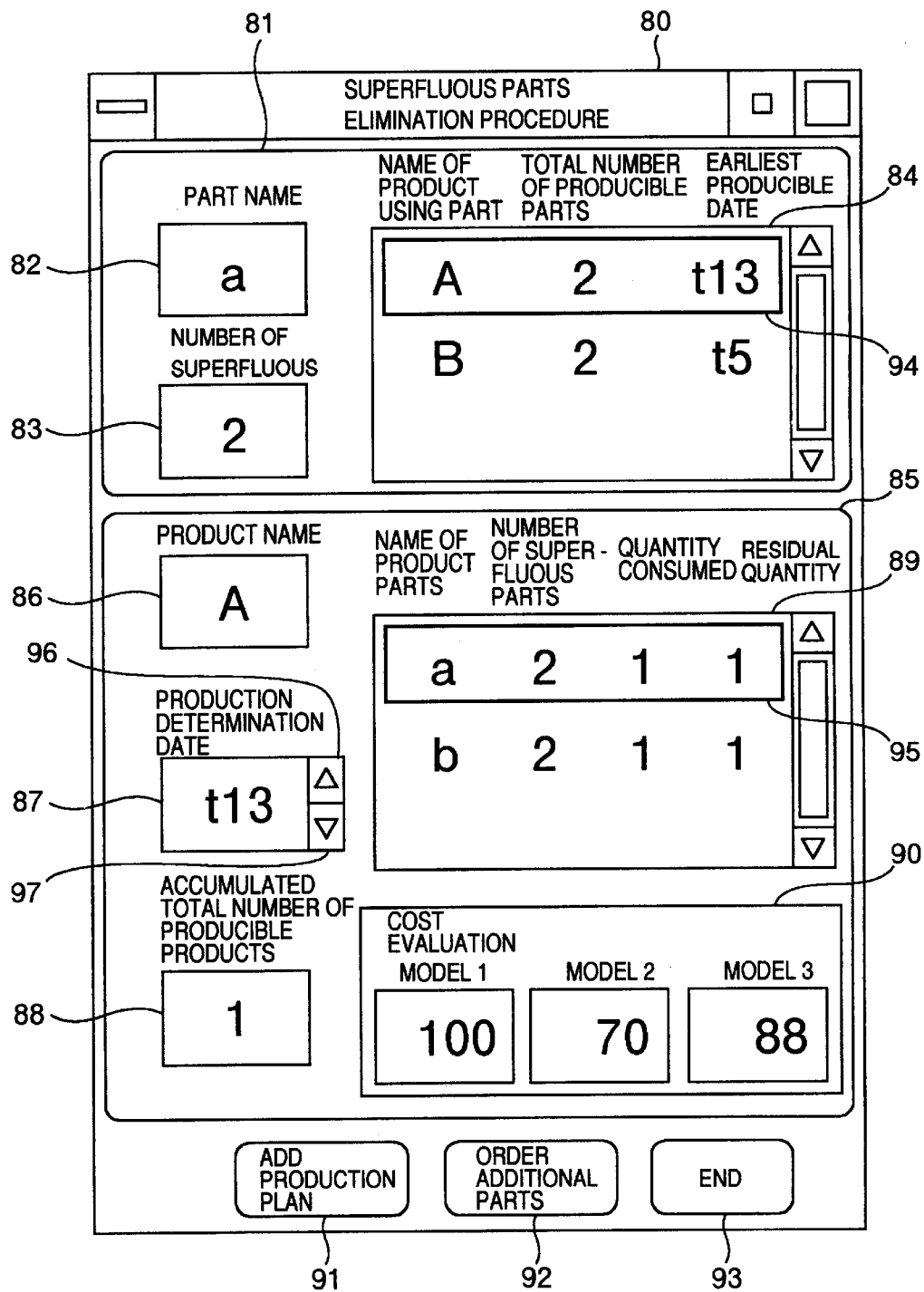
FIG. 26 is a diagram for explaining an interface screen showing the state proposing the specifics of elimination of superfluous parts by new additional production of the product A shown in FIG. 19C.

When the product selected on the product list display box 84 is switched from B24 to A21, as shown in FIG. 26, the select marker 94 moves to the product A21, and the key product in the product detail subscreen 85 changes to the product A21. From FIG. 19C, it is seen that the first one unit can be produced at the scheduled date "t13". As a result, the initial value "t13" is displayed in the production determination display box 87 and "1" in the producible quantity display box 88 of the product detail subscreen 85. The two parts a22 and b23 making up the product A of FIG. 3 are displayed in the parts list display box 89. The superfluous ones of the respective parts are "2", and the quantity consumed and remaining as of the date "t13" are "1" and "1", respectively.

The contents of the cost evaluation display box 90 are "100" (=5×20, assuming that the unit part cost is 20 in FIG. 26) for the cost evaluation model 1, and 70 (=100−30, assuming that the sales profit is 30 per unit in FIG. 26) for the model 2, and 88(=100−30×0.4, assuming that the expected sales price at "t13" is 0.4 in FIG. 26) for the model 3. Comparison with the contents of the cost evaluation display box 90 of FIG. 24 shows that the price is the same for the superfluous parts in the cost evaluation model 1. Since the sales profit for the product A21 is larger than for the product B24, however, it can be determined from the cost evaluation model 2 that the production plan is more advantageously added for the product A21 than for the product B24. Because the earliest producible date arrives later for the product A21 at "t13" than for the product B24 at "t5", however, a decline in the expected sales price of the product is predicted due to the obsolescence, resulting in the reversal of determination that it is more advantageous to add the production plan for the product B24 than for the product A21 according to the cost evaluation mode 3. This determination depends on the estimation made by the operator about the degree of accuracy of the expected sales price.

Figure 27:
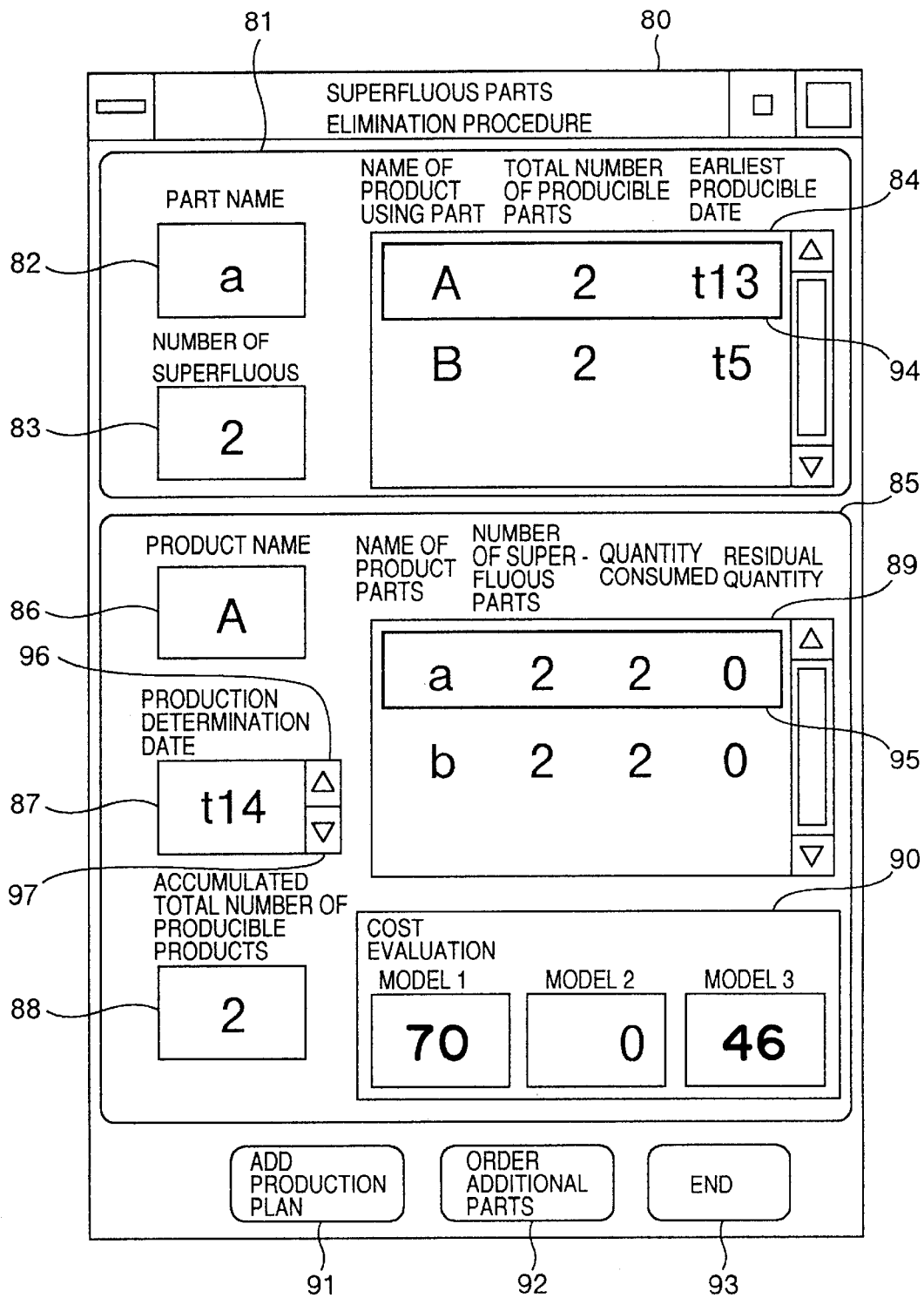
FIG. 27 is a diagram for explaining an interface screen showing the state proposing the specifics of elimination of superfluous parts by new additional production of the product A shown in FIG. 19C.

From FIG. 19C, it is seen that the number of the products A21 produced is different between "t13" and "t14", and therefore the production determination date can be shifted from "t13" (FIG. 26) to "t14" by the determination shift button 97 (FIG. 27). The number of producible products increases by one at the scheduled date "t14". Therefore, the number 2 representing the accumulated total producible products up to "t14" is displayed in the accumulated total producible quantity display box 88. As seen from FIG. 19A, the contents of display in the parts list display box 89 are such that the number of the lots 62, 63 of the product a22 consumed up to "t14" is "2" and in the absence of the residual superfluous lots, the residual number changes to "0". From FIG. 19B, on the other hand, the number of lots 60, 61 of the part b23 consumed up to "t14" is "2", and in the absence of residual superfluous lots, the residual number changes to "0". The contents of the cost evaluation display box 90 are such that since the production determination date is changed from "t13" to "t14", the number of superfluous parts consumed is increased to such an extent that the superfluous parts include only the superfluous lots 47, 48, 49 of the part c26 shown in "21b-3" of FIG. 21C, with the result that the cost evaluation is reduced. In FIGS. 26 and 27, the cost evaluation is assumed to have decreased from 100 (=5 units×20) to 60 (=3 units×20) assuming that the unit part cost is 20. With the increase in the number of products sold, the sales profit increases. The cost evaluation model 2, therefore, decreases according to equation (5). In FIGS. 26 and 27, the cost evaluation is assumed to decrease from 60 (=100–30) to 0 (=60–30×2), the sales profit being 30 per unit. Nevertheless, all the produced products are not necessarily sold off, but rather the expected sales value is assumed to decrease with the lapse of time. Thus, the cost evaluation model 3 assumes a value based on equation (7). In FIGS. 26 and 27, the cost evaluation model 3 is assumed to decrease from 88 (=100–30×0.4) to 36 (=60–30×0.4–30×0.4) assuming that the expected sales price at "t14" is 0.4.

Comparison with the contents in the cost evaluation display box 90 of FIG. 25 shows that as seen from the cost evaluation model 1, the price of superfluous parts remains the same, but the larger sales profit of the product A21 than that of the product B24 leads to the determination that the production plan for the product A21 can be added more advantageously than that for the product B24. In view of the fact that the accumulated producible date "t14" of two products A21 arrives later than the producible date "t10" of two products B24, however, the obsolescence of the product is expected to reduce the expected sales price, and the cost evaluation model 3 shows the reverse determination that the addition of the production plan for the product B24 is more advantageous than for the product A21. In that case, the determination depends on the degree of accuracy of the expected sales price the operator estimates.

As described above, the superfluous parts elimination section 9 of the superfluous parts adjusting unit 112 of the production planning system 100 can make an automatic determination according to a single evaluation cost formula in the superfluous parts elimination procedure 302. As an alternative, a plurality of evaluation cost formulae can be displayed as a list through the operator input/output unit in the ascending order of the number of the evaluation items. The decision is left up to the operator as to which superfluous parts elimination method to select from among a plurality of such methods. In this way, a superfluous parts elimination method can be formed in more flexible manner.

Assume that the production plan add button 91 is depressed. The related information is transmitted from the input/output unit 104 to the production planning system 100, and the MRP control unit 113 sends a data correct command and a data transfer command to the deficient parts elimination unit 112 (numeral 203 in FIG. 1). The production plan for the part A21 carrying the product select marker 94 is transferred to the production plan storage section 1, with the date "t14" displayed as a production date in the production determination date display box 87 and the number "2" of units displayed in the accumulated total producible quantity display box 88 as the planned number of units added to the production plan. If the planned quantity "1" is already added to the production plan storage section 1 at the previous date "t13", however, the number added this time (i.e. at the scheduled data "t14") is "1". Depress the parts purchase add button 92. Since the superfluous quantity of the part a22 carrying the part select marker 95 is smaller than the superfluous quantity of the other part b23, the MRP control unit 113 sends a data transfer command to the superfluous parts adjusting unit 112 (numeral 203 in FIG. 1), and causes an acquisition request data for additional purchase corresponding to the superfluous quantity of the part b23 to be transferred to the parts acquisition system 103.

The parts acquisition system 103 checks the lead time for acquisition of the part a22, and if additional purchase is possible, makes an arrangement for acquiring it in the number corresponding to the residual number of the part b23 and adds the acquisition information to the parts warehousing schedule section 5.

The MRP control unit 113, upon rewriting of the parts warehousing schedule storage section 5, causes the superfluous parts adjusting unit 112 to calculate superfluous parts again, and displays the result thereof on the operation input/output unit 104. Since the residual number of the part b23 is "0" at the scheduled date "t14", however, no purchase arrangement is made. The accumulated producible total number of units, i.e. the number of the products A21 to be added, therefore, remains "2".

The superfluous parts elimination section 7 can include an interface screen similar to the one for supporting the operator described above with reference to embodiments in determining the method of superfluous parts elimination interactively at step 18. Such a decision support function can be provided to determine interactively with the operator a specific product for which the plan is cancelled to eliminate the deficient parts at step 14 of all the products having deficient component parts.

According to this invention, a production planning system comprises both a deficient part adjusting unit and a superfluous part adjusting unit, in which the first step is to eliminate deficient parts and to reveal the whole truth of superfluous parts, followed by taking the procedure for eliminating the superfluous parts. In this way, a production plan which otherwise could not be carried out due to deficient parts can be converted into a feasible production plan.

Also, the stock cost of superfluous parts can be minimized by adding a production plan for a product using superfluous parts effectively, thereby making it possible to form a production plan maximizing the profits.

The present invention is applicable with a great effect especially to a product line including many types of products sharing many common parts.

What is claimed is:

1. A production planning system capable of adjusting a production plan, comprising:

a data storage unit for storing production planning information, parts list information, parts stock information and parts warehousing schedule information;

a material resource plan (MRP) explosion unit for calculating of the required amount of material resources based on the production planning information and the parts list information stored in said data storage unit;

a superfluous parts adjusting unit for making adjustments to eliminate superfluous parts;

said superfluous parts adjusting unit including a superfluous parts calculation section for collating the required amount of material resources calculated by said MRP explosion unit with said parts stock information and said parts warehousing schedule information thereby to calculate superfluous parts, and a superfluous parts elimination section for eliminating superfluous parts by changing the production plan based on the superfluous parts information calculated by said superfluous parts calculation section.

2. A production planning system according to claim 1, further comprising a deficient parts adjusting unit;

wherein said deficient parts adjusting unit includes a deficient parts calculation section for collating the required amount of material resources calculated by said MRP explosion unit with said parts stock information and said parts warehousing schedule information and calculating parts to be deficient and a deficient parts elimination section for eliminating said deficient parts by changing the production plan based on the deficient parts information calculated by said deficient parts calculation section.

3. A production planning system according to claim 1 or 2, wherein said superfluous parts elimination section includes a superfluous parts elimination means proposal section for proposing a plurality of superfluous parts elimination means available, and a superfluous parts elimination means selection section for selecting one of a plurality of said superfluous parts elimination means and reflecting the result of selection of the superfluous parts elimination means in selected one of said production plan storage section, said parts stock storage section and said parts warehousing schedule storage section.

4. A production planning system according to claim 2, wherein said superfluous parts adjusting unit adjusts superfluous parts for a production plan using the required amount of material resources calculated by said MRP explosion unit based on the production planning information and the parts list information adjusted by said deficient parts adjusting unit.

5. A production planning system according to claim 4, wherein said superfluous parts elimination means proposal section includes a superfluous parts situation display section for displaying the change in the situation of each of a plurality of said superfluous parts elimination means resulting from the selection of one of said superfluous parts elimination means.

6. A production planning system according to claim 3, wherein said superfluous parts elimination means proposal section includes a cost evaluation display section for displaying a cost evaluation for each of a plurality of said superfluous parts elimination means resulting from the selection of one of said superfluous parts elimination means.

7. A production planning system capable of adjusting a production plan, comprising:

means for storing production planning information, parts list information, parts stock information and parts warehousing schedule information for products to be produced;

means for calculating the required amount of material resources for the production according to a current production plan stored in said storage means, collating the result of developing said required amount of material resources with the parts in stock and the parts to be warehoused stored in said storage section, calculating the parts and the number of the parts deficient for executing said current production plan, and in the case where the number of said parts deficient for any of said products to be produced is not zero, determining said current production plan as an infeasible production plan for said product, selectively deleting the portion of the production plan using the deficient parts from said infeasible production plan for said product, and eliminating said infeasible situation due to said deficient parts thereby to form a feasible production plan; and means for calculating the required amount of material resources for the production according to said feasible production plan, collating said required amount of material resources with the parts in stock and the parts to be warehoused stored in said storage means thereby to calculate the parts and the number of the parts superfluous for carrying out said current production plan, and in the case where the number of said superfluous parts of any of the products to be produced is not zero, determining whether or not a new production plan can be formed for a product using said superfluous parts alone, and in the case where said new production plan can be formed, adding said new production plan to said feasible production plan thereby to form a renewed production plan for reducing the said superfluous parts.

8. A production planning system according to claim 7, wherein said means for forming a feasible production plan by eliminating the infeasible situation due to said deficient parts includes means for generating new purchase information for said deficient parts, and means for delaying the production of the product using said newly purchased parts according to the schedule of said infeasible production plan until said newly purchased parts are warehoused.

9. A production planning system according to claim 8, wherein said means for forming a new production plan for alleviating the situation causing said deficient parts includes means for forming a new production plan for the product using said superfluous parts as a portion of said product, and means for instructing deficient parts to be newly purchased in forming said new production plan.

10. A production planning system according to claim 7 or 9, wherein in the case where there are a plurality of new production plans for reducing said superfluous parts, said means for forming a new production plan for reducing the situation causing said superfluous parts includes means for proposing a plurality of said new production plans simultaneously with a change in the situation of said superfluous parts resulting from selecting one of said new production plans, and means for switching said selected new production plans sequentially and comparing each of said new production plans with said situation of said superfluous parts and selecting said new production plan minimizing the number of said superfluous parts thereby to form a profit-maximizing production plan.

11. A production planning system according to claim 7 or 9, wherein in the case where there are a plurality of new production plans for eliminating said superfluous parts, said means for forming a new production plan for alleviating the situation causing said superfluous parts includes means for proposing a plurality of said new production plans simultaneously with the change in the cost evaluation interlocked with the reduction of said superfluous parts resulting from selecting one of said new production plans, and means for switching said selected new production plans sequentially and comparing each of said new production plans with said cost evaluation, selecting said new production plan minimizing said cost evaluation and adding said selected new production plan to said feasible production plan thereby to form a profit-maximizing production plan.

12. A production planning system according to claim 7 or 9, wherein in the case where there are a plurality of new production plans for eliminating superfluous parts, said means for forming a new production plan for alleviating the situation causing said superfluous parts includes:

means for proposing simultaneously a plurality of said new production plans; a change in the cost evaluation of the superfluous parts interlocked with the reduction in said superfluous parts resulting from the selection of one of said new production plans; and a change in the cost evaluation plus sales profits obtained by subtracting the sales profits of the product produced according to said production plan from said cost evaluation of superfluous parts, and means for switching said selected new production plans sequentially and comparing a plurality of cost evaluations including said cost evaluation of superfluous parts and said cost evaluation plus sales profits, selecting a new production plan minimizing one of a plurality of said cost evaluations and adding said selected new production plan to said feasible production plan thereby to form a profit-maximizing production plan.

13. A production planning system according to claim 7 or 9, wherein in the case where there are a plurality of new production plans for eliminating said superfluous parts, said means for forming a new production plan for reducing the situation causing said superfluous parts includes:

means for proposing a plurality of said new production plans; and means for proposing simultaneously a change in the cost evaluation of superfluous parts interlocked with the reduction in said superfluous parts resulting from the selection of one of said new production plans, a change in the cost evaluation plus sales profits obtained by subtracting the sales profits of the product produced according to said production plan resulting from selecting one of said new production plans from said cost evaluation of superfluous parts, and a change in the cost evaluation plus expected sales profits obtained by subtracting from said cost evaluation of superfluous parts the expected sales profits that is the product of the expected sales value and the sales profits of the product produced according to said production plan resulting from selecting one of said new production plans; means for switching said selected new production plans sequentially and comparing a plurality of cost evaluations including the cost evaluation of said superfluous parts, the cost evaluation plus said sales profits and the cost evaluation plus expected sales profits; and means for selecting a new production plan minimizing one of said cost evaluations and adding said selected new production plan to said feasible production plan thereby to form a profit-maximizing production plan.

14. A production planning system according to claim 7 or 9, further comprising:

means for displaying a display screen including a reverse parts development screen having a screen for displaying all of a plurality of products using an arbitrary designated part simultaneously or by being scrolled, and a production development screen having a screen in which one of a plurality of said products can be selected and all the component parts of said selected product can be displayed simultaneously or by being scrolled.

15. A production planning system according to claim 7 or 9, further comprising:

means for selecting one of the component parts in said product development screen and, upon selection of said component part, switching said part in said part reverse development screen to said selected component part.

16. A production planning system according to claim 7 or 9, further comprising:

means for determining whether or not an arbitrary part designated on said part reverse development screen is a superfluous part and displaying a screen for displaying said determination at the same time.

17. A production planning system according to claim 7 or 9, further comprising:

means for displaying a screen for determining and at the same time displaying whether or not said product selected on said product development screen can be produced using a superfluous part.

18. A production planning system capable of adjusting a production plan, comprising:

means for storing production planning information, parts list information, parts stock information and parts warehousing schedule information for products to be produced;

means for calculating the required amount of material resources for the production according to the current production plan stored in said storage means;

means for collating the result of developing said required amount of material resources with the parts in stock and the parts to be warehoused stored in said storage section, and calculating the parts and the number of the parts deficient for carrying out said current production plan;

means for determining said current production plan as an infeasible production plan for any of said products to be produced in the case where the number of the parts deficient for said product to be produced is not zero, selectively deleting the portion of the production plan using the deficient parts from said infeasible production plan for said product, and eliminating said infeasible condition due to said deficient parts thereby to form a feasible production plan;

means for calculating the required amount of material resources for the production according to said feasible production plan;

means for collating said required amount of material resources with the parts in stock and the parts to be warehoused stored in said storage means thereby to calculate the parts and the number of the parts superfluous for carrying out said current production plan; and means for determining whether or not a new production plan for a product using said superfluous parts alone can be formed in the case where the number of said superfluous parts of any of said products to be produced is not zero, and adding said new production plan to said feasible production plan in the case where said new production plan can be formed thereby to form a renewed production plan for reducing the said superfluous parts;

wherein all or part of said means are realized by a computer.

19. A method for adjusting a production plan for a product in such a manner as to acquire all the parts required for the production of said product at the time of production by collating said production plan with said parts, comprising the steps of:

calculating the required amount of material resources for the current production plan, collating the result of calculation of said required amount of material resources with the parts in stock and the parts to be warehoused thereby to calculate the parts and the number of the parts deficient for executing said current production plan, determining said current production plan as an infeasible production plan in the case where the number of said deficient parts is not zero, and selectively deleting the portion of the production plan using said deficient parts from said infeasible production plan thereby to eliminate said deficient parts and form a feasible production plan; and calculating the required amount of material resources for said feasible production plan, collating the result of calculation of said required amount of material resources with the parts in stock and the parts to be warehoused thereby to calculate the parts and the number of the parts superfluous for executing said feasible production plan, determining whether or not a new production plan can be formed for a product using said superfluous parts alone in the case where the number of said superfluous parts is not zero, and adding said new production plan to said feasible production plan in the case where said new production plan can be formed, thereby reducing said superfluous parts and converting said feasible production plan into a production plan with reduced superfluous parts.

20. A recording medium for recording a program in a computer-readable form for adjusting a production plan by a computer, wherein said program is for calculating the required amount of material resources for the current production plan formed in advance, collating the result of calculation of said required amount of material resources with the parts in stock and the parts to be warehoused thereby to calculate the parts and the number of the parts superfluous for executing said current production plan, determining whether or not a new production plan can be formed for a product using said superfluous parts alone in the case where the number of said superfluous parts is not zero, adding said new production plan to said current production plan in the case where said new production plan can be formed thereby to reduce said superfluous parts and form a production plan with said superfluous parts reduced, and wherein said process for reducing said superfluous parts is executed by a computer.

21. A recording medium for recording a program according to claim 20, wherein said program includes the process for calculating the required amount of material resources for the current production plan formed in advance, collating the result of calculation of said required amount of material resources with the parts in stock and the parts to be warehoused thereby to calculate the parts and the number of the parts deficient for executing said current production plan, determining said current production plan as an infeasible production plan in the case where said number of deficient parts is not zero, and selectively deleting the portion of said production plan using said deficient parts from said infeasible production plan thereby to eliminate the deficient parts and form a feasible production plan.

22. A recording medium for recording a program according to claim 21, wherein said program includes the process for forming a feasible production plan by eliminating said deficient parts and the process for reducing superfluous parts for said feasible production plan.

* * * * *